US011148288B2

(12) United States Patent
Chu et al.

(10) Patent No.: US 11,148,288 B2
(45) Date of Patent: Oct. 19, 2021

(54) SYSTEMS, APPARATUS, AND METHODS FOR ROBOTIC LEARNING AND EXECUTION OF SKILLS

(71) Applicant: Diligent Robotics, Inc., Austin, TX (US)

(72) Inventors: Vivian Yaw-Wen Chu, Austin, TX (US); Shuai Li, Austin, TX (US); Forrest Green, Austin, TX (US); Peter Worsnop, Austin, TX (US); Andrea Lockerd Thomaz, Austin, TX (US)

(73) Assignee: Diligent Robotics, Inc., Austin, TX (US)

( * ) Notice: Subject to any disclaimer, the term of this patent is extended or adjusted under 35 U.S.C. 154(b) by 63 days.

(21) Appl. No.: 16/456,919

(22) Filed: Jun. 28, 2019

(65) Prior Publication Data

US 2020/0070343 A1 Mar. 5, 2020

Related U.S. Application Data

(63) Continuation-in-part of application No. PCT/US2018/019520, filed on Feb. 23, 2018.
(Continued)

(51) Int. Cl.
*B25J 5/00* (2006.01)
*B25J 9/16* (2006.01)
(Continued)

(52) U.S. Cl.
CPC .............. *B25J 9/1661* (2013.01); *B25J 5/00* (2013.01); *B25J 9/0081* (2013.01); *B25J 9/06* (2013.01);
(Continued)

(58) Field of Classification Search
CPC ......... Y02P 90/80; Y02P 90/02; G06Q 10/06; G06Q 50/28; G06Q 10/10; G05D 1/0246;
(Continued)

(56) References Cited

U.S. PATENT DOCUMENTS 9,919,232 B2 * 3/2018 Tappeiner ............ G05D 1/0088
9,926,138 B1 * 3/2018 Brazeau ............... B65G 1/1376
(Continued)

FOREIGN PATENT DOCUMENTS

FR      2 898 824         9/2007
WO   WO 2018/156952    8/2018

OTHER PUBLICATIONS

Holtz et al., A skill-based system for object perception and manipulation for automating kitting tasks, 2015, IEEE, pg. (Year: 2015).*
(Continued)

*Primary Examiner* — McDieunel Marc
(74) *Attorney, Agent, or Firm* — Cooley LLP

(57) ABSTRACT

Systems, apparatus, and methods are described for robotic learning and execution of skills. A robotic apparatus can include a memory, a processor, sensors, and one or more movable components (e.g., a manipulating element and/or a transport element). The processor can be operatively coupled to the memory, the movable elements, and the sensors, and configured to obtain information of an environment, including one or more objects located within the environment. In some embodiments, the processor can be configured to learn skills through demonstration, exploration, user inputs, etc. In some embodiments, the processor can be configured to execute skills and/or arbitrate between different behaviors and/or actions. In some embodiments, the processor can be configured to learn an environmental constraint. In some embodiments, the processor can be configured to learn using a general model of a skill.

17 Claims, 25 Drawing Sheets

Related U.S. Application Data

(60) Provisional application No. 62/723,694, filed on Aug. 28, 2018, provisional application No. 62/463,628, filed on Feb. 25, 2017, provisional application No. 62/463,630, filed on Feb. 25, 2017.

(51) Int. Cl.

| | | |
|---|---|---|
| *B25J 9/00* | (2006.01) | |
| *B25J 19/02* | (2006.01) | |
| *B25J 9/06* | (2006.01) | |
| *B25J 11/00* | (2006.01) | |
| *B25J 15/00* | (2006.01) | |

(52) U.S. Cl.
CPC ............. *B25J 9/163* (2013.01); *B25J 9/1694* (2013.01); *B25J 11/0005* (2013.01); *B25J 15/00* (2013.01); *B25J 19/02* (2013.01)

(58) Field of Classification Search
CPC .. G05D 1/0251; G05D 1/0297; G05D 1/0221; G05D 1/0274; G06K 9/00664; G06K 9/00805; G06K 2209/19; G06K 9/209; G06K 2209/03; B25J 9/162; B25J 11/0005; B25J 15/00; B25J 19/02; G05B 2219/40302; B60W 2050/146; B60W 2520/10; B60W 2520/105; B60W 2540/215; B60W 2554/4042; B60W 2554/4044; B60W 2554/802; B60W 2554/806; B60W 2556/50; B60W 50/14; B60W 60/00; B60W 60/001; B65G 47/256; E02F 9/262; G06N 20/00; G06N 20/20; G06N 3/08; G06T 2207/30164; G10L 2015/223; G10L 21/10; H05B 47/105; Y02D 30/70; B64C 2201/146; Y02B 20/40

See application file for complete search history.

(56) References Cited

U.S. PATENT DOCUMENTS

| | | |
|---|---|---|
| 2003/0120391 A1 | 6/2003 | Saito |
| 2013/0245824 A1 | 9/2013 | Barajas et al. |
| 2014/0163730 A1 | 6/2014 | Mian |
| 2016/0129592 A1 | 5/2016 | Saboo et al. |
| 2016/0257000 A1 | 9/2016 | Guerin et al. |
| 2017/0232613 A1 | 8/2017 | Ponulak et al. |
| 2017/0357270 A1* | 12/2017 | Russell ............... G05D 1/0242 |

OTHER PUBLICATIONS

Sucan et al., Combining planning techniques for manipulation using realtime perception, 2010, IEEE, pg. (Year: 2010).*

Nassai, An approach to motion planning for mobile manipulation, 1994, IEEE, p. 831-838 (Year: 1994).*

Hart et al., Learning Generalizable Control Programs, 2011, IEEE, p. 216-231 (Year: 2011).*

Weser et al., Autonomous planning for mobile manipulation services based on multi-level robot skills, 2009, IEEE, 1999-2004 (Year: 2009).*

Green et al., Designing for Learnability in Human-Robot Communication, 2003, IEEE, p. 644-650 (Year: 2003).*

Akgun et al., "Simultaneously learning actions and goals from demonstration," Feb. 2016, vol. 40, Issue 2, pp. 211-227.

Akgun et al., "Trajectories and keyframes for kinesthetic teaching: a human-robot interaction perspective," Proceedings of the 7th Annual ACM/IEEE International Conference on Human-Robot Interaction (2012), pp. 391-398.

Chu et al., Learning Haptic Affordances from Demonstration and Human-Guided Exploration, IEEE Haptics Symposium (HAPTICS), Philadelphia, PA, 2016, pp. 119-125.

Cosgun et al., "Context-aware robot navigation using interactively built semantic maps," Paladyn, J. Behav. Robot, 2018, 23 pages.

International Search Report and Written Opinion dated May 15, 2018, for International Application No. PCT/US2018/019520, 10 pages.

International Search Report and Written Opinion dated Feb. 5, 2020, for International Application No. PCT/US2019/048601, 18 pages.

Kurenkov et al., "An Evaluation of GUI and Kinesthetic Teaching Methods for Constrained-Keyframe Skills," IEEE/RSJ International Conference on Intelligent Robots and Systems, Sep. 28-Oct. 2, 2015, pp. 3608-3613.

* cited by examiner

SYSTEMS, APPARATUS, AND METHODS FOR ROBOTIC LEARNING AND EXECUTION OF SKILLS

CROSS-REFERENCE TO RELATED APPLICATIONS

This application claims priority to U.S. Provisional Application No. 62/723,694, entitled "SYSTEMS, APPARATUS, AND METHODS FOR ROBOTIC LEARNING AND EXECUTION OF SKILLS," filed Aug. 28, 2018, the disclosure of which is incorporated by reference herein in its entirety.

GOVERNMENT SUPPORT

This invention was made with U.S. government support under Grant Nos. 1621651 and 1738375 awarded by the National Science Foundation under the Small Business Innovation Research Program Phase I. The U.S. government has certain rights in the invention.

TECHNICAL FIELD

The present disclosure relates generally to systems, apparatus, and methods for robotic learning and execution of skills. More specifically, the present disclosure relates to a robotic apparatus capable of learning and executing skills in unstructured environments.

BACKGROUND

Robots can be used to perform and automate a variety of tasks. Robots can perform tasks by moving through an environment, such as an office building or a hospital. Robots can be equipped with wheels, tracks, or other mobile components that enable them to move autonomously around an environment. Robots that do not have an arm or other manipulator, however, cannot manipulate objects in the environment. Therefore, these robots are limited in their ability to perform tasks, e.g., such robots may not be able to pick up and deliver an object without a human being present to manipulate the object at a pick up or delivery point.

Robots that include an arm or other manipulator may be able to pick up and deliver objects to a location without a human being present. For example, a robot that has an arm with an end effector, such as a gripper, can use the gripper to pick up one or more objects from different locations and deliver those objects to a new location, all without human assistance. These robots can be used to automate certain tasks, thereby allowing human operators to focus on other tasks. However, most commercial robots do not include manipulators due to the challenge and complexity of programming the operation of a manipulator.

Moreover, most commercial robots are designed to operate in structured environments, e.g., a factory, a warehouse, etc. Unstructured environments, e.g., environments involving humans, such as hospitals and homes, can impose additional challenges for programming a robot. In unstructured environments, robots cannot rely on complete knowledge of their surrounding environment but must be able to perceive changes in their surrounding environment and adapt based on those changes. Thus, in unstructured environments, robots have to continuously acquire information about the environment to be able to make autonomous decisions and perform tasks. Oftentimes, the movements of a robot, e.g., the movements of an arm or end effector in the environment, are also constrained by objects and other obstacles in the environment, further adding to the challenge of robot perception and manipulation. Given the uncertain and dynamic nature of unstructured environments, robots typically cannot be pre-programmed to perform tasks.

Accordingly, there is a need for robotic systems that can perceive and adapt to dynamic and unstructured environments, and can perform tasks within those environments, without relying on pre-programmed manipulation skills.

SUMMARY

Systems, apparatus, and methods are described for robotic learning and execution of skills. In some embodiments, an apparatus includes a memory, a processor, a manipulating element, and a set of sensors. The processor can be operatively coupled to the memory, the manipulating element, and the set of sensors, and configured to: obtain, via a subset of sensors from the set of sensors, a representation of an environment; identify a plurality of markers in the representation of the environment, each marker from the plurality of markers associated with a physical object from a plurality of physical objects located in the environment; present information indicating a position of each marker from the plurality of markers in the representation of the environment; receive a selection of a set of markers from the plurality of markers associated with a set of physical objects from the plurality of physical objects; obtain, for each position from a plurality of positions associated with a motion of the manipulating element in the environment, sensory information associated with the manipulating element, where the motion of the manipulating element is associated with a physical interaction between the manipulating element and the set of physical objects; and generate, based on the sensory information, a model configured to define movements of the manipulating element to execute the physical interaction between the manipulating element and the set of physical objects.

In some embodiments, the manipulating element can include a plurality of joints and an end effector. In some embodiments, the set of physical objects can include a human.

In some embodiments, the plurality of markers are fiducial markers, and the representation of the environment is a visual representation of the environment.

In some embodiments, two or more markers from the plurality of markers can be associated with one physical object from the set of physical objects. Alternatively or additionally, in some embodiments, one marker from the plurality of markers can be associated with two or more physical objects from the set of physical objects.

In some embodiments, a method includes: obtaining, via a set of sensors, a representation of an environment; identifying a plurality of markers in the representation of the environment, each marker from the plurality of markers associated with a physical object from a plurality of physical objects located in the environment; presenting information indicating a position of each marker from the plurality of markers in the representation of the environment; receiving, after the presenting, a selection of a set of markers from the plurality of markers associated with a set of physical objects from the plurality of physical objects; obtaining, for each position from a plurality of positions associated with a motion of a manipulating element in the environment, sensory information associated with the manipulating element, where the motion of the manipulating element is associated with a physical interaction between the manipulating element and the set of physical objects; and generating, based on the sensory information, a model configured to define movements of the manipulating element to execute the physical interaction between the manipulating element and the set of physical objects.

In some embodiments, the method further includes receiving a selection of a first subset of features from the set of features, where the model is generated based on sensor data associated with the first subset of features and not based on sensor data associated with a second subset of features from the set of features not included in the first set of features.

In some embodiments, a method includes: obtaining, via a set of sensors, a representation of an environment; identifying a plurality of markers in the representation of the environment, each marker from the plurality of markers associated with a physical object from a plurality of physical objects located in the environment; presenting information indicating a position of each marker from the plurality of markers in the representation of the environment; in response to receiving a selection of a set of markers from the plurality of markers associated with a set of physical objects from the plurality of physical objects, identifying a model associated with executing a physical interaction between a manipulating element and the set of physical objects, the manipulating element including a plurality of joints and an end effector; and generating, using the model, a trajectory for the manipulating element that defines movements of the plurality of joints and the end effector associated with executing the physical interaction.

In some embodiments, the method further includes: displaying to a user the trajectory for the manipulating element in the representation of the environment; receiving, after the displaying, an input from the user; and in response to the input indicating an acceptance of the trajectory for the manipulating element, implementing the movements of the plurality of joints and the end effector to execute the physical interaction.

In some embodiments, the model is associated with (i) a stored set of markers, (ii) sensory information indicating at least one of a position or an orientation of the manipulating element at points along a stored trajectory of the manipulating element associated with the stored set of markers, and (iii) sensory information indicating a configuration of the plurality of joints at the points along the stored trajectory. The method of generating the trajectory for the manipulating element including: computing a transformation function between the set of markers and the stored set of markers; transforming, for each point, the at least one of the position or the orientation of the manipulating element using the transformation function; determining, for each point, a planned configuration of the plurality of joints based on the configuration of the plurality of joints at the points along the stored trajectory; and determining, for each point, a portion of the trajectory between that point and a consecutive point based on the planned configuration of the plurality of joints for that point.

In some embodiments, a robotic device is configured to learn and execute skills associated with a transport element. A transport element can be, for example, a set of wheels, tracks, crawlers, or other suitable device that enables movement of a robotic device within an environment, such as from a first room to a second room, or between floors of a building. The robotic device can be configured to learn skills associated with the transport element by obtaining sensory information associated with the transport element, an environment surrounding the robotic device, and/or another component of the robotic device, when the robotic device is moved from a first location to a second location, e.g., through a doorway or by an object such as a human. The sensory information can be recorded at specific points during the movement of the robotic device, e.g., at a keyframe. The robotic device can be configured to generate, based on the sensory information, a model configured to define movements of the transport elements (or other components of the robotic device, e.g., a manipulating element) to execute the movement of the robotic device from the first location to the second location.

In some embodiments, a robotic device is configured to learn a specialized skill with a generic version of a skill. The robotic device can initiate execution of the generic skill in a specific environment and pause the execution when the robotic device reaches a part of the execution that requires specialization of the skill in the specific environment. The robotic device can then prompt a user for a demonstration of that part of the skill. The robotic device can continue to execute the skill and/or prompt a user for demonstrations of particular parts of the skill until the skill is completed. The robotic device then adapts the generic skill based on the demonstration of the specific parts of the skill to generate a specialized model for executing the skill.

In some embodiments, a robotic device is configured to learn environmental constraints. The robotic device can record information about its surrounding environment or objects within that environment, and obtain general knowledge about the environment. The robotic device can apply this general knowledge to a set of models that relate to different skills that are executed within the environment.

In some embodiments, a robotic device is capable of using behavior arbitration to act continuously and autonomously within a dynamic environment such as a human social environment. The robotic device may have various resources or components, e.g., a manipulation element, a transport element, a head, a camera, etc., and can apply arbitration algorithms to determine when and how to use those resources. The arbitration algorithms can define a set of rules that enables different actions or behaviors to be prioritized based on the information that is being captured at the robotic device. The robotic device can be configured to continuously decide between executing different actions and behaviors (and therefore use different resources or components), as new information is captured at the robotic device. As part of the behavior arbitration, the robotic device can be configured to handle interruptions to an action and switch to a new action. By continuously monitoring itself and its surrounding environment and performing continuous arbitration, the robotic device can engage in socially appropriate behavior continually over time.

In some embodiments, a robotic device is configured to receive social context information associated with an environment and combine that information with a navigational map of the environment (e.g., layer the social context information on top of the navigational map). The robotic device can be provided with the social context information by a user (e.g., a human operator), or the robotic device can capture the social context information through interactions within the environment. The robotic device can refine the social context information as the robotic device engages in interactions with humans within an environment over time. In some embodiments, the robotic device can be configured to associate certain types of behaviors or actions with particular locations within the environment based on the social context information associated with those locations.

In some embodiments, a robotic device is configured to interact with a human operator, either on site or via a network connection to a remote device operated by the human operator. The human operator is referred to herein as a "robot supervisor," and can use various software-based tools to inform the robotic device of information regarding its surrounding environment and/or instruct the robotic device to perform certain actions. These actions can include, for example, navigation behaviors, manipulation behaviors, head behaviors, sounds, lights, etc. The robot supervisor can control the robotic device to collect information during learning or execution of an action and/or to tag certain behavior as positive or negative behavior such that the robotic device can use that information to improve its ability to arbitrate among different actions or to execute a particular action in the future.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
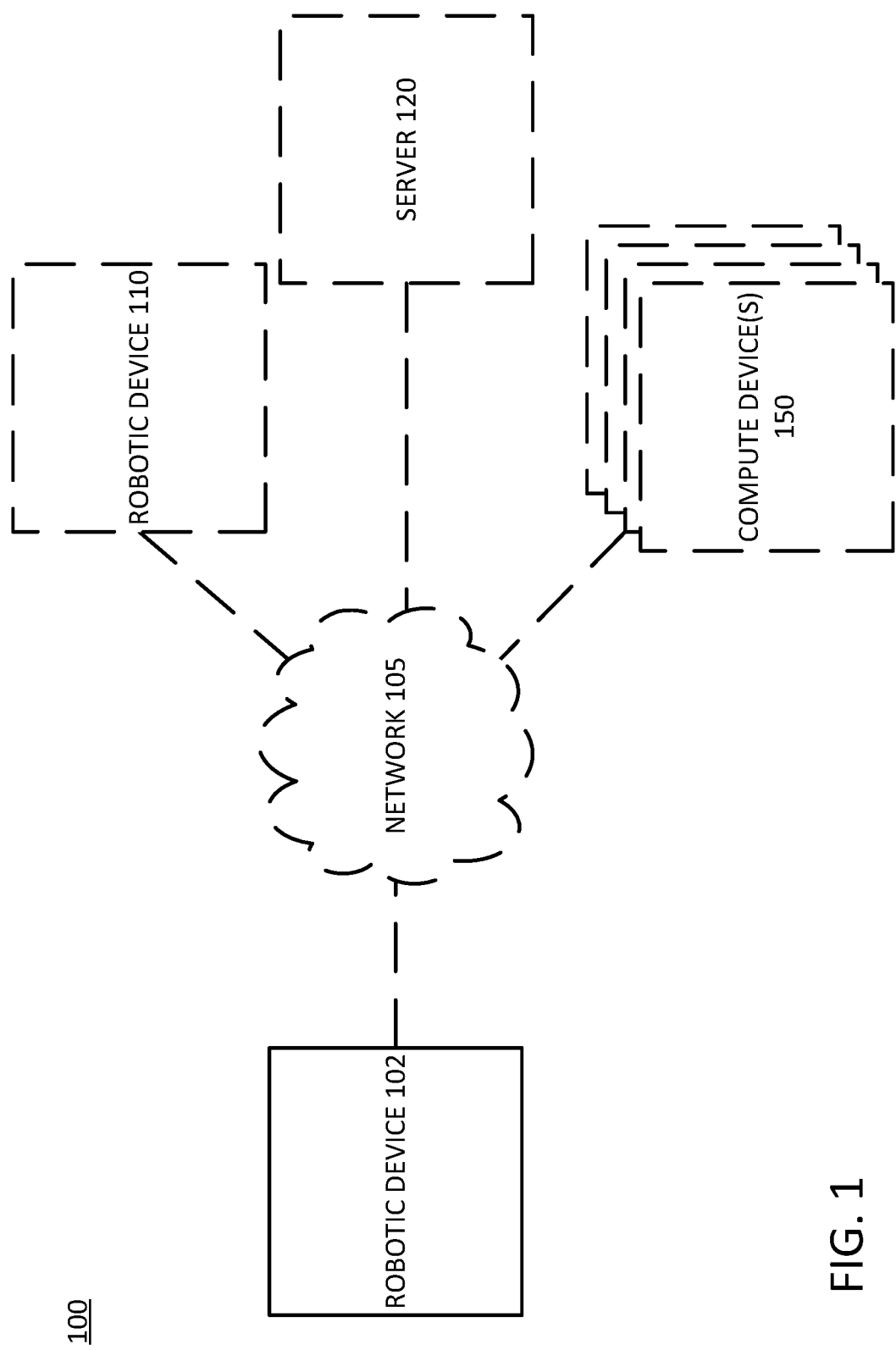
FIG. 1 is a block diagram illustrating a configuration of system including a robotic device, according to some embodiments.

Systems, apparatus, and methods are described herein for robotic learning and execution of skills. In some embodiments, systems, apparatus, and methods described herein relate to a robotic apparatus capable of learning skills via human demonstrations and interactions and executing learned skills in unstructured environments.

Overview

In some embodiments, systems, apparatus, and methods described herein relate to robots that can learn skills (e.g., manipulation skills) via a Learning from Demonstration ("LfD") process, in which a human demonstrates an action to the system via kinesthetic teaching (e.g. the human guides the robot through the action physically and/or by remote control) and/or the human's own performance of the action. Such systems, apparatus, and methods do not require a robot to be pre-programmed with manipulation skills, but rather the robot is designed to be adaptive and capable of learning skills via observations. For example, a robot can use machine-learning techniques to acquire and execute a manipulation skill. After learning a skill, the robot can execute the skill in different environments. The robot can learn and/or execute a skill based on visual data (e.g., perceived visual information). Alternatively or additionally, the robot can learn and/or execute the skill using haptic data (e.g., torque, forces, and other non-visual information). Robotic learning can take place at a factory prior to robot deployment, or onsite (e.g., at a hospital) after robot deployment. In some embodiments, a robot can be taught a skill and/or adapted to operate in an environment by users who are not trained in robotics and/or programming. For example, the robot can have a learning algorithm that leverages natural human behavior, and can include tools that can guide a user through the demonstration process.

In some embodiments, a robot can be designed to interact with humans and collaborate with humans to perform tasks. In some embodiments, a robot can use common social behavior to act in a socially predictable and acceptable manner around humans. Robots that are mobile can also be designed to navigate within an environment while interacting with humans in that environment. For example, a robot can be programmed to voice certain phrases to navigate around humans, to move aside to allow humans to pass, and to use eye gaze to communicate intentionality during navigation. In some embodiments, a robot can have sensors that enable it to perceive and track humans in the environment around it, and to use that information to trigger eye gaze and other social behaviors.

In some embodiments, a robot can be designed to propose options for achieving a goal or performing an action during a LfD process. For example, a robot can propose a few different options for achieving a goal (e.g., picking up an object), and can indicate which of those options is most likely to be effective and/or efficient at achieving the goal. In some embodiments, a robot can adapt a skill based on inputs by a user, e.g., a user indicating relevant features to include in a skill model.

In some embodiments, a robotic device can be capable of learning and/or executing skills in an unstructured environment, e.g., a dynamic and/or human environment, where the robotic device does not have complete information of the environment beforehand. Unstructured environments can include, for example, indoor and outdoor settings, and can include one or more humans or other objects that are movable within the environment. Since most natural or real-world environments are unstructured, robotic devices that can adapt and operate in an unstructured environment, such as robotic devices and/or systems described herein, can offer significant improvements over existing robotic devices that are incapable of adapting to an unstructured environment. Unstructured environments can include indoor settings (e.g., buildings, offices, houses, rooms, etc.) and/or other types of enclosed spaces (e.g., airplanes, trains, and/or other types of movable compartments), as well as outdoor settings (e.g., parks, beaches, outside yards, fields). In an embodiment, robotic devices described herein can operate in an unstructured hospital environment.

FIG. 1 is a high-level block diagram that illustrates a system 100, according to some embodiments. System 100 can be configured to learn and execute skills, such as, for example, manipulation skills in an unstructured environment. System 100 can be implemented as a single device, or be implemented across multiple devices that are connected to a network 105. For example, as depicted in FIG. 1, system 100 can include one or more compute devices, such as, for example, one or more robotic devices 102 and 110, a server 120, and additional compute device(s) 150. While four devices are shown, it should be understood that system 100 can include any number of compute devices, including compute devices not specifically shown in FIG. 1.

Network 105 can be any type of network (e.g., a local area network (LAN), a wide area network (WAN), a virtual network, a telecommunications network) implemented as a wired network and/or wireless network and used to operatively couple compute devices, including robotic devices 102 and 110, server 120, and compute device(s) 150. As described in further detail herein, in some embodiments, for example, the compute devices are computers connected to each other via an Internet Service Provider (ISP) and the Internet (e.g., network 105). In some embodiments, a connection can be defined, via network 105, between any two compute devices. As shown in FIG. 1, for example, a connection can be defined between robotic device 102 and any one of robotic device 110, server 120, or additional compute device(s) 150. In some embodiments, the compute devices can communicate with each other (e.g., send data to and/or receive data from) and with the network 105 via intermediate networks and/or alternate networks (not shown in FIG. 1). Such intermediate networks and/or alternate networks can be of a same type and/or a different type of network as network 105. Each compute device can be any type of device configured to send data over the network 105 to send and/or receive data from one or more of the other compute devices.

Figure 2:
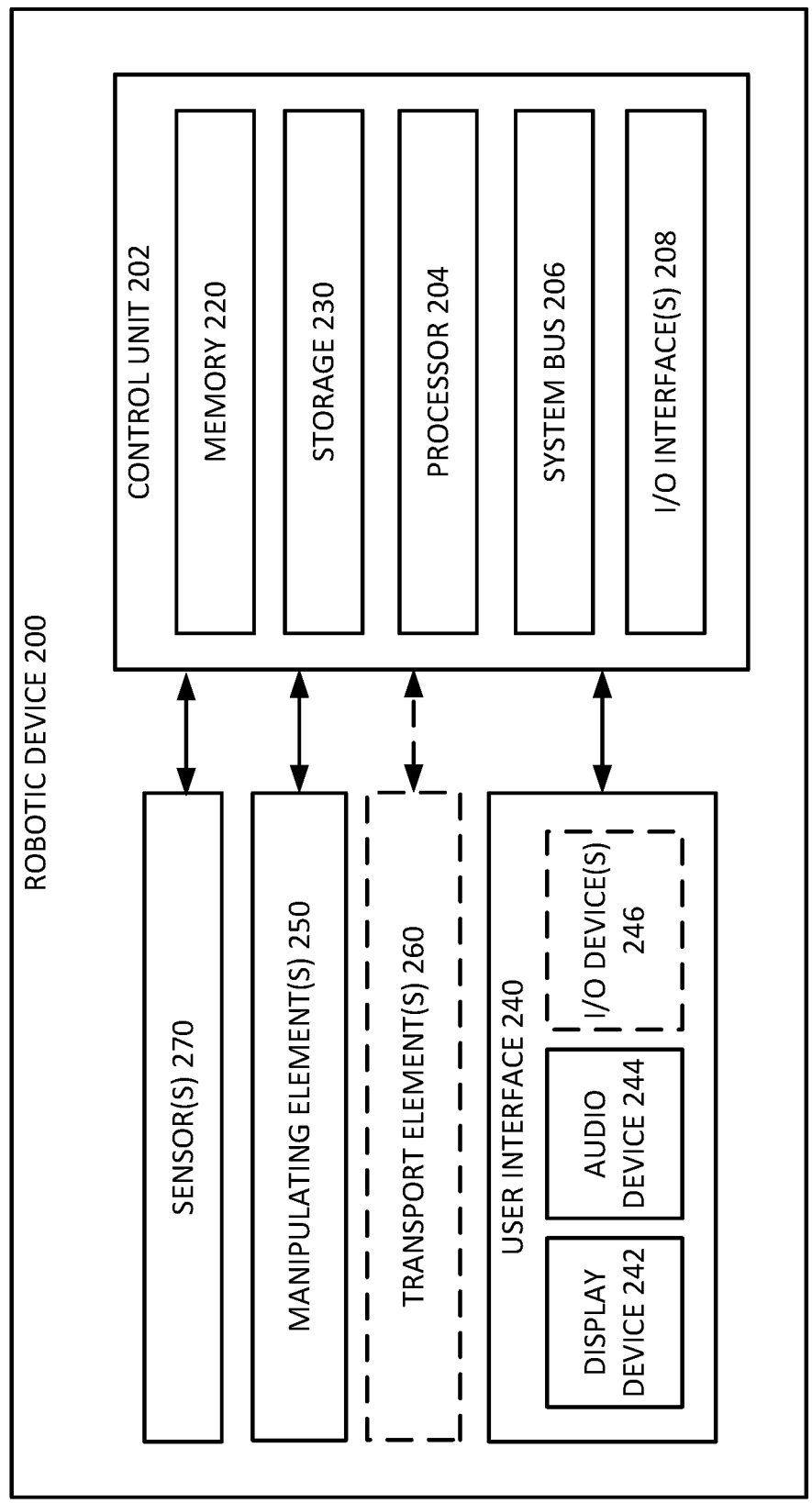
FIG. 2 is a block diagram illustrating a configuration of a robotic device, according to some embodiments.

In some embodiments, system 100 includes a single robotic device, e.g., robotic device 102. Robotic device 102 can be configured to perceive information about an environment, learn skills via human demonstration and interactions, interact with the environment and/or learn environmental constraints via human demonstrations and inputs, and/or execute those skills in the environment. In some embodiments, robotic device 102 can engage in self-exploration and/or request user input to learn additional information with respect to a skill and/or environment. A more detailed view of an example robotic device is depicted in FIG. 2.

In other embodiments, system 100 includes multiple robotic devices, e.g., robotic devices 102 and 110. Robotic device 102 can send and/or receive data to and/or from robotic device 110 via network 105. For example, robotic device 102 can send information that it perceives about an environment (e.g., a location of an object) to robotic device 110, and can receive information about the environment from robotic device 110. Robotic devices 102 and 110 can also send and/or receive information to and/or from one another to learn and/or execute a skill. For example, robotic device 102 can learn a skill in an environment and send a model representing that learned skill to robotic device 110, and robotic device 110, upon receiving that model, can use it to execute the skill in the same or a different environment. Robotic device 102 can be in a location that is the same as or different from robotic device 110. For example, robotic devices 102 and 110 can be located in the same room of a building (e.g., a hospital building) such that they can learn and/or execute a skill together (e.g., moving a heavy or large object). Alternatively, robotic device 102 can be located on a first floor of a building (e.g., a hospital building), and robotic device 110 can be located on a second floor of a building, and the two can communicate with one another to relay information about the different floors to one another (e.g., where objects are located on those floors, where a resource may be, etc.).

In some embodiments, system 100 includes one or more robotic devices, e.g., robotic device 102 and/or 110, and a server 120. Server 120 can be a dedicated server that manages robotic device 102 and/or 110. Server 120 can be in a location that is the same as or different from robotic device 102 and/or 110. For example, server 120 can be located in the same building as one or more robotic devices (e.g., a hospital building), and be managed by a local administrator (e.g., a hospital administrator). Alternatively, server 120 can be located at a remote location (e.g., a location associated with a manufacturer or provider of the robotic device).

In some embodiments, system 100 includes one or more robotic devices, e.g., robotic device 102 and/or 110, and an additional compute device 150. Compute device 150 can be any suitable processing device configured to run and/or execute certain functions. In a hospital setting, for example, a compute device 150 can be a diagnostic and/or treatment device that is capable of connecting to network 105 and communicating with other compute devices, including robotic device 102 and/or 110.

In some embodiments, one or more robotic devices, e.g., robotic device 102 and/or 110, can be configured to communicate via network 105 with a server 120 and/or compute device 150. Server 120 can include component(s) that are remotely situated from the robotic devices and/or located on premises near the robotic devices. Compute device 150 can include component(s) that are remotely situated from the robotic devices, located on premises near the robotic devices, and/or integrated into a robotic device. Server 120 and/or compute device 150 can include a user interface that enables a user, referred to as a robot supervisor, to control the operation of the robotic devices. For example, the user can interrupt and/or modify the execution of one or more actions performed by the robotic devices. These actions can include, for example, navigation behaviors, manipulation behaviors, head behaviors, sounds/lights, and/or other components of a robotic device. In some embodiments, the robot supervisor can remotely monitor the robotic devices and control their operation for safety reasons. For example, the robot supervisor can command a robotic device to stop or modify an execution of an action to avoid endangering a human or causing damage to the robotic device or another object in an environment. In some embodiments, a robotic device can be configured to solicit user intervention at specific points during its execution of an action. For example, the robotic device can solicit user intervention at points when the robotic device cannot confirm certain information about itself and/or environment around itself, when the robotic device cannot determine a trajectory for completing an action or navigating to a specific location, when the robotic device has been programmed in advance to solicit user input (e.g., during learning using an interactive learning template, as further described below), etc. In some embodiments, a robotic device can request feedback from a user at specific points during learning and/or execution. For example, the robotic device can prompt a user to specify what information it should collect (e.g., information associated with a manipulation element or a transport element, information associated with the surrounding environment) and/or when to collect information (e.g., the timing of keyframes during a demonstration). Alternatively or additionally, the robotic device can request that a user tag the robotic device's past or current behavior in a specific context as a positive or negative example of an action. The robotic device can be configured to use this information to improve future execution of the action in the specific context.

Systems and Devices

FIG. 2 schematically illustrates a robotic device 200, according to some embodiments. Robotic device 200 includes a control unit 202, a user interface 240, at least one manipulating element 250, and at least one sensor 270. Additionally, in some embodiments, robotic device 200 optionally includes at least one transport element 260. Control unit 202 includes a memory 220, a storage 230, a processor 204, a system bus 206, and at least one input/output interface ("I/O interface") 208. Memory 220 can be, for example, a random access memory (RAM), a memory buffer, a hard drive, a database, an erasable programmable read-only memory (EPROM), an electrically erasable read-only memory (EEPROM), a read-only memory (ROM), and/or so forth. In some embodiments, memory 220 stores instructions that cause processor 204 to execute modules, processes, and/or functions associated with scanning or viewing an environment, learning a skill, and/or executing a skill. Storage 230 can be, for example, a hard drive, a database, a cloud storage, a network-attached storage device, or other data storage device. In some embodiments, storage 230 can store, for example, sensor data including state information regarding one or more components of robotic device 200 (e.g., manipulating element 250), learned models, marker location information, etc.

Processor 204 of control unit 202 can be any suitable processing device configured to run and/or execute functions associated with viewing an environment, learning a skill, and/or executing a skill. For example, processor 204 can be configured to generate a model for a skill based on sensor information, or execute a skill by generating, using a model, a trajectory for performing a skill, as further described herein. More specifically, processor 204 can be configured to execute modules, functions, and/or processes. In some embodiments, processor 204 can be a general purpose processor, a Field Programmable Gate Array (FPGA), an Application Specific Integrated Circuit (ASIC), a Digital Signal Processor (DSP), and/or the like.

System bus 206 can be any suitable component that enables processor 204, memory 220, storage 230, and/or other components of control unit 202 to communicate with each other. I/O interface(s) 208, connected to system bus 206, can be any suitable component that enables communication between internal components of control unit 202 (e.g., processor 204, memory 220, storage 230) and external input/output devices, such as user interface 240, manipulating element(s) 250, transport element(s) 260, and sensor(s) 270.

User interface 240 can include one or more components that are configured to receive inputs and send outputs to other devices and/or a user operating a device, e.g., a user operating robotic device 200. For example, user interface 240 can include a display device 242 (e.g., a display, a touch screen, etc.), an audio device 244 (e.g., a microphone, a speaker), and optionally one or more additional input/output device(s) ("I/O device(s)") 246 configured for receiving an input and/or generating an output to a user.

Figure 4:
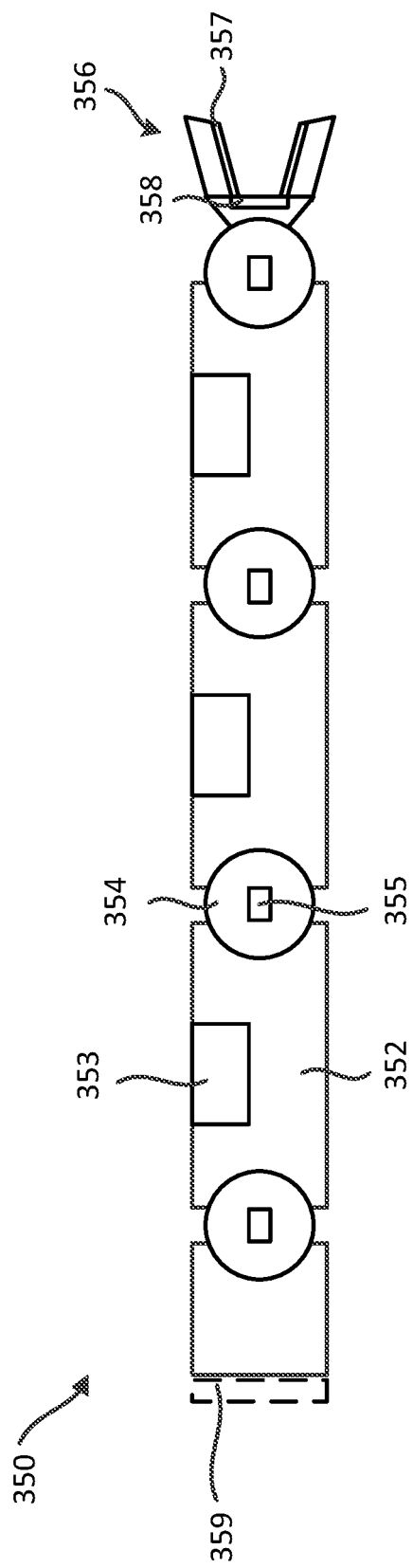
FIG. 4 is a schematic illustration of a manipulating element of a robotic device, according to some embodiments.

Manipulating element(s) 250 can be any suitable component that is capable of manipulating and/or interacting with a stationary and/or moving object, including, for example, a human. Manipulating element(s) 250 can include a plurality of segments that are coupled to one another via joints that can provide for translation along and/or rotation about one or more axes. Manipulating element(s) 250 can optionally include an end effector that can engage with and/or otherwise interact with objects in an environment. For example, manipulating element can include a gripping mechanism that can releasably engage (e.g., grip) objects in the environment to pick up and/or transport the objects. Other examples of end effectors include, for example, vacuum engaging mechanism(s), magnetic engaging mechanism(s), suction mechanism(s), and/or combinations thereof. In some embodiments, one or more manipulating element(s) 250 can be retractable into a housing of the robotic device 200 when not in use to reduce one or more dimensions of the robotic device. In some embodiments, manipulating element(s) 250 can include a head or other humanoid component configured to interact with an environment and/or one or more objects within the environment, including humans. A detailed view of an example manipulating element is depicted in FIG. 4.

Transport element(s) 260 can be any suitable components configured for movement such as, for example, a wheel or a track. One or more transport element(s) 260 can be provided on a base portion of robotic device 200 to enable robotic device 200 to move around an environment. For example, robotic device 200 can include a plurality of wheels that enable it to navigate around a building, such as, for example, a hospital. Transport element(s) 260 can be designed and/or dimensioned to facilitate movement through tight and/or constrained spaces (e.g., small hallways and corridors, small rooms such as supply closets, etc.). In some embodiments, transport element(s) 260 can be rotatable about an axis and/or movable relative to one another (e.g., along a track). In some embodiments, one or more transport element(s) 260 can be retractable into a base of the robotic device 200 when not in use to reduce one or more dimensions of the robotic device.

Sensor(s) 270 can be any suitable component that enables robotic device 200 to capture information about the environment and/or objects in the environment around robotic device 200. Sensor(s) 270 can include, for example, image capture devices (e.g., cameras, such as a red-green-blue-depth (RGB-D) camera or a webcam), audio devices (e.g., microphones), light sensors (e.g., light detection and ranging or lidar sensors, color detection sensors), proprioceptive sensors, position sensors, tactile sensors, force or torque sensors, temperature sensors, pressure sensors, motion sensors, sound detectors, etc. For example, sensor(s) 270 can include at least one image capture device such as a camera for capturing visual information about objects and the environment around robotic device 200. In some embodiments, sensor(s) 270 can include haptic sensors, e.g., sensors that can convey forces, vibrations, touch, and other non-visual information to robotic device 200.

In some embodiments, robotic device 200 can be have humanoid features, e.g., a head, a body, arms, legs, and/or a base. For example, robotic device 200 can include a face with eyes, a nose, a mouth, and other humanoid features. These humanoid feature can form and/or be part of one or more manipulating element(s). While not schematically depicted, robotic device 200 can also include actuators, motors, couplers, connectors, power sources (e.g., an onboard battery), and/or other components that link, actuate, and/or drive different portions of robotic device 200.

Figure 3:
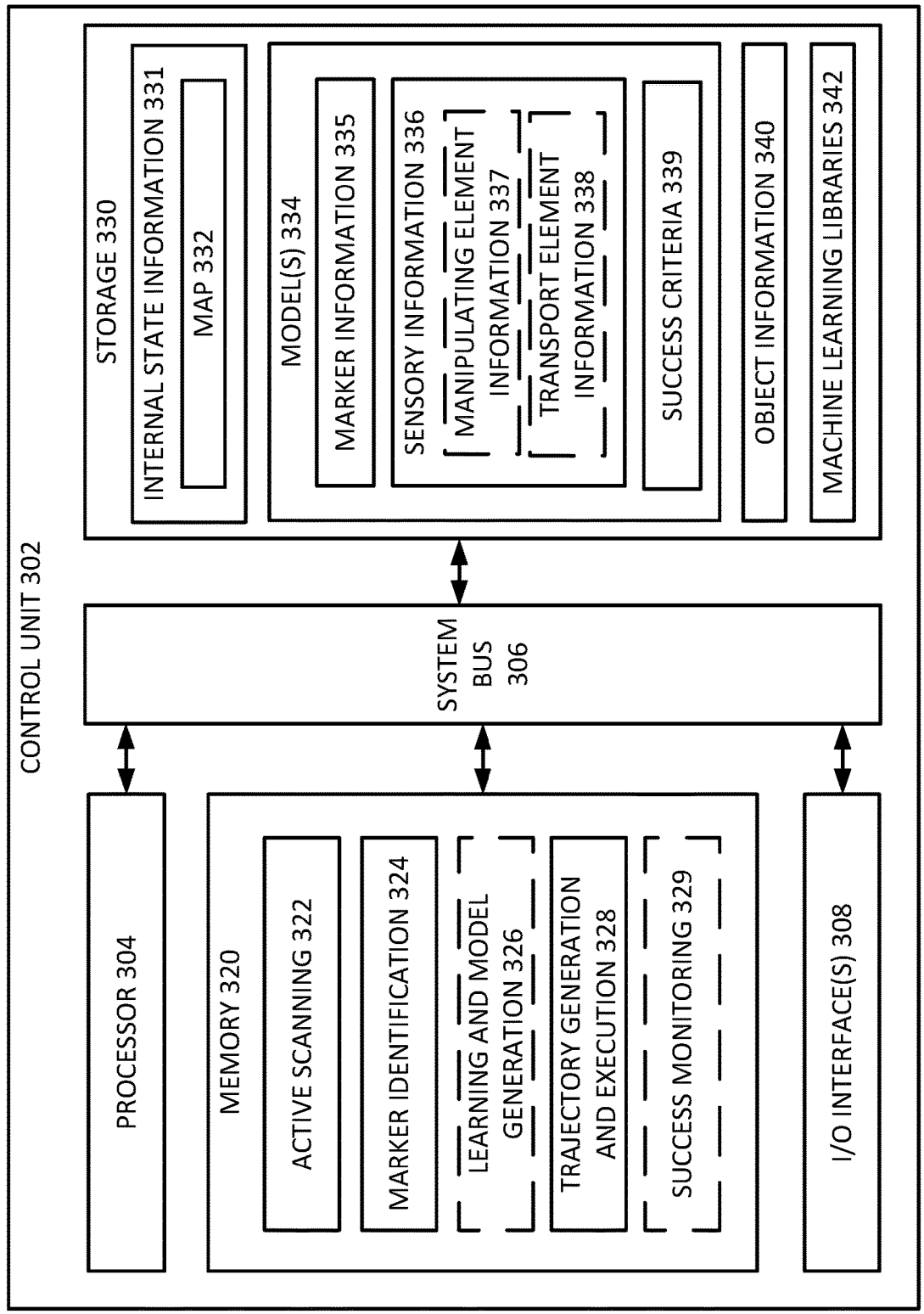
FIG. 3 is a block diagram illustrating a configuration of a control unit associated with a robotic device, according to some embodiments.

FIG. 3 is a block diagram that schematically illustrates a control unit 302, according to some embodiments. Control unit 302 can include similar components as control unit 202, and can be structurally and/or functionally similar to control unit 202. For example, control unit 302 includes a processor 304, a memory 320, I/O interface(s) 308, a system bus 306, and a storage 330, which can be structurally and/or functionally similar to processor 204, memory 220, I/O interface(s) 208, system bus 206, and storage 230, respectively.

Memory 320 stores instructions that can cause processor 304 to execute modules, processes, and/or functions, illustrated as active scanning 322, marker identification 324, learning and model generation 326, trajectory generation and execution 328, and success monitoring 329. Active scanning 322, marker identification 324, learning and model generation 326, trajectory generation and execution 328, and success monitoring 329 can be implemented as one or more programs and/or applications that are tied to hardware components (e.g., a sensor, a manipulating element, an I/O device, a processor, etc.). Active scanning 322, marker identification 324, learning and model generation 326, trajectory generation and execution 328, and success monitoring 329 can be implemented by one robotic device or multiple robotic devices. For example, a robotic device can be configured to implement active scanning 322, marker identification 324, and trajectory generation and execution 328. As another example, a robotic device can be configured to implement active scanning 322, marker identification 324, optionally learning and model generation 326, and trajectory generation and execution 328. As another example, a robotic device can be configured to implement active scanning 322, marker identification 324, trajectory generation and execution 328, and optionally success monitoring 329. While not depicted, memory 320 can also store programs and/or applications associated with an operating system, and general robotic operations (e.g., power management, memory allocation, etc.).

Storage 330 stores information relating to skill learning and/or execution. Storage 330 stores, for example, internal state information 331, model(s) 334, object information 340, and machine learning libraries 342. Internal state information 331 can include information regarding a state of a robotic device (e.g., robotic device 200) and/or an environment in which the robotic device is operating (e.g., a building, such as, for example, a hospital). In some embodiments, state information 331 can indicate a location of the robotic device within the environment, such as, for example, a room, a floor, an enclosed space, etc. For example, state information 331 can include a map 332 of the environment, and indicate a location of the robotic device within that map 332. State information 331 can also include the location(s) of one or more objects (or markers representing and/or associated with objects) within the environment, e.g., within map 332. Thus, state information 331 can identify a location of a robotic device relative to one or more objects. Objects can include any type of physical object that is located within the environment, including objects that define a space or an opening (e.g., surfaces or walls that define a doorway). Objects can be stationary or mobile. Examples of objects in an environment, such as, for example, a hospital, include equipment, supplies, instruments, tools, furniture, and/or humans (e.g., nurses, doctors, patients, etc.).

Figure 19:
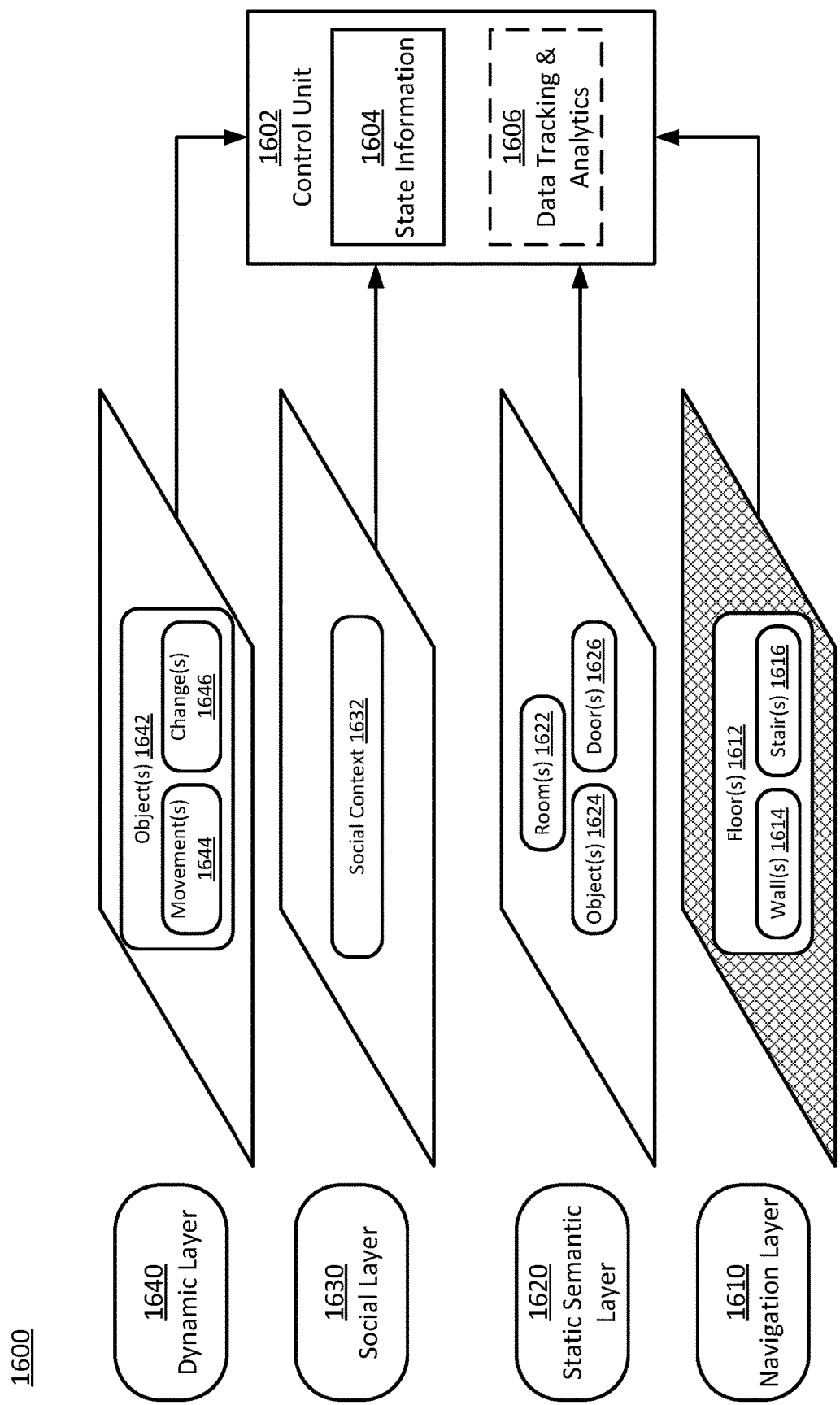
FIG. 19 is a schematic illustration of layers of a map of an environment generated by a robotic device, according to some embodiments.

In some embodiments, state information 331 can include a representation or map of the environment, such as depicted in FIG. 19. The map of the environment can include, for example, a navigation layer, a static semantic layer, a social layer, and a dynamic layer. Information learned by a robotic device, e.g., from demonstrations, user input, perceived sensor information, etc., can feed into the different layers of the map and be organized for future reference by the robotic device (and/or other robotic devices). For example, a robotic device may rely on information learned about different objects within an environment (e.g., a door) to decide how to arbitrate between different behaviors (e.g., waiting for a door to a tight doorway to be opened before going through the doorway, seeking assistance to open a door before going through a tight doorway), as further described herein.

Object information 340 can include information relating to physical object(s) in an environment. For example, object information can include information identifying or quantifying different features of an object, such as, for example, location, color, shape, and surface features. Object information can also identify codes, symbols, and other markers that are associated with a physical object, e.g., Quick Response or "QR" codes, barcodes, tags, etc. In some embodiments, object information can include information characterizing an object within the environment, e.g., a doorway or hallway as being tight, a door handle as being a type of door handle, etc. Object information can enable control unit 302 to identify physical object(s) in the environment.

State information 331 and/or object information 340 can be examples of environmental constraints, as used and described herein. Environmental constraints can include information regarding an environment that can be presented or viewed in various dimensions. For example, environmental constraints can vary across location, time, social interactions, specific contexts, etc. A robotic device can learn environmental constraints from user inputs, demonstrations of a skill, interactions with an environment, self-exploration, execution of skills, etc.

Machine learning libraries 342 can include modules, processes, and/or functions relating to different algorithms for machine learning and/or model generation of different skills. In some embodiments, machine learning libraries can include methods such as Hidden Markov Models or "HMMs." An example of an existing machine learning library in Python is scikit-learn. Storage 330 can also include additional software libraries relating to, for example, robotics simulation, motion planning and control, kinematics teaching and perception, etc.

Model(s) 334 are models that have been generated for performing different actions, and represent skills that have been learned by a robotic device. In some embodiments, each model 334 is associated with a set of markers that are tied to different physical objects in an environment. Marker information 335 can indicate which markers are associated with a particular model 334. Each model 334 can also be associated with sensory information 336 that is collected, e.g., via one or more sensors of a robotic device, during kinesthetic teaching and/or other demonstrations of a skill. Sensory information 336 can optionally include manipulating element information 337 associated with a manipulating element of a robotic device as it performs an action during a demonstration. Manipulating element information 337 can include, for example, joint configurations, end effector positions and configurations, and/or forces and torques acting on joints and/or end effectors. Manipulating element information 337 can be recorded at specific points during a demonstration and/or execution of a skill (e.g., keyframes), or alternatively, throughout a demonstration and/or execution of a skill. Sensory information 336 can also include information associated with an environment in which a skill is demonstrated and/or executed, e.g., location of markers in the environment. In some embodiments, each model 334 can be associated with success criteria 339. Success criteria 339 can be used to monitor the execution of a skill. In some embodiments, success criteria 339 can include information associated with visual and haptic data that are perceived using one or more sensors, e.g., cameras, force/torque sensors, etc. Success criteria 339 can be, for example, tied to visually detecting movement of an object, sensing a force that is acting on a component of the robotic device (e.g., a weight from an object), sensing an engagement between a component of the robotic device and an object (e.g., a change in pressure or force acting on a surface), etc. Examples of using haptic data in robotic learning of manipulation skills is described in the article entitled "Learning Haptic Affordances from Demonstration and Human-Guided Exploration," authored by Chu et. al., published in 2016 IEEE Haptics Symposium (HAPTICS), Philadelphia, Pa., 2016, pp. 119-125, accessible at http://ieeexplore.ieee-.org/document/7463165/, incorporated herein by reference. Examples of using visual data in robotic learning of manipulating skills is described in the article entitled "Simultaneously Learning Actions and Goals from Demonstration," authored by Akgun et al., published in Autonomous Robots, Volume 40, Issue 2, February 2016, pp. 211-227, accessible at https://doi org/10.1007/s10514-015-9448-x ("Akgun article"), incorporated herein by reference.

Optionally, sensory information 336 can include transport element information 338. Transport element information 338 can be associated with movements of a transport element (e.g., transport element(s) 260) of a robotic device as the robotic device undergoes a demonstration of a skill (e.g., navigation through a doorway, transport of an object, etc.). Transport element information 338 can be recorded at specific points during a demonstration and/or execution of a skill, such as at keyframes associated with the skill, or alternatively, through a demonstration and/or execution of a skill.

In some embodiments, an initial set of environmental constraints (e.g., state information 331, object information 340, etc.) and/or skills (e.g., model(s) 334) can be provided to a robotic device, e.g., via a remote administrator or supervisor. The robotic device can adapt and/or add to its knowledge of environmental constraints and/or skills based on its own interactions, demonstrations, etc. with an environment and/or via additional user input. Alternatively or additionally, a robot supervisor can update the robotic device's knowledge of environmental constraints and/or skills based on new information collected by the robotic device or other robotic device(s) (e.g., other robotic device(s) within similar or the same environment, e.g., a hospital) and/or provided to the robotic supervisor by external parties (e.g., suppliers, administrators, manufacturers, etc.). Such updates can be periodically and/or continuously provided, as new information about an environment or skill is provided to the robotic device and/or robot supervisor.

FIG. 4 schematically illustrates a manipulating element 350, according to some embodiments. Manipulating element 350 can form a part of a robotic device, such as, for example, robotic device 102 and/or 200. Manipulating element 350 can be implemented as an arm that includes two or more segments 352 coupled together via joints 354. Joints 354 can allow one or more degrees of freedom. For example, joints 354 can provide for translation along and/or rotation about one or more axes. In an embodiment, manipulating element 350 can have seven degrees of freedom provided by joints 354. While four segments 352 and four joints 354 are depicted in FIG. 4, one of ordinary skill in the art would understand that a manipulating element can include a different number of segments and/or joints.

Manipulating element 350 includes an end effector 356 that can be used to interact with objects in an environment. For example, end effector 356 can be used to engage with and/or manipulate different objects. Alternatively or additionally, end effector 356 can be used to interact with movable or dynamic objects, including, for example, humans. In some embodiments, end effector 356 can be a gripper that can releasably engage or grip one or more objects. For example, end effector 356 implemented as a gripper can pick up and move an object from a first location (e.g., a supply closet) to a second location (e.g., an office, a room, etc.).

A plurality of sensors 353, 355, 357, and 358 can be disposed on different components of manipulating element 350, e.g., segments 352, joints 354, and/or end effector 356. Sensors 353, 355, 357, and 358 can be configured to measure sensory information, including environmental information and/or manipulating element information.

Examples of sensors include position encoders, torque and/or force sensors, touch and/or tactile sensors, image capture devices such as cameras, temperature sensors, pressure sensors, light sensors, etc. In some embodiments, sensor 353 disposed on a segment 352 can be a camera that is configured to capture visual information about an environment. In some embodiments, sensor 353 disposed on a segment 352 can be an accelerometer configured to enable measurement of an acceleration, and/or calculation of speed of movement, and/or a position, of segment 352. In some embodiments, sensor 355 disposed on a joint 354 can be a position encoder configured to measure a position and/or configuration of joint 354. In some embodiments, sensor 355 disposed on a joint 354 can be a force or torque sensor configured to measure a force or torque applied to joint 354. In some embodiments, sensor 358 disposed on end effector 356 can be a position encoder and/or a force or torque sensor. In some embodiments, sensor 357 disposed on end effector 356 can be a touch or tactile sensor configured to measure an engagement between end effector 356 and an object in the environment. Alternatively or additionally, one or more of sensors 353, 355, 357, and 358 can be configured to record information about one or more objects and/or markers in the environment. For example, sensor 358 disposed on end effector 356 can be configured to track a location of an object in the environment and/or a position of the object relative to end effector 356. In some embodiments, one or more of sensors 353, 355, 357, and 358 can also track whether an object, such as a human, has moved in the environment. Sensors 353, 355, 357, and 358 can send the sensory information that they record to a compute device located on a robotic device (e.g., an onboard control unit such as, for example, control unit 202 and/or 302), or sensors 353, 355, 357, and 358 can send the sensory information to a remote compute device (e.g., a server such as, for example, server 120).

Figure 5:
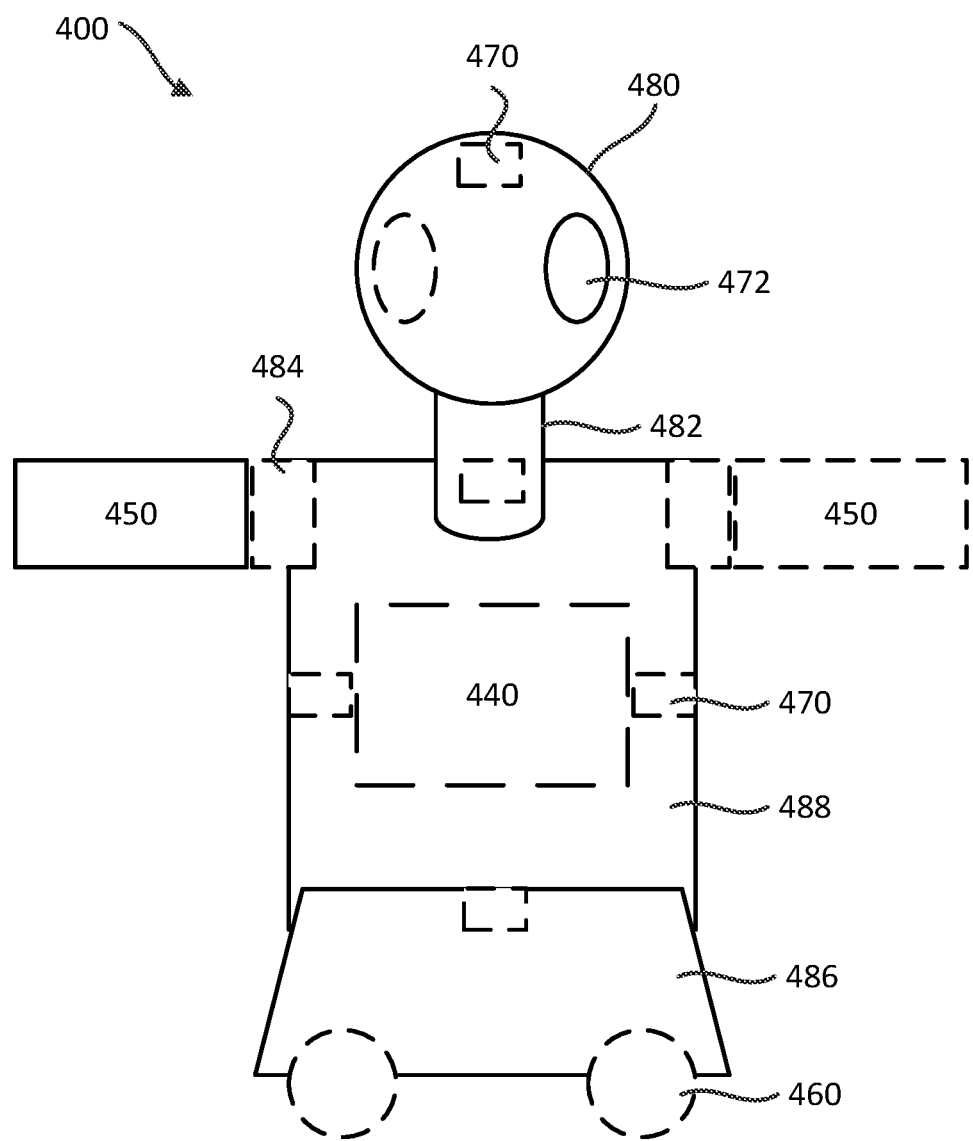
FIG. 5 is a schematic illustration of a robotic device, according to some embodiments.

Manipulating element 350 can optionally include a coupling element 359 that enables manipulating element 350 to be releasably coupled to a robotic device, such as any of the robotic devices described herein. In some embodiments, manipulating element 350 can be coupled to a fixed location of the robotic device and/or be capable of being coupled to multiple locations of the robotic device (e.g., a right side or a left side of a body of robotic device, as shown in FIG. 5). Coupling element 359 can include any type of mechanism that can couple manipulating element 350 to the robotic device, such as, for example, a mechanical mechanism (e.g., a fastener, a latch, a mount), a magnetic mechanism, a friction fit, etc.

Figure 20:
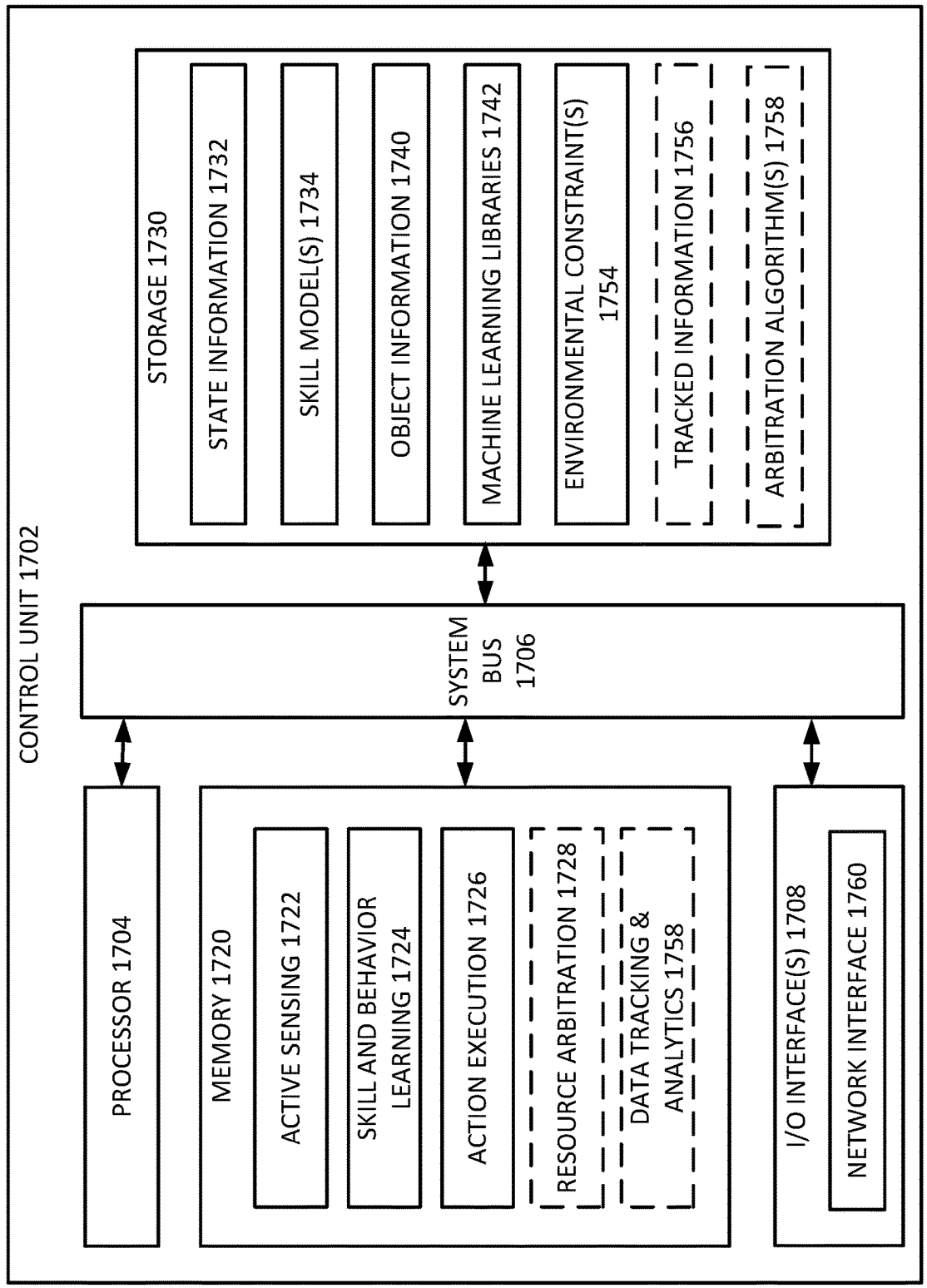
FIG. 20 is a block diagram illustrating a configuration of a control unit associated with a robotic device, according to some embodiments.

FIG. 20 is a block diagram that schematically illustrates a control unit 1702 of a robotic system, according to some embodiments. The control unit 1702 can include similar components as other control units described herein (e.g., control units 202 and/or 302). For example, the control unit 1702 includes a processor 1704, a memory 1720, I/O interface(s) 1708, a system bus 1706, and a storage 1730, which can be structurally and/or functionally similar to the processor, memory, I/O interface(s), system bus, and storage of control units 202 and/or 302, respectively. Control unit 1702 can be located on a robotic device and/or at a remote server that is connected to one or more robotic devices.

Memory 1720 stored instructions that can cause processor 1704 to execute modules, processes, and/or functions, including active sensing 1722, skill and behavior learning 1724, and action execution 1726, and optionally resource arbitration 1728 and data tracking & analytics 1758. Active sensing 1722, skill and behavior learning 1724, action execution 1726, resource arbitration 1728, and data tracking & analytics 1758 can be implemented as one or more programs and/or applications that are tied to hardware components (e.g., a sensor, a manipulating element, a I/O device, a processor, etc.). Active sensing 1722, skill and behavior learning 1724, action execution 1726, resource arbitration 1728, and data tracking & analytics 1758 can be implemented by one robotic device or multiple robotic devices. In an embodiment, active sensing 1722 can include active scanning of an environment, as described herein. In other embodiments, active sensing 1722 can include scanning of an environment and/or sensing or perceiving information associated with the environment, object(s) within the environment (e.g., including humans within the environment), and/or one or more conditions associated with a robotic device or system.

Similar to storage 330, storage 1730 stores information relating to an environment and/or objects within the environment, and learning and/or execution of skills (e.g., tasks and/or social behaviors). Storage 1730 stores, for example, state information 1732, skill model(s) 1734, object information 1740, machine learning libraries 1742, and/or environmental constraint(s) 1754. Optionally, storage 1730 can also store tracked information 1756 and/or arbitration algorithm(s) 1758.

State information 1732 includes information regarding a state of a robotic device (such as any of the robotic devices described herein) and/or an environment in which the robotic device is operating. In some embodiments, state information 1732 can include a map of the environment, along with additional static and/or dynamic information associated with objects within the environment. For example, state information 1732 can include a navigational map of a building, along with static and/or dynamic information regarding objects (e.g., supplies, equipment, etc.) within the building and social context information associated with humans and/or social settings within the building. FIG. 19 provides a schematic view of an example map or representation 1600 of a building. Representation 1600 includes a navigation layer 1610, a static semantic layer 1620, a social layer 1630, and a dynamic layer 1640. Navigation layer 1610 provides a general layout or map of the building, which may identify a number of floor(s) 1612 with wall(s) 1614, stair(s) 1616, and other elements built into the building (e.g., hallways, openings, boundaries). Static semantic layer 1620 identifies objects and/or spaces within the building, such as room(s) 1622, object(s) 1624, door(s) 1626, etc. Static semantic layer 1620 can identify which room(s) 1622 or other spaces are accessible or not accessible to a robotic device. In some embodiments, static semantic layer 1620 can provide a three dimensional map of the objects located within a building. Social layer 1630 provides social context information 1632. Social context information 1632 includes information associated with humans within the building, such as past interactions between robotic device(s) and human(s). Social context information 1632 can be used to track interactions between robotic device(s) and human(s), which can be used to generate and/or adapt existing models of skills involving one or more interactions between a robotic device and a human. For example, social context information 1632 can indicate that a human is typically located at a particular location, such that a robotic device having knowledge of that information can adapt its execution of a skill that would require the robotic device to move near the location of the human. Dynamic layer 1640 provides information on object(s) and other elements within a building that may move and/or change over time. For example, dynamic layer 1640 can track movement(s) 1644 and/or change(s) 1646 associated with object(s) 1642. In an embodiment, dynamic layer 1640 can monitor the expiration date of an object 1642 and identify when that object 1642 has expired.

Representation 1600 can be accessible to and/or managed by a control unit 1602, e.g., of a robotic device. Control unit 1602 can include similar components as other control units described herein (e.g., control units 202, 302, and/or 1702). Control unit 1602 can include a storage (similar to other storage elements described herein, such as, for example, storage 330 and/or 1730) that stores state information 1604, including representation 1600 as well as information associated with one or more robotic devices (e.g., a configuration of an element of a robotic device, a location of the robotic device in a building, etc.). Control unit 1602 can be located on a robotic device and/or at a remote server that is connected to one or more robotic devices. Robotic device(s) can be configured to update and maintain state information 1604, including information associated with representation 1600 of the building, as the robotic device(s) collect information on their surrounding environment.

In some embodiments, control unit 1602 can also optionally include a data tracking & analytics element 1606. Data tracking & analytics element 1606 can be, for example, a computing element (e.g., a processor) configured to perform data tracking and/or analytics of the information collected by one or more robotic devices, e.g., information contained within representation 1600 and/or other state information 1604. For example, data tracking & analytics element 1606 can be configured to manage inventory, e.g., tracking expiration dates, monitoring and recording the use of inventory items, ordering new inventory items, analyzing and recommending new inventory items, etc. In a hospital setting, data tracking & analytics element 1606 can manage the use and/or maintenance of medical supplies and/or equipment. In some embodiments, data tracking & analytics element 1606 can generate aggregate data displays (e.g., reports, charts, etc.), which can be used to comply with formal laws, regulations, and/or standards. In some embodiments, data tracking & analytics element 1606 can be configured to analyze information associated with humans, such as patients within a hospital. For example, a robotic device can be configured to collect information on patient(s) within a hospital and to pass that information to data tracking & analytics element 1606 to analyze and/or summarize for use in various functions, including, for example, diagnostic tests and/or screening. In some embodiments, data tracking & analytics element 1606 can be configured to access and/or obtain information from third-party systems (e.g., hospital electronic medical records, security system data, insurance data, vendor data, etc.), and use and/or analyze that data, with or without data collected by one or more robotic devices, to perform data tracking and/or analytics functions.

As depicted in FIG. 20, skill model(s) 1734 are models that can be used to learn and/or execute various actions or skills, including tasks and/or behaviors. Model(s) 1734 can be similar to model(s) 334, as described herein with reference to FIG. 3. For example, model(s) 1734 can include information associated with object(s) that are involved in the execution of a skill (e.g., an object that is manipulated by the robotic device, an object that a robotic device interacts with during execution of a skill, an object that a robotic device takes into account while executing a skill). As noted above, examples of objects include stationary and/or mobile objects, such as, for example, supplies, equipment, humans, and/or surfaces that define openings (e.g., doorways). The information associated with the object(s) can include, for example, markers that identify an object and/or features of an object. Additionally or alternatively, model(s) 1734 can include sensory information that is collected by a robotic device, e.g., during learning and/or execution of a skill or active scanning. As described above, sensory information can include information associated with one or more components of a robotic device (e.g., a manipulating element, a transport element), as that robotic device learns and/or executes a skill, and/or information associated with an environment in which a skill is learned and/or executed (e.g., location of object(s) within the environment, social context information, etc.). In some embodiments, a model 1734 can be associated with success criteria, such as, for example, visual and/or haptic data perceived using one or more sensors of a robotic device that indicates a successful execution of a skill.

Object information 1740 can include information relating to physical object(s) (e.g., location, color, shape, surface features, and/or identification codes). Machine learning libraries 1742 can include modules, processes, and/or functions relating to different algorithms for machine learning and/or model generation of different skills.

Environmental constraints 1754 include information associated with objects and/or conditions within an environment that may restrict the operation of a robotic device within the environment. For example, environmental constraints 1754 can include information associated with the size, configuration, and/or location of objects within an environment (e.g., supply bin, room, doorway, etc.), and/or information that indicates that certain areas (e.g., a room, a hallway, etc.) have restricted access. Environmental constraints 1754 may affect the learning and/or execution of one or more actions within an environment. As such, an environmental constraint 1754 may become part of each model for a skill that is executed within a context including the environmental constraint.

Tracked information 1756 includes information associated with a representation of an environment (e.g., representation 1600) and/or information that is obtained from third-party systems (e.g., hospital electronic medical records, security system data, insurance data, vendor data, etc.) that is tracked and/or analyzed, e.g., by a data tracking & analytics element, such as data tracking & analytics element 1606 or processor 1704 executing data tracking & analytics 1758. Examples of tracked information 1756 include inventory data, supply chain data, point-of-use data, and/or patient data, as well as any aggregate data compiled from such data.

Arbitration algorithm(s) 1758 include algorithms for arbitrating or selecting between different actions to execute (e.g., how to use different resources or components of a robotic device). Arbitration algorithm(s) 1758 can be rules and, in some embodiments, can be learned, as further described with reference to FIG. 24. These algorithms can be used by a robotic device to select between different actions when the robotic device has multiple resources and/or objectives to manage. For example, a robotic device operating in an unstructured and/or dynamic environment, e.g., an environment including humans, may be exposed to a number of conditions at any point in time that may demand different behaviors or actions from the robotic device. In such instances, the robotic device can be configured to select between the different actions based on one or more arbitration algorithms 1758, which may assign different priorities to the various actions based on predefined rules (e.g., affective states, environmental constraints, socially defined constraints, etc.). In an embodiment, an arbitration algorithm 1758 can assign different scores or values to actions based on information collected by a robotic device about its surrounding environment, its current state, and/or other factors.

Similar to I/O interface(s) 208 and/or 308, I/O interface(s) 1708 can be any suitable component(s) that enable communication between internal components of control unit 1702 and external devices, such as a user interface, a manipulating element, a transport element, and/or compute device. I/O interface(s) 1708 can include a network interface 1760 that can connect control unit 1702 to a network (e.g., network 105, as depicted in FIG. 1). Network interface 1760 enables communications between control unit 1702 (which can be located on a robotic device or another network device in communication with one or more robotic devices) and a remote device, such as a compute device that can be used by a robot supervisor to monitor and/or control one or more robotic devices. Network interface 1760 can be configured to provide a wireless and/or wired connection to a network.

FIG. 5 schematically illustrates a robotic device 400, according to some embodiments. Robotic device 400 includes a head 480, a body 488, and a base 486. Head 480 can be connected to body 488 via a segment 482 and one or more joints (not depicted). Segment 482 can be movable and/or flexible to enable head 480 to move relative to body 488. Head 480, segment 482, etc. can be examples of manipulating element(s), and include similar functionality and/or structure as other manipulating element(s) described herein.

Head 480 includes one or more image capture devices 472 and/or other sensors 470. Image capture device 472 and/or other sensors 470 (e.g., lidar sensors, motion sensors, etc.) can enable robotic device 400 to scan an environment and obtain a representation (e.g., a visual representation or other semantic representation) of the environment. In some embodiments, image capture device 472 can be a camera. In some embodiments, image capture device 472 can be movable such that it can be used to focus on different areas of the environment around robotic device 400. Image capture device 472 and/or other sensors 470 can collect and send sensory information to a compute device or processor onboard robotic device 400, such as, for example, control unit 202 or 302. In some embodiments, head 480 of robotic device 400 can have a humanoid shape, and include one or more human features, e.g., eyes, nose, mouth, ears, etc. In such embodiments, image capture device 472 and/or other sensors 470 can be implemented as one or more human features. For example, image capture device 472 can be implemented as eyes on head 480.

In some embodiments, robotic device 400 can use image capture device 472 and/or other sensors 470 to scan an environment for information about objects in the environment, e.g., physical structures, devices, articles, humans, etc. Robotic device 400 can engage in active scanning, or robotic device 400 can initiate scanning in response to a trigger (e.g., an input from a user, a detected event or change in the environment).

Figure 6A:
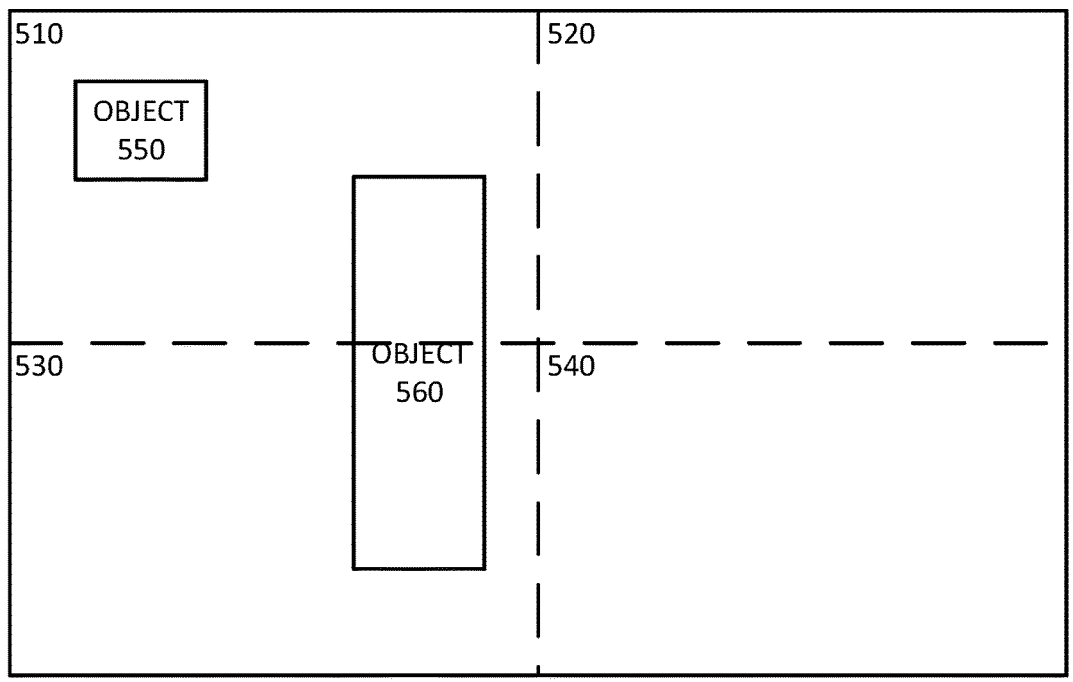
FIGS. 6A and 6B are schematic illustrations of objects in an environment viewed by a robotic device, according to some embodiments.
Figure 6B:
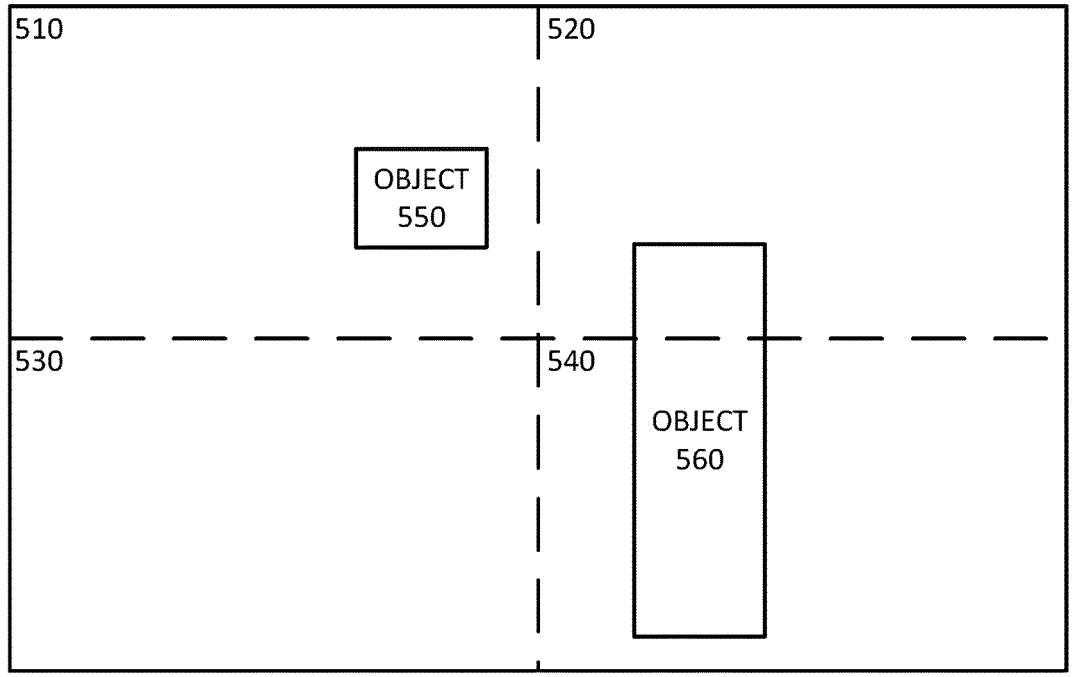

In some embodiments, robotic device 400 can engage in adaptive scanning where scanning can be performed based on stored knowledge and/or a user input. For example, robotic device 400 can identify an area in the environment to scan for an object based on prior information that it has on the object. Referring to FIG. 6A, robotic device 400 can scan a scene (e.g., an area of a room) and obtain a representation 500 of the scene. In representation 500, robotic device 400 identifies that a first object 550 is located in an area 510 and that a second object 560 is located in areas 510 and 530. Robotic device 400 can store the locations of objects 550 and 560 in a map of the environment that it stored internally, such that robotic device 400 can use that information to locate objects 550 and 560 when performing a future scan. For example, when robotic device 400 returns to the scene and scans the scene a second time, robotic device 400 may obtain a different view of the scene, as shown in FIG. 6B. When performing this second scan, robotic device 400 can obtain a representation 502 of the scene. To locate objects 550 and 560 in representation 502, robotic device 400 can refer to information that it had previously stored about the locations of those objects when it had obtained representation 500 of the scene. Robotic device 400 can take into account that its own location in the environment may have changed, and recognize that objects 550 and 560 may be located in different areas of representation 502. Based on this information, robotic device 400 may know to look in area 510 for object 550 but to look in areas 520 and 540 for object 560. Robotic device 400, by using previously stored information about the locations of objects 550 and 560, can automatically identify areas to scan closely (e.g., by zooming in, by slowly moving a camera through those areas) for objects 550 and 560.

In some embodiments, robotic device 400 can also know to scan different areas of a scene more closely based on an input by a human. For example, a human can indicate to robotic device 400 that a certain area of a scene includes one or more objects of interest, and robotic device 400 can scan those areas more closely to identify those objects. In such embodiments, robotic device 400 can include an input/output device 440, such as a display with a keyboard or other input device, and/or a touchscreen, as schematically depicted in FIG. 5.

Figure 7A:
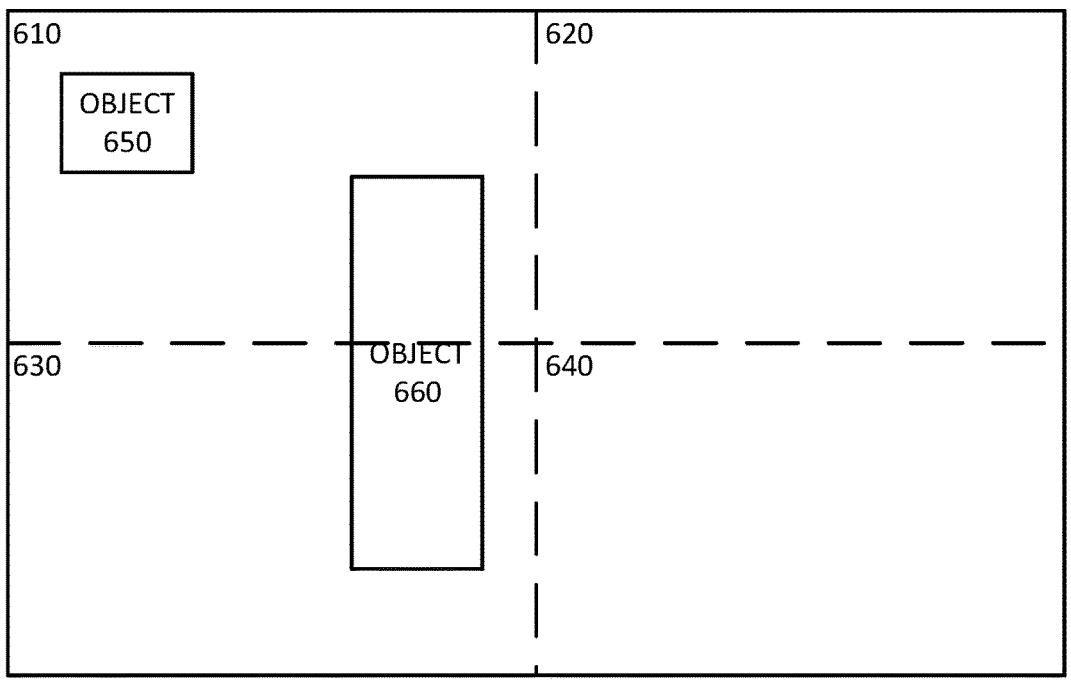
FIGS. 7A and 7B are schematic illustrations of objects in an environment viewed by a robotic device, according to some embodiments.
Figure 7B:
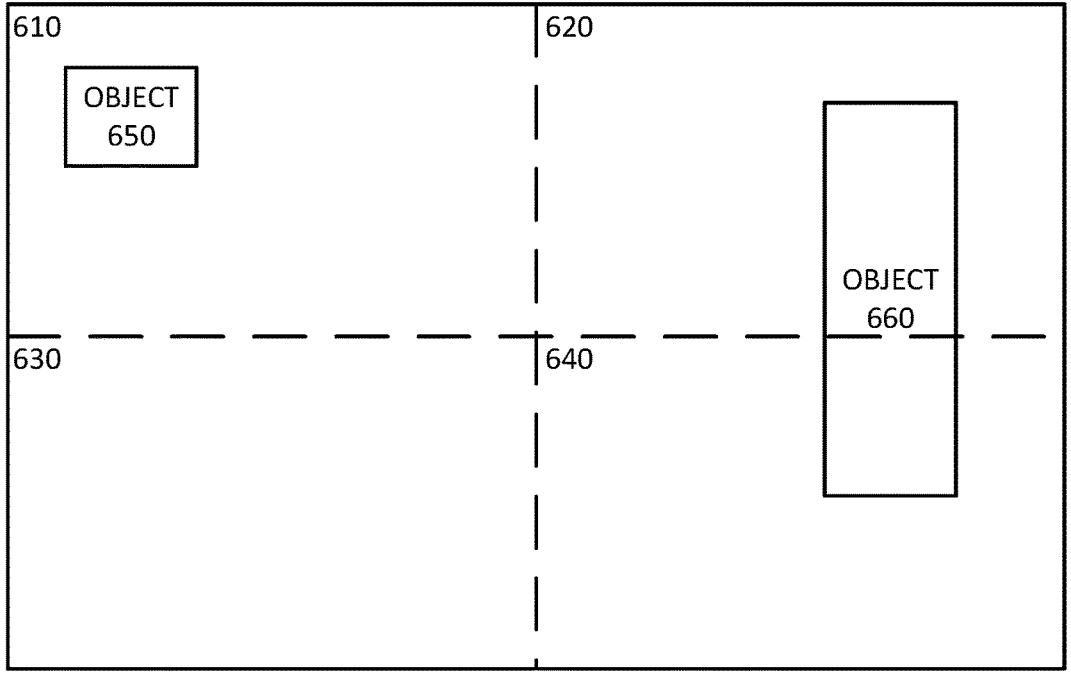

In some embodiments, robotic device 400 can scan an environment and identify that an object, such as, for example, a human, is moving in the environment. For example, as shown in FIGS. 7A and 7B, an object 660 can be moving in an environment while an object 650 remains stationary. FIG. 7A depicts a representation 600 of a scene, showing object 660 in areas 610 and 630, and FIG. 7B depicts representation 602 of the scene, showing object 660 in areas 620 and 640. In both representations 600 and 602, object 650 can remain in the same location in area 610. Robotic device 400 can identify that object 660 has moved in the scene and adjust its actions accordingly. For example, if robotic device 400 had plans to interact with object 660, robotic device 400 may change its trajectory, e.g., move closer to object 660 and/or change a trajectory of a manipulating element or other component that is configured to interact with object 660. Alternatively or additionally, if robotic device 400 had plans to interact with object 650 (and/or another object in the scene), robotic device 400 can take into account the movement of object 660 while planning its course for interacting with object 650. In some embodiments, robotic device 400 can engage in active scanning such that it can adjust its actions in near real-time.

As schematically depicted in FIG. 5, base 486 optionally can include one or more transport elements implemented as wheels 460. Wheels 460 can enable robotic device 400 to move around an environment, e.g., a hospital. Robotic device 400 also includes at least one manipulating element implemented as arms 450. Arms 450 can be structurally and/or functionally similar to other manipulating elements described herein, e.g., manipulating element 350. Arms 450 can be fixedly attached to body 488 of robotic device 400, or optionally, manipulating element 450 can be releasably coupled to body 488 via a coupling element (e.g. coupling element 359) that can attach to a coupling portion 484 of robotic device 400. Coupling portion 484 can be configured to engage with coupling element 359, and provide an electrical connection between arm 450 and an onboard compute device (e.g., control unit 202 or 302), such that the onboard compute device can power and/or control components of arm 450, and receive information collected by sensors disposed on manipulating element 450 (e.g., sensors 353, 355, 357, and 358).

Optionally, robotic device 400 can also include one or more additional sensor(s) 470 located on segment 482, body 488, base 486, and/or other parts of robotic device 400. Sensor(s) 470 can be, for example, image capture devices, force or torque sensors, motion sensors, light sensors, pressure sensors, and/or temperature sensors. Sensors 470 can enable robotic device 400 to capture visual and non-visual information about the environment.

Methods

FIGS. 8-11 are flow diagrams illustrating a method 700 that can be performed by a robotic system (e.g., robotic system 100) including one or more robotic devices, according to some embodiments. For example, all or a part of method 700 can be performed by one robotic device, such as any of the robotic devices described herein. Alternatively, all of method 700 can be performed sequentially by multiple robotic devices, each performing, in turn, a part of method 700. Alternatively, all or a part method 700 can be performed concurrently by multiple robotic devices.

Figure 8:
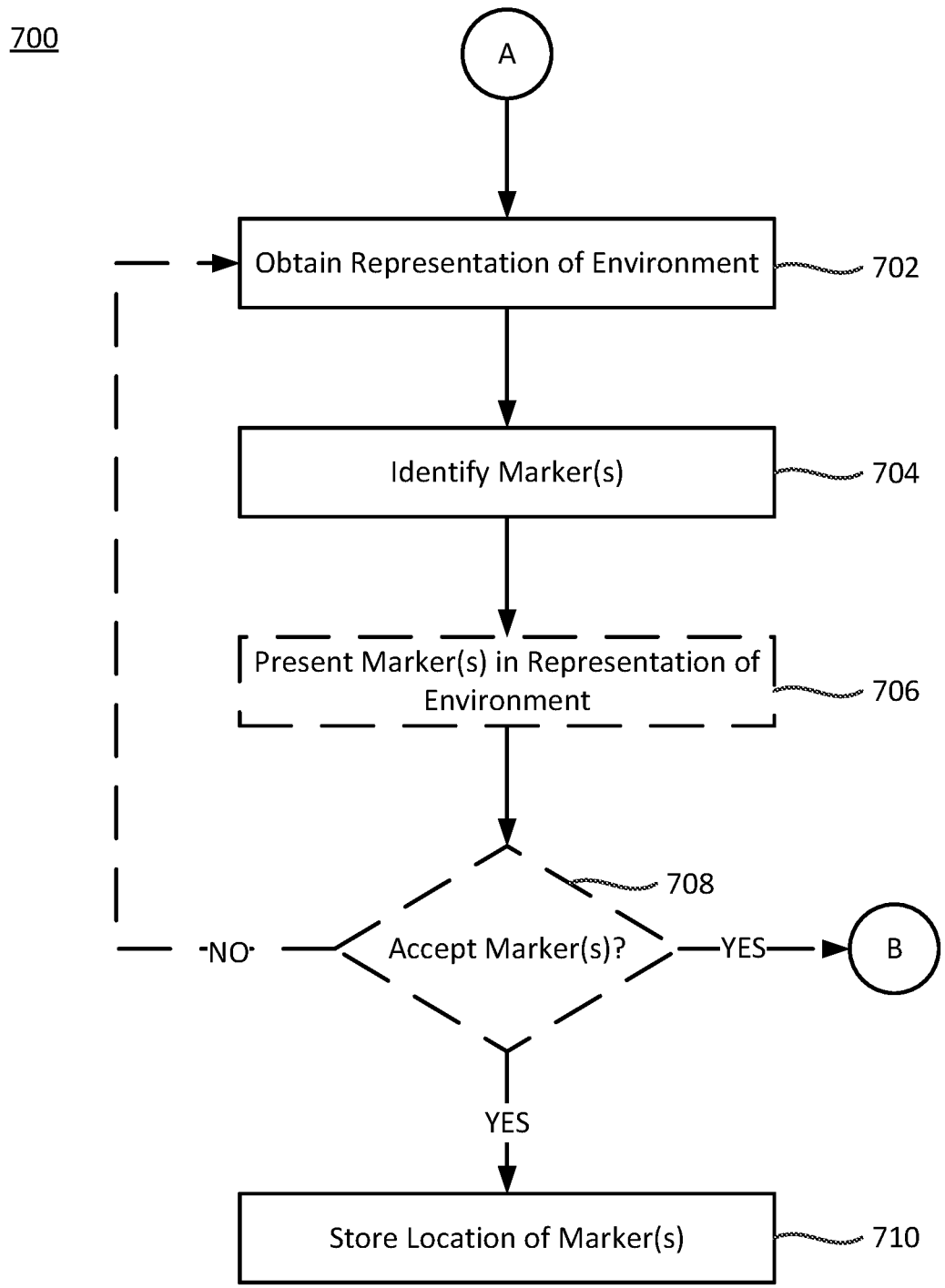
FIG. 8 is a flow diagram illustrating a method of scanning an environment performed by a robotic device, according to some embodiments.

As depicted in FIG. 8, a robotic device can scan an environment and obtain a representation of the environment, at 702. The robotic device can scan the environment using one or more sensors (e.g., sensor(s) 270 or 470, and/or image capture device(s) 472). In some embodiments, the robotic device can scan the environment using a movable camera, where the position and/or focus of the camera can be adjusted to capture areas in a scene of the environment. At 704, based on the information collected during the scanning, the robotic device can analyze the data to identify marker(s) in the captured representation of the environment. The markers can be associated with one or more objects in the scene that have been marked using visual or fiducial markers, e.g., a visible marker such as a QR code, a barcode, a tag, etc. Alternatively or additionally, the robotic device can identify markers associated with one or more objects in the environment via object recognition using object information (e.g., object information 340) that is stored in a memory on the robotic device (e.g., storage 330). Object information can include, for example, information indicating different features of an object, such as location, color, shape, and surface features. In an embodiment, object information can be organized as numerical values that represent different features of an object, which can be referred to as a feature space.

After identifying the marker(s), the robotic device can optionally present the marker(s) in a representation of the environment, at 706. In some embodiments, the representation of the environment can be a visual representation such as, for example, an augmented view of the environment. In such embodiments, the robotic device can display the visual representation of the environment, e.g., on a display screen, and display the locations of the marker(s) in the visual representation of the environment. Alternatively or additionally, the representation of the environment can be a semantic representation of the environment, with the locations of the marker(s), represented by semantic markers, in the environment.

In some embodiments, the robotic device can present the representation of the environment with the marker(s) to a user, and optionally prompt the user, e.g., via a user interface or other type of I/O device, to accept or reject the marker(s) in the representation of the environment, at 708. If the user does not accept the marker(s) (708: NO), then method 700 returns to 702, and the robotic device can rescan the environment to obtain a second representation of the environment. If the user accepts the marker(s) (708: YES), then method 700 proceeds to 708, where the robotic device can store information associated with the markers (e.g., location, features, etc.) in a memory (e.g., storage 330). For example, the robotic device can store the location of the marker(s) in an internal map of the environment (e.g., map 332).

In some embodiments, the robotic device can identify the marker(s) at 704 and proceed directly to store the location of the marker(s) and/or other information associated with the markers, at 710, without prompting a user to accept the marker(s). In such embodiments, the robotic device can analyze the location of the marker(s) prior to storing their location. For example, the robotic device can have previously stored information on the location of the marker(s) (e.g., that was acquired during a previous scan of the environment and/or inputted in the robotic device by a user or compute device), and can compare the location of the marker(s) to that previously stored information to check for accuracy and/or identify changes in marker locations. In particular, if the previously stored information indicates that a particular marker should be located in a location that is different from the location identified by the robotic device, then the robotic device may initiate an additional scan of the environment to verify the location of the marker before storing its location. Alternatively or additionally, the robotic device can send a notification to a user indicating that the location of a marker has changed. In such instances, the robotic device can store the new location of the marker but also store a message indicating that there has been a change in the marker location. A user or compute device can then, at a later point in time, review the message and reconcile the change in marker location.

Figure 9:
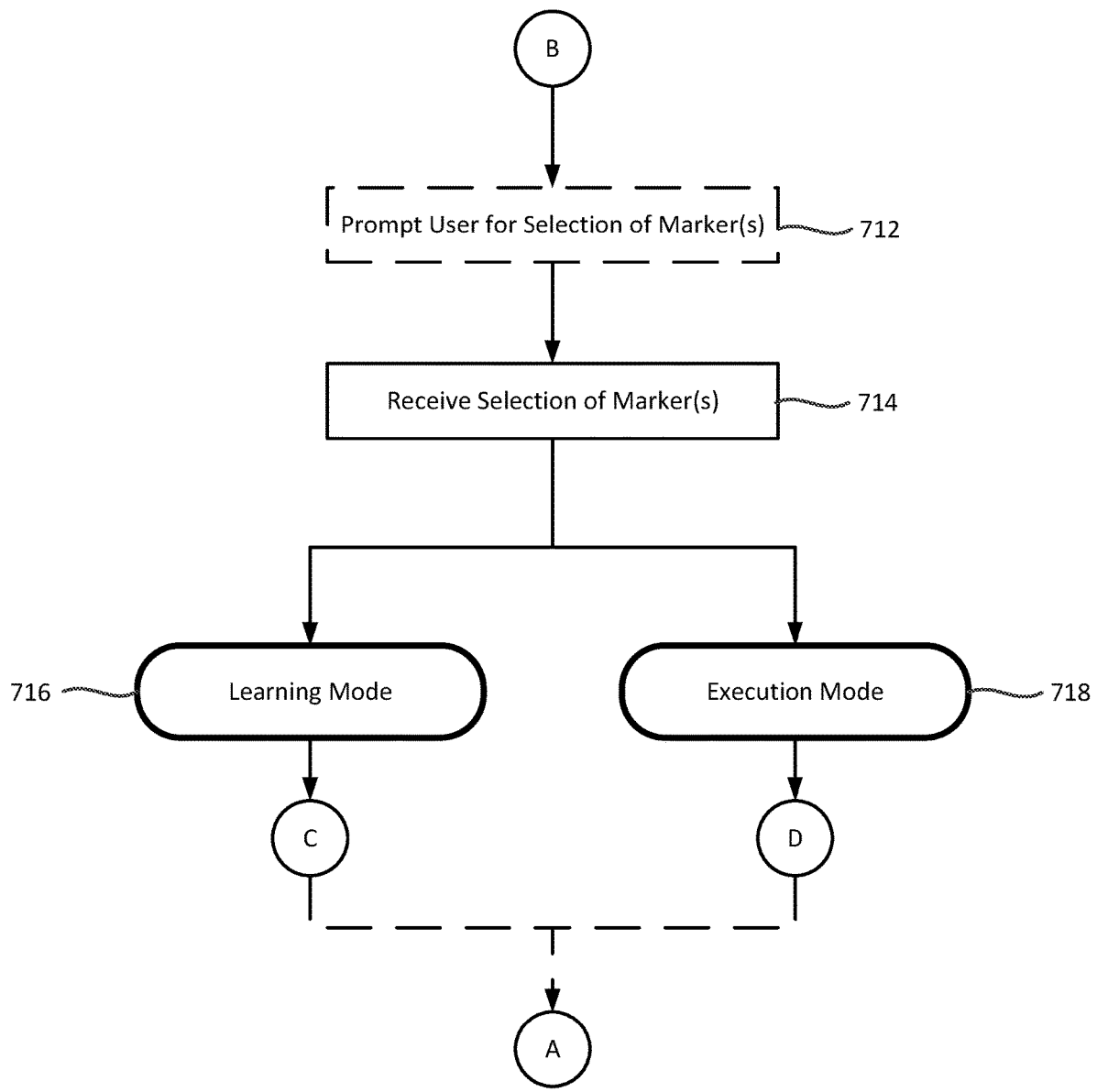
FIG. 9 is a flow diagram illustrating a method of learning and execution of skills performed by a robotic device, according to some embodiments.

Optionally, method 700 can proceed to 712, where the robotic device can prompt a user e.g., via a user interface or other type of I/O device, to select a set of markers from the marker(s) identified in the representation of the environment, as depicted in FIG. 9. The user can make a selection, and the robotic device can receive the selection from the user, at 714. Alternatively, in some embodiments, the robotic device can automatically select a set of markers instead of prompting a user to make a selection. The robotic device can be programmed to select a marker based on certain predefined or learned rules and/or conditions. For example, the robotic device can be instructed to select a marker that is associated with a particular type of object (e.g., a supply item) during certain hours of the day, or when traffic in a building is low. In the latter case, the robotic device can determine when traffic in a building is low by actively moving through the building (e.g., patrolling and monitoring hallways and rooms) and scanning the environment. The robotic device can then know to select markers that are associated with particular objects at times when traffic in the building is lower than a majority of other times.

After the robotic device receives a selection of a set of markers from the user and/or has automatically selected a set of markers, method 700 can proceed to onto learning a skill, at 716, or executing a skill, at 718.

For any particular skill, the robotic device can be taught the skill prior to the robotic device executing or performing the skill. For example, to acquire a manipulation skill, the robotic device can be taught using LfD (e.g., kinesthetic teaching), whereby a user or other robotic device can demonstrate skills to the robotic device. For example, a manipulating element such as an arm of the robotic device can be moved through a sequence of waypoints to interact with an object. As another example, a mobile base of a robotic device (e.g., a base with a transport element such as wheels, tracks, crawlers, etc.) can be navigated around objects within an environment by a user, e.g., by using a joystick, a user interface, or some other type of physical or virtual control device.

In the case of kinesthetic teaching, a user can physically demonstrate skills to the robotic device. The training or teaching can be performed in a mass-production setting, such as, for example, a manufacturing environment, in which the robotic device can be taught using an aggregate model representing a generic performance of a skill. Alternatively or additionally, the teaching can occur onsite after the robotic device has been deployed (e.g., at a hospital), such that the robotic device can learn to perform the skill in the specific site environment. In some embodiments, a robotic device can be taught in an onsite setting, and can then send information associated with the learned skill to one or more additional robotic devices, such that those additional robotic devices can also have the knowledge of the taught skill when operating in the same onsite setting. Such embodiments can be useful when multiple robotic devices are being deployed at a single site. Each robotic device can then receive and send information to other robotic devices such that they can collectively learn a set of skills for that onsite environment.

Figure 10:
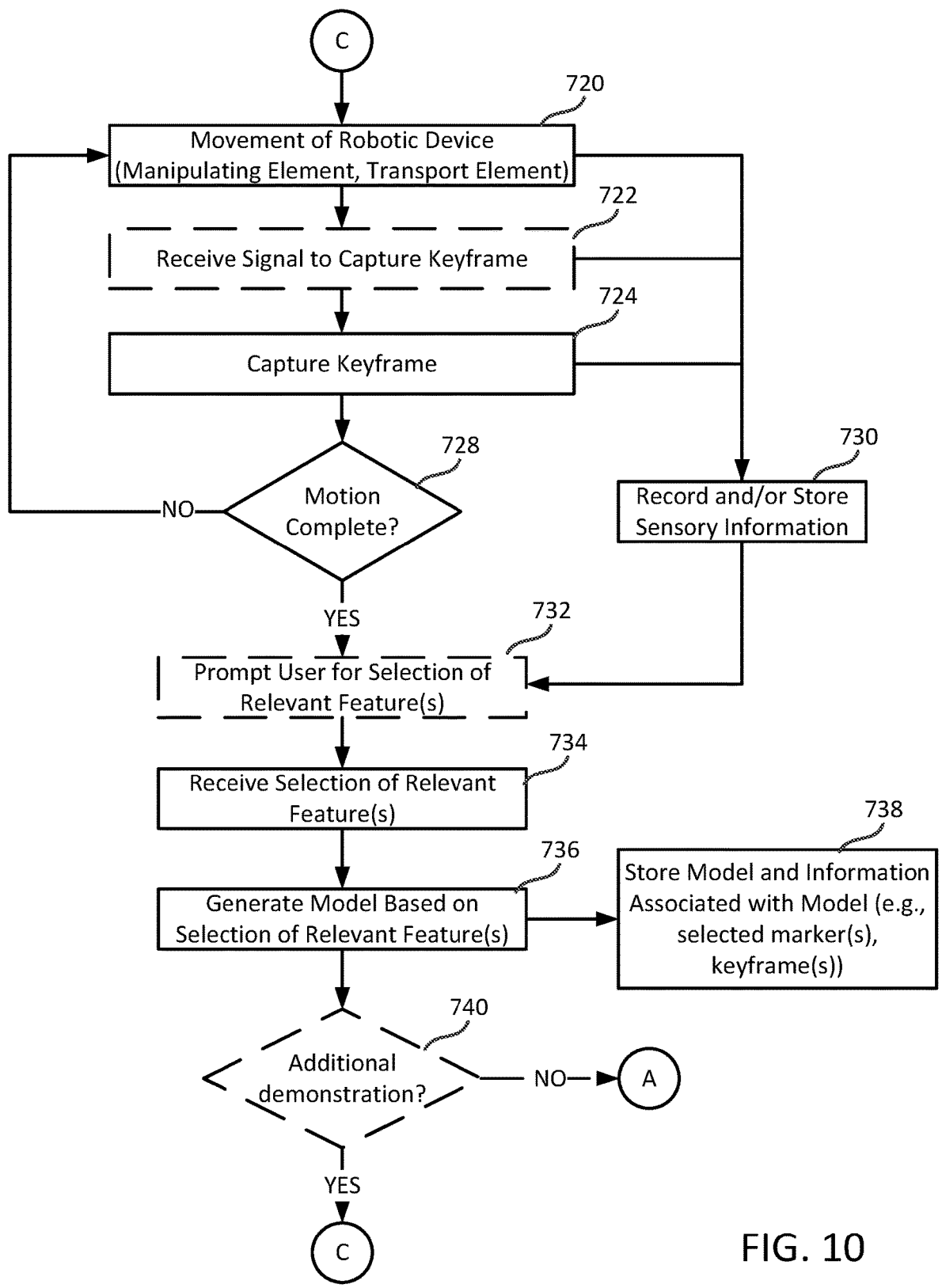
FIG. 10 is a flow diagram illustrating a method of learning a skill performed by a robotic device, according to some embodiments.

In the learning mode, depicted in FIG. 10, method 700 proceeds to 720-724, where a user can use a LfD teaching process to teach the robotic device a skill. In an embodiment, a skill can be defined as gripping an object located at a particular location, picking up the object, moving the object to a different location, and setting the object down in the different location. In another embodiment, a skill can involve interactions with an environment surrounding the robotic device, e.g., a door.

At 720, a user (or another robotic device) can guide the robotic device, including a manipulating element (e.g., manipulating element 250, 350, or 450) and/or a transport element (e.g., transport element(s) 260, 460), through a movement. For example, a user can guide the manipulating element of the robotic device (and/or other component of the robotic device, e.g., a transport element) through a demonstration associated with executing a particular skill, e.g., an interaction with a human, an engagement with and/or manipulation of an object, and/or other interactions with human(s) and/or a surrounding environment. In an embodiment, a user can demonstrate to the robotic device how to interact with and/or navigate through a door. The user can demonstrate how the robotic device, e.g., via its manipulating element(s), how to interact with a handle of the door. For example, a manipulating element of the robotic device, such as an arm, can be guided through a series of motions relative to the door handle (e.g., as placed or identified by a visual input or fiducial marker). While or after the door handle is turned, e.g., using the manipulating element, the robotic device can be guided via demonstration to push the door open, e.g., by moving its transport element(s). The combination of motions of the manipulating element(s) and transport element(s) can be used, as further explained below, to construct a model for executing a skill or behavior for future interactions with the door and/or similar doors.

In some embodiments, the robotic device can be guided by a user that is locally present, e.g., by the user physically moving and/or providing inputs to the robotic device. In some embodiments, the robotic device can be guided by a user located remotely from the robotic device (e.g., a robot supervisor) via, for example, a remote or cloud interface.

While guiding the manipulating element (and/or other component of the robotic device) through the movement, the user can indicate to the robotic device when to capture information about the state of the manipulating element (e.g., joint configurations, joint forces and/or torques, end effector configuration, end effector position), another component of the robotic device, and/or the environment (e.g., a location of an object associated with a selected marker and/or other objects in the environment). For example, the robotic device can receive a signal from a user to capture information about the manipulating element and/or environment at a waypoint or keyframe during the movement of the manipulating element, at 722. In response to receiving a signal, at 724, the robotic device can capture the information about the manipulating element, other component of the robotic device, and/or environment at that keyframe. The manipulating element information can include, for example, joint configurations, joint torques, end effector positions, and/or end effector torques. The environmental information can include, for example, the position of a selected marker relative to the end effector, and can indicate to the robotic device when objects in the environment may have moved. If the movement is still ongoing (728: NO), then the robotic device can wait to capture information about the manipulating element and/or environment at additional keyframes. In some embodiments, the robotic device can be programmed to capture keyframe information without receiving a signal from a user. For example, while the manipulating element is being moved by a user, the robotic device can monitor changes in the segments and joints of the manipulating element, and when those changes are exceed a threshold, or when there is a directional change in a trajectory of a segment or joint, the robotic device can autonomously select that point to be keyframe and record information about the manipulating element and/or environment at that keyframe.

During the movement of the manipulating element (and/or other component of the robotic device, e.g., transport element), the robotic device can also continuously or periodically, without receiving a signal from a user, record sensory information, e.g., information about the manipulating element, other element(s) of the robotic device (e.g., transport element), and/or environment, at 730. For example, the robotic device can record information about the trajectories of segments and joints, as well their configurations, as the user moves the manipulating element through the demonstration. During the demonstration, the robotic device can also record information about one or more environmental constraints, e.g., static information about object(s) within the environment (e.g., a location or size of a doorway, a supply bin, etc.) and/or dynamic information about object(s) within the environment (e.g., a level of traffic in a room, movements of users around the robotic device, etc.). In some embodiments, the sensory information recorded by the robotic device during the demonstration can add to and/or modify one or more layers of a map of the environment, e.g., as depicted in FIG. 19.

In some embodiments, the robotic device can include an audio device (e.g., 244) such as, for example, a microphone, and the demarcation of keyframes can be controlled by speech commands. For example, a user can indicate to the robotic device that it plans to give a demonstration by speaking, "I will guide you." The demonstration can begin when the user indicates the first keyframe by speaking "start here." Intermediate keyframes can be indicated by speaking "go here." And a final keyframe representing the end of the demonstration can be indicated by speaking "end here." Suitable examples of demonstration teaching are provided in the Akgun article.

In some embodiments, while demonstrating a skill to the robotic device, a user can indicate which portion(s) of the skill are generic and which portion(s) of the skill are more specific to a particular environment or situation, e.g., via one or more inputs into the robotic device. For example, while demonstrating to a robotic device how to move supplies from a first location to a second location (e.g., a room) and to drop those supplies off at the second location, the user can indicate to the robotic device that the action of navigating from the first location to the second location is generic while the action of dropping off the supplies at the second location is unique and requires more information specific to an environment to implement (e.g., a specific tag or marker to drop off the supplies relative to). When the robotic device later uses a model for that skill to move supplies between different locations, the robotic device can know to request specific information regarding the drop off and/or scan for that specific information before executing the skill (e.g., request and/or scan for information regarding a specific tag to determine its location before performing the drop off).

In some embodiments, a user can indicate after demonstrating a skill to a robotic device those portions of the skill that are generic or specific and/or modify those portions of the skill that the user has previously indicated to be generic or specific. In some embodiments, a robotic device after learning a set of skills may determine that portions of the set of skills are generic or specific. In some embodiments, the robotic device can recommend that portions of the set of skills are generic or specific to a user, and request confirmation from the user. Based on the user's confirmation, the robotic device can store the information for reference when learning and/or executing future skills associated with the set of skills. Alternatively, the robotic device can automatically determine and label different portions of skills as being generic or specific without user input.

Once the movement or demonstration is complete (728: YES), the robotic device can generate a model for the demonstrated skill based on a subset of all the sensory information (e.g., manipulating element information, transport element information, environmental information) that has been recorded. For example, at 732, the robotic device can optionally prompt a user, e.g., via a user interface or other type of I/O device, for a selection of features that are relevant to learning the skill, and at 734, the robotic device can receive the selection of features from the user. Alternatively or additionally, the robotic device can know to select certain features to use in generating the model based on previous instructions from a user. For example, the robotic device can recognize that it is being demonstrated to pick up an object, e.g., based on the sensory information, and can automatically select one or more features of the sensory information (e.g., joint configuration, joint torques, end effector torques) to include as relevant features for generating the skill model, e.g., based on past demonstrations of picking up the same or different objects.

At 736, the robotic device can generate the model of the skill using the selected features. The model can be generated using stored machine learning libraries or algorithms (e.g., machine learning libraries 342). In some embodiments, the model can be represented as a HMIM algorithm that includes a plurality of parameters, such as, for example, a number of hidden states, a feature space (e.g., features included in a feature vector), and emission distributions for each state modeled as a Gaussian distribution. In some embodiments, the model can be represented as a support vector machine or "SVM" model, which can include parameters such as, for example, a kernel type (e.g., linear, radial, polynomial, sigmoid), a cost parameter or function, weights (e.g., equal, class balanced), a loss type or function (e.g., hinge, square-hinge), and a solving or problem type (e.g., dual, primal). The model can be associated with the relevant sensory information and/or other sensory information recorded by the robotic device during the skill demonstration. The model can also be associated with marker information indicating the set of markers that were manipulated during the skill demonstration and/or features associated with one or more physical objects tied to those markers. The robotic device can store the model in a memory (e.g., storage 230 or 330), at 738.

Figure 21:
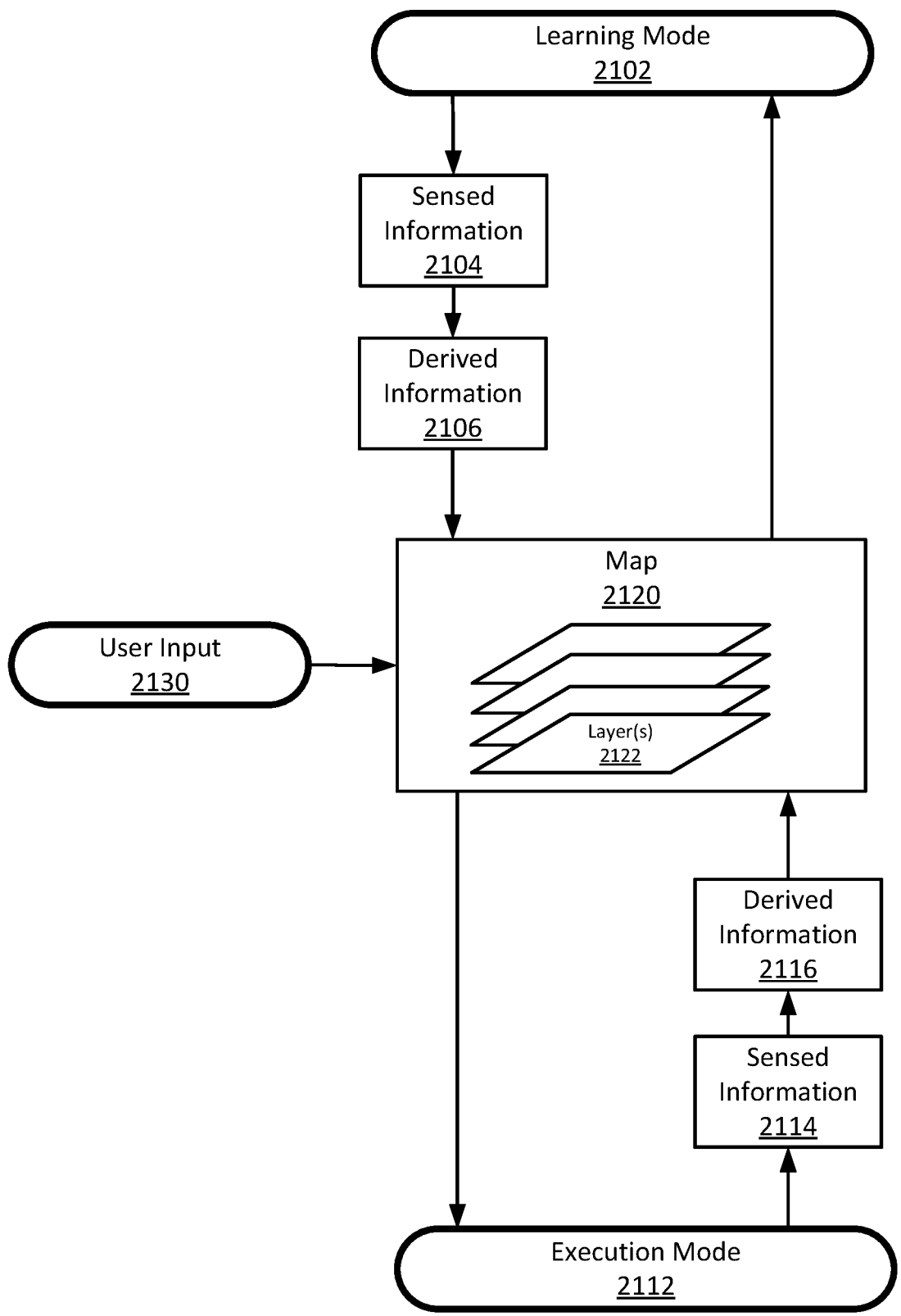
FIG. 21 depicts flow of information that a robotic device provides to and received from a map maintained by the robotic device, according to some embodiments.
Figure 22:
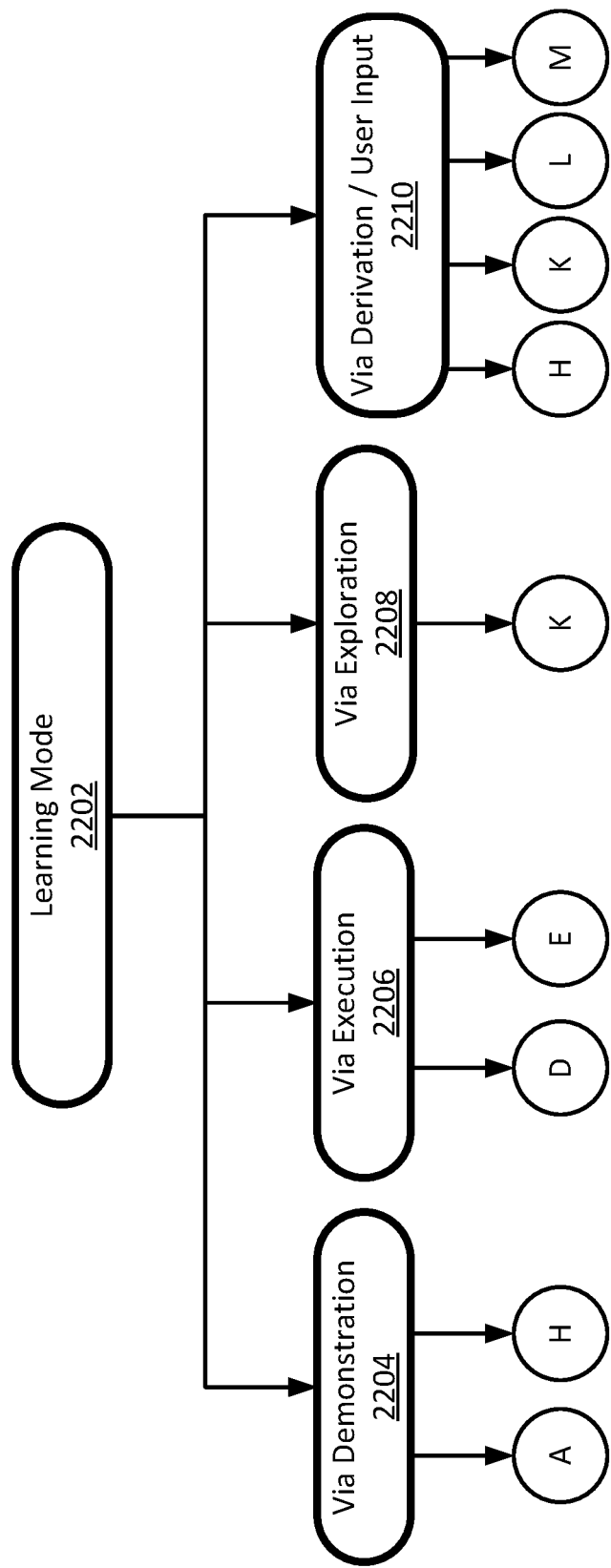
FIG. 22 depicts a flow diagram illustrating different learning modes of a robotic device, according to some embodiments.

In some embodiments, information associated with a demonstration (e.g., sensory information, model, etc.) can be used to add to and/or modify the layers of a map or representation of the environment, e.g., such as the representation 1600 depicted in FIG. 19. For example, FIG. 21 depicts.

Optionally, at 740, the robotic device can determine whether the user will be performing another demonstration of the skill. If another demonstration is to be performed (740: YES), then method 700 can return to 720, where a user (or other robotic device) can guide the robotic device through an additional demonstration. If the demonstrations are complete (740: NO), then method 700 can optionally return to the beginning and perform a new scan of the environment. Alternatively, in some embodiments, method 700 can terminate.

In another embodiment, a skill can be a navigation behavior, such as navigating between two locations or navigating around and/or through an object in the environment. Similar to learning a skill with a manipulation element, such as described herein, a user (or other robotic device) can guide the robotic device including a set of transport elements (e.g., transport element(s) 260, 460) through the navigation behavior, at 720. For example, a user can use a joystick or other control device to control the movement of the set of transport elements (and/or other components of the robotic device, e.g., a manipulation element) such that the robotic device can perform the navigation behavior. While controlling the movement of the set of transport elements (and/or other components of the robotic device), the user can signal to the robotic device when to capture sensory information, such as information about the state of the set of transport elements (e.g., angles of each transport element, configurations of each transport element, spacing between transport elements if movable relative to one another, etc.), other components of the robotic device, and/or the environment (e.g., location of the robotic device in a map, location and/or boundary of an object in the environment). The user can signal to the robotic device at keyframes during the movement of the set of transport elements (and/or other components of the robotic device), e.g., at a starting point, an ending point, and/or transition points between moving the set of transport elements in a first direction and a second direction. In response to receiving a signal from the user, at 722, the robotic device can capture a snapshot of movement (including information about the set of transport elements, other components of the robotic device, and/or the environment) at the keyframe. Alternatively or additionally, the robotic device can be configured to autonomously select points during the movement of the set of transport elements (and/or other components of the robotic device) to capture a snapshot of the movement. For example, the robotic device can monitor the angle and/or configuration of the set of transport elements and capture a snapshot of that information whenever the robotic device detects a change in the angle and/or configuration. In some embodiments, the robotic device can be configured to continuously collect information on the set of transport elements, other components of the robotic device, and/or the environment while the user controls the movement of the robotic device.

Similar to learning a skill with a manipulating element, as described herein, the robotic device can continue to capture sensory information associated with the movement of the transport elements (and/or other components of the robotic device) until the movement is completed (728: YES). The robotic device can optionally receive a selection of features that are relevant to learning the navigation behavior and/or autonomously identify relevant features in the collected sensory information (e.g., by recognizing that it is being demonstrated a particular navigation skill and identifying those features that are relevant to learning that skill), at 732-734. The robotic device can then generate a model for the navigation behavior based on the sensory information associated with the relevant features, at 736, and store that model and the sensory information such that it can be used to generate a trajectory for the robotic device to execute at a later point in time, at 738.

An example of a navigation behavior is to navigate through a doorway. The robotic device can be configured to navigate through standard doorways within a building, but the robotic device may not be capable of navigating through a non-standard doorway, e.g., a small or oddly shaped doorway. Accordingly, the robotic device may prompt a user to demonstrate to the robotic device how it can safely navigate through the doorway. The robotic device can navigate to one side of the doorway and then have a user demonstrate to the robotic device how to pass through the doorway to the other side. During the demonstration, the robotic device can passively record information such as a location of the robotic device in a map and/or sensor data (e.g., a boundary of the door, a configuration of the transport elements and/or manipulation elements, and other sensory information as described herein). In some embodiments, the robotic device can learn how to navigate through the doorway using an interactive learning template, as further discussed herein with reference to FIG. 16.

In some embodiments, the user can be onsite near the robotic device. In other embodiments, the user can be located at a remote location and can control the robotic device from a compute device (e.g., server 120, compute device 150) via a network connection to the robotic device (e.g., such as depicted in FIG. 1 and described above).

In some embodiments, as described herein, the robotic device can actively scan its surrounding environment to monitor changes in the environment. Accordingly, during learning and/or execution, the robotic device can engage in continuous scanning of the environment, and update the representation of the environment accordingly, as well as the environmental information that it has stored.

In some embodiments, the robotic device can be configured to learn socially appropriate behaviors, i.e., actions that account for interactions with humans. For example, the robotic device can be configured to learn a manipulation or navigation skill that is performed around humans. The robotic device can learn the socially appropriate behavior via a demonstration by a human operator. In some embodiments, the robotic device can be configured to learn the behavior in an interactive setting, e.g., via a human operator intervening in the autonomous execution of a skill by the robotic device and then demonstrating to the robotic device how to execute the skill. The robotic device, upon detecting an intervention by the human operator, can be configured to switch to a learning mode where the robotic device is controlled by the human operator and passively records information associated with the demonstration and the perceptual context in which the demonstration is performed. The robotic device can use this information to generate a modified model of the skill and to associate that model with the appropriate social context in which the robotic device should execute that skill at a later point in time. As an example, a robotic device may detect that a human operator has intervened in its autonomous execution of a navigation plan and, in response to detecting the intervention, switch to a learning model of being controlled by the human operator. The robotic device can record information about its surrounding environment and its own movements as the human operator demonstrates how the navigation plan should be modified in the presence of humans, e.g., that the robotic device should move aside in a hallway to let a human pass instead of waiting for the hallway to clear. Further details regarding interactive learning is described herein, with reference to FIG. 16.

Figure 11:
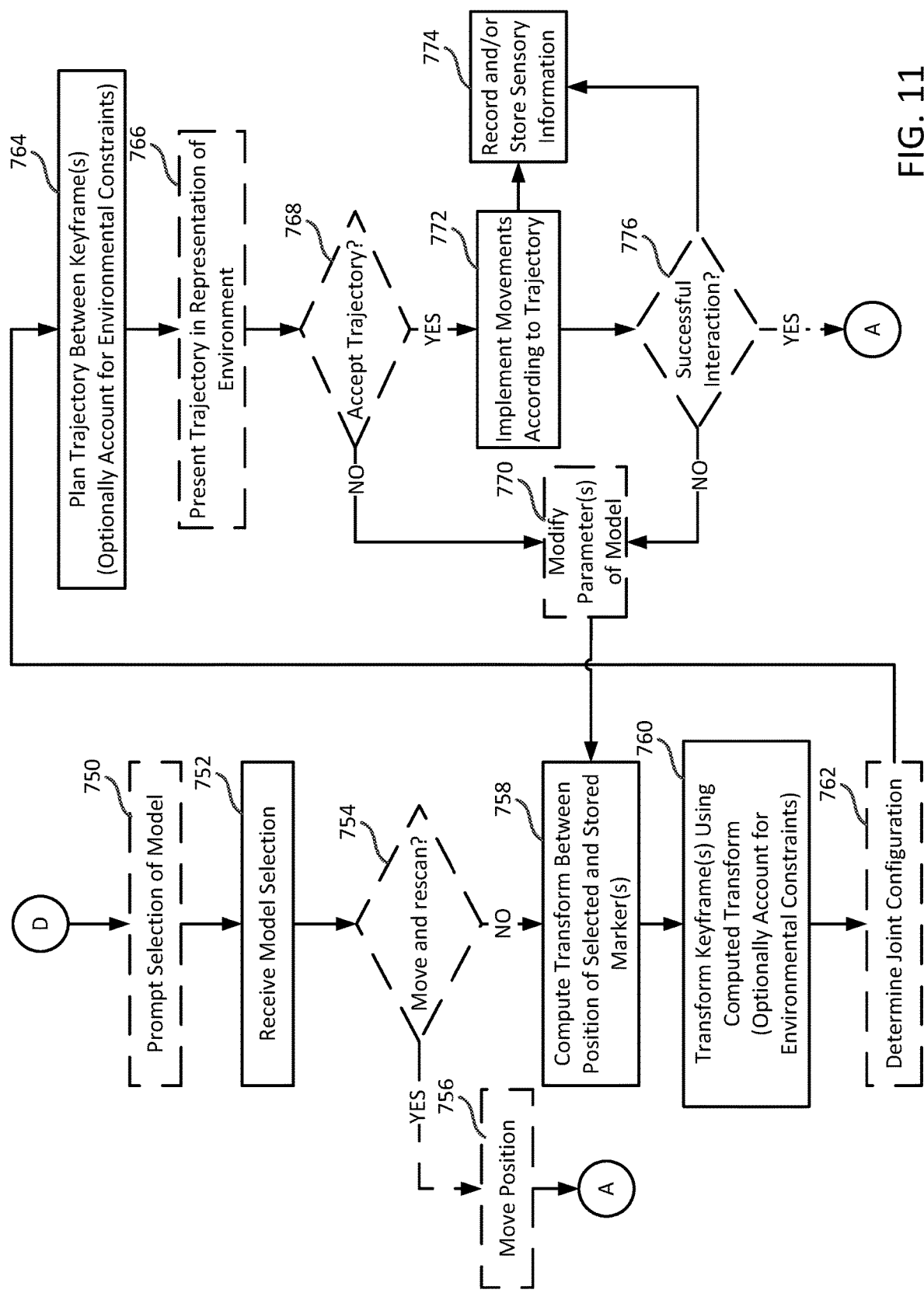
FIG. 11 is a flow diagram illustrating a method of executing a skill performed by a robotic device, according to some embodiments.

In the execution mode, depicted in FIG. 11, the robotic device can optionally prompt, e.g., via a user interface or other type of I/O device, a user to select a model, such as a model that was previously generated by the robotic device in the learning mode, at 750. The robotic device can receive the model selection, at 752. In some embodiments, the robotic device can receive the model selection from a user, or alternatively, the robotic device can automatically select a model based on certain rules and/or conditions. For example, the robotic device can be programmed to select a model when it is in a certain area of a building (e.g., when it is in a certain room or floor), during certain times or day, etc. Alternatively or additionally, the robotic device can know to select a certain model based on the selected set of markers. At 754, the robotic device can determine whether to move closer to a selected marker prior to generating a trajectory and executing a skill with respect to the selected marker. For example, the robotic device can determine based on the selected set of markers and the selected model whether it should move to be better positioned to execute the skill (e.g., to be closer or more proximate to the marker, to be facing the marker from a certain angle). The robotic device may make this determination based on the sensory information that was recorded during a demonstration of the skill. For example, the robotic device may recognize that it was positioned closer to the marker when it was demonstrated the skill and accordingly adjust its position.

If the robotic device determines to move with respect to the selected marker (754: YES), the robotic device can move its position (e.g., adjust its location and/or orientation), at 756, and method 700 can return to 702, where the robotic device scans the environment again to obtain a representation of the environment. Method 700 can proceed back through the various steps to 754. If the robotic device determines not to move with respect to the selected marker (754: NO), then the robotic device can generate an action trajectory, e.g., for a manipulating element of the robotic device.

Specifically, at 758, the robotic device can compute a function that transforms (e.g., translates) between a selected set of markers and a set of markers associated with the selected model (e.g., the marker(s) that were selected when the robotic device learned the skill, i.e., generated the selected model), referred to herein as a "stored marker" or "stored set of markers." For example, the robotic device can be taught a skill using a first set of markers that were at specific location(s) and/or orientation(s) relative to a portion of the robotic device, such as, for example, the end effector, and later, the robotic device can be executing the skill with a second set of markers that are at different location(s) and/or orientation(s) relative to the manipulating element. In such instances, the robotic device can compute a transformation function that transforms between the positon(s) and/or orientation(s) of first set of markers and the second set of markers.

At 760, the robotic device can use the computed transformation function to transform the position and orientation of a portion of the manipulating element, e.g., the end effector of the manipulating element, in each keyframe that was recorded when the skill was taught. Optionally, at 762, the robotic device can account for any environmental constraints, e.g., a feature of an object and/or an area within the environment, such as a size, configuration, and/or location. The robotic device can limit the movement of the manipulating element based on the environmental constraints. For example, if the robotic device recognizes that it will be executing the skill in a supply room, the robotic device can take into account a size of the supply room when transforming the position and orientation of the manipulating element to avoid having a portion of the manipulating element come into contact with a wall or other physical structure within the supply closet. The robotic device can also take into account other environmental constraints associated with the supply room, such as, for example, a size of a bin within the supply room, a location of a shelf within the supply room, etc. The robotic device can be provided information regarding environmental constraint(s) and/or taught environmental constraint(s) in advance of executing skills in a setting with the environmental constraint(s), as further described herein with reference to FIG. 17.

Optionally, at 762, the robotic device can use inverse kinematic equations or algorithms to determine the configuration of the joints of the manipulating element for each keyframe, at 762. The position and orientation of the end effector and the set of markers can be provided in a task space (e.g., the Cartesian space where the robotic device is operating), while the orientation of the joints can be provided in a joint or configuration space (e.g., a nth dimensional space associated with the configuration of the manipulating element, where the robotic device is represented as a point and n is the number of degrees of freedom of the manipulating element). In some embodiments, the inverse kinematic calculations can be guided by the joint configuration information recorded when the robotic device was taught the skill (e.g., the configuration of the joints recorded during a teaching demonstration using the manipulating element). For example, the inverse kinematics calculations can be seeded (e.g., provided with an initial guess for the calculation, or biased) with the joint configurations that were recorded at each keyframe. Additional conditions can also be imposed on the inverse kinematics calculations, such as, for example, requiring that the calculated joint configurations do not deviate more than a predefined amount from a joint configuration in an adjacent keyframe. At 764, the robotic device can plan the trajectory between the joint configurations from one keyframe to the next keyframe, e.g., in the joint space, to generate a complete trajectory for the manipulating element to execute the skill. Optionally, the robotic device can take into account environmental constraints, as discussed herein.

In some embodiments, after the robotic device transforms the position and orientation of the portion of the manipulating element (e.g., the end effector), the robotic device can plan the trajectory for the manipulating element in the task space. In such embodiments, method 700 can proceed from 760 directly to 764.

At 766 and 768, the robotic device can optionally present the trajectory to a user and prompt the user, e.g., via a user interface or other I/O device, to accept or reject the trajectory. Alternatively, the robotic device can accept or reject the trajectory based on internal rules and/or conditions, and by analyzing relevant sensory information. If the trajectory is rejected (768: NO), then the robotic device can optionally modify one or more parameters of the selected model, at 770, and generate a second trajectory, at 758-764. The parameters of the model can be modified, for example, by selecting different features (e.g., different sensory information) to include in the model generation. In some embodiments, where the model is a HMM model, the robotic device can change the parameters of the model based on a determined success or failure, in which the robotic device tracks a log likelihood of different models having different parameters and selects the model with a higher log likelihood than the other models. In some embodiments, where the model is a SVM model, the robotic device can change the parameters by changing the feature space or configuration parameters (e.g., kernel type, cost parameter or function, weights), as described herein.

If the trajectory is accepted (768: YES), then the robotic device can move the manipulating element to execute the generated trajectory, at 772. While the manipulating element is executing the planned trajectory, the robotic device, e.g., via one or more sensors on the manipulating element and other components of the robotic device, can record and/or store sensory information, such as, for example, information about the manipulating element and/or environment, at 774.

Optionally, at 774, the robotic device can determine whether the execution of the skill was successful (e.g., whether an interaction with an object meets predefined success criteria). For example, the robotic device can scan the environment and determine whether the current state of the environment and the robotic device, including, for example, the locations of one or more objects, and/or the position or orientation of those objects relative to the manipulating element or another component of robotic device, and determine whether that current state aligns with predefined success criteria. The predefined and/or learned success criteria can be provided by a user, or, in some embodiments, provided by a different robotic device and/or compute device. The predefined and/or learned success criteria can indicate information about different features of the environment and/or the robotic device that are associated with success. In some embodiments, a user may also provide an input indicating to the robotic device that the execution was successful.

In a particular example, where a skill is defined as gripping an object at a particular location and picking up the object, success for the skill can be taught and/or defined as detecting that one or more markers associated with the object are in a specific relationship with each other and/or the robotic device, or detecting that a sufficient force or torque is being experienced (or was experienced) by the end effector or a joint of the manipulating element (e.g., a wrist joint), signifying that the manipulating element is supporting the weight of the object and therefore has picked up the object. If the execution was not successful (776: NO), then the robotic device may optionally modify the parameters of the model, at 770, and/or generate a new trajectory, at 758-764. If the execution was successful (776: YES), then the data associated with the successful interaction (e.g., data indicating that the execution was successful and how it was successful) can be recorded, and method 700 can optionally return to the beginning and perform a new scan of the environment. Alternatively, in some embodiments, method 700 can terminate.

In some embodiments, a robotic device is configured to execute a skill involving operation of one or more of a manipulating element, a transport element, and/or another components of the robotic device (e.g., a head, eyes, a sensor, etc.). The robotic device can be configured to plan a trajectory for the skill, similar to that described above with respect to a manipulating element. For example, at 750-752, the robotic device can prompt and receive a user selection of a model for the skill, or alternatively, autonomously select a model for the skill. At 758, the robotic device can compute a function that transforms between a set of markers currently identified in the environment and a set of stored markers associated with the selected model (e.g., the marker(s) that were identified and stored with the model for the skill when the robotic device learned the skill). At 760, the robotic device can use the computed function to transform the configuration of the one or more components of the robotic device at each keyframe. At 764, the robotic device can plan a trajectory for the one or more components of the robotic device between each transformed keyframe. While transforming the keyframes and/or planning the trajectory, the robotic device can optionally take into account any environmental constraints associated with the setting in which the skill is being executed. At 772, the robotic device can implement movements of the one or more components of the robotic device according to the planned trajectory. In some embodiments, the robotic device can determine a joint configuration, at 762, present the planned trajectory to a user, at 766, and/or perform other optional steps as illustrated in FIG. 11.

Figure 12:
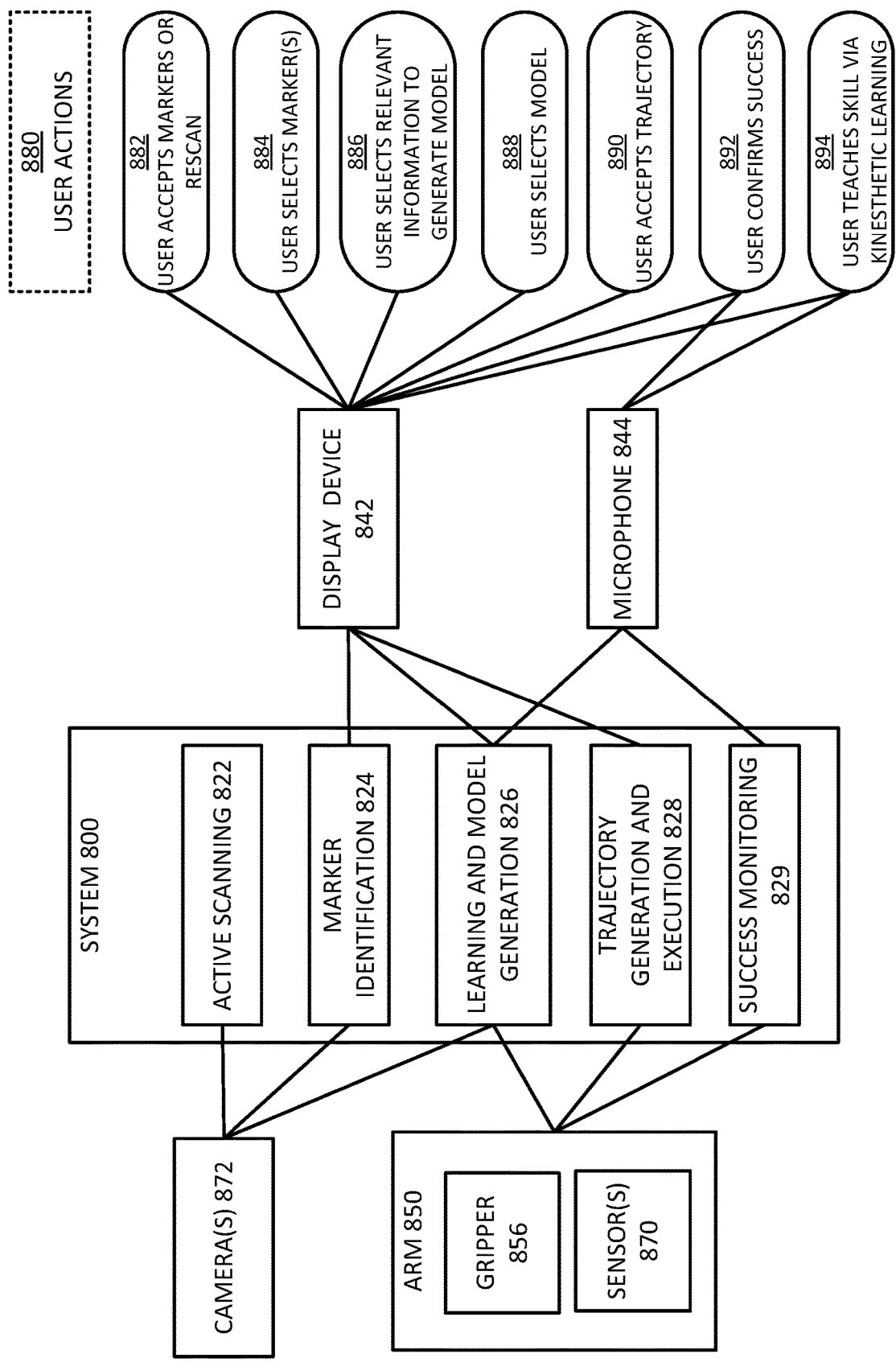
FIG. 12 is a block diagram showing a system architecture for robotic learning and execution, including user actions, according to some embodiments.

FIG. 12 is a block diagram showing a system architecture for robotic learning and execution, including actions performed by a user, according to some embodiments. A system 800 can be configured for robotic learning and execution. System 800 can include one or more robotic devices, such as any of the robotic devices described herein, and can execute modules, processes, and/or functions, depicted in FIG. 12 as active scanning 822, marker identification 824, learning and model generation 826, trajectory generation and execution 828, and success monitoring 829. Active scanning 822, marker identification 824, learning and model generation 826, trajectory generation and execution 828, and success monitoring 829 can correspond to one or more steps performed by a robotic device, as described in reference to method 700, depicted in FIGS. 8-11. For example, active scanning 822 include step 702 of method 700; marker identification 824 can include one or more of steps 704-710 of method 700; learning and model generation 826 can include one or more of steps 712-738; trajectory generation and execution 828 can include one or more of steps 712, 714, 718, and 750-774; and success monitoring 829 can include one or more of steps 774 and 776.

System 800 can be connected (e.g., in communication with) one or more devices, including, for example, camera(s) 872, an arm 850 (including a gripper 856 and sensor(s) 870), a display device 842, and a microphone 844. System 800, via display device 842, microphone 844, and/or other I/O device (not depicted) can receive inputs from a user associated with one or more user actions 880. User actions 880 can include, for example, 882, a user accepting markers or requesting a rescan of an environment, 884, a user selecting marker(s), 886, a user selecting relevant information to generate a model, 888, a user selecting a model for executing a skill, 890, a user accepting a trajectory for executing a skill, 892, a user confirming success of an executed skill, 894, a user teaching a skill via kinesthetic learning.

For active scanning 822, system 800 use camera(s) 872 to scan an environment and record sensory information about the environment, including information associated with one or more markers in the environment. For marker identification 824, system 800 can analyze the sensory information to identify one or more markers in the environment, and receive input(s) from a user, e.g., via display device 842, indicating 822, the user accepting the markers or requesting a rescan of the environment. For learning and model generation 826, system 800 can receive sensory information collected by camera(s) 872 and/or sensor(s) 870 on arm 850, and use that information to generate a model for a skill. As part of learning and model generation 826, system 800 can receive input(s) from a user, e.g., via display device 842 and/or microphone 844, indicating 884, that the user has selected a set of marker(s) for teaching the skill, 886, that a user has selected certain features of recorded sensory information to use in generating the model, and/or 894, that the user is demonstrating the skill. For trajectory generation and execution 828, system 800 can generate a planned trajectory and control movements of arm 850 to execute the trajectory. As part of trajectory generation and execution 828, system 800 can receive input(s) from a user, e.g., via display device 842, indicating 888, that the user has selected a model for generating a trajectory and/or 890, that the user has accepted or rejected the generated trajectory. For success monitoring 829, system 800 can determine whether the execution of a skill was successful by analyzing sensory information recorded by sensor(s) 870 during execution of the skill. As part of success monitoring 829, system 800 can receive input(s) from a user, e.g., via display device 842 and/or microphone 844, indicating 892, that the user has confirmed that the execution was successful.

While specific device(s) and/or connections between system 800 and those device(s) are depicted in FIG. 12, it is understood that additional device(s) (not depicted) can communicate with system 800 to receive from and/or send information to system 800, according to any of the embodiments described herein.

FIGS. 13-17 are flow diagrams illustrating methods 1300 and 1400 that can be performed by a robotic system (e.g., robotic system 100) including one or more robotic devices, according to embodiments described herein. For example, methods 1300 and/or 1400 can be performed by a single robotic device and/or multiple robotic devices.

Figure 13:
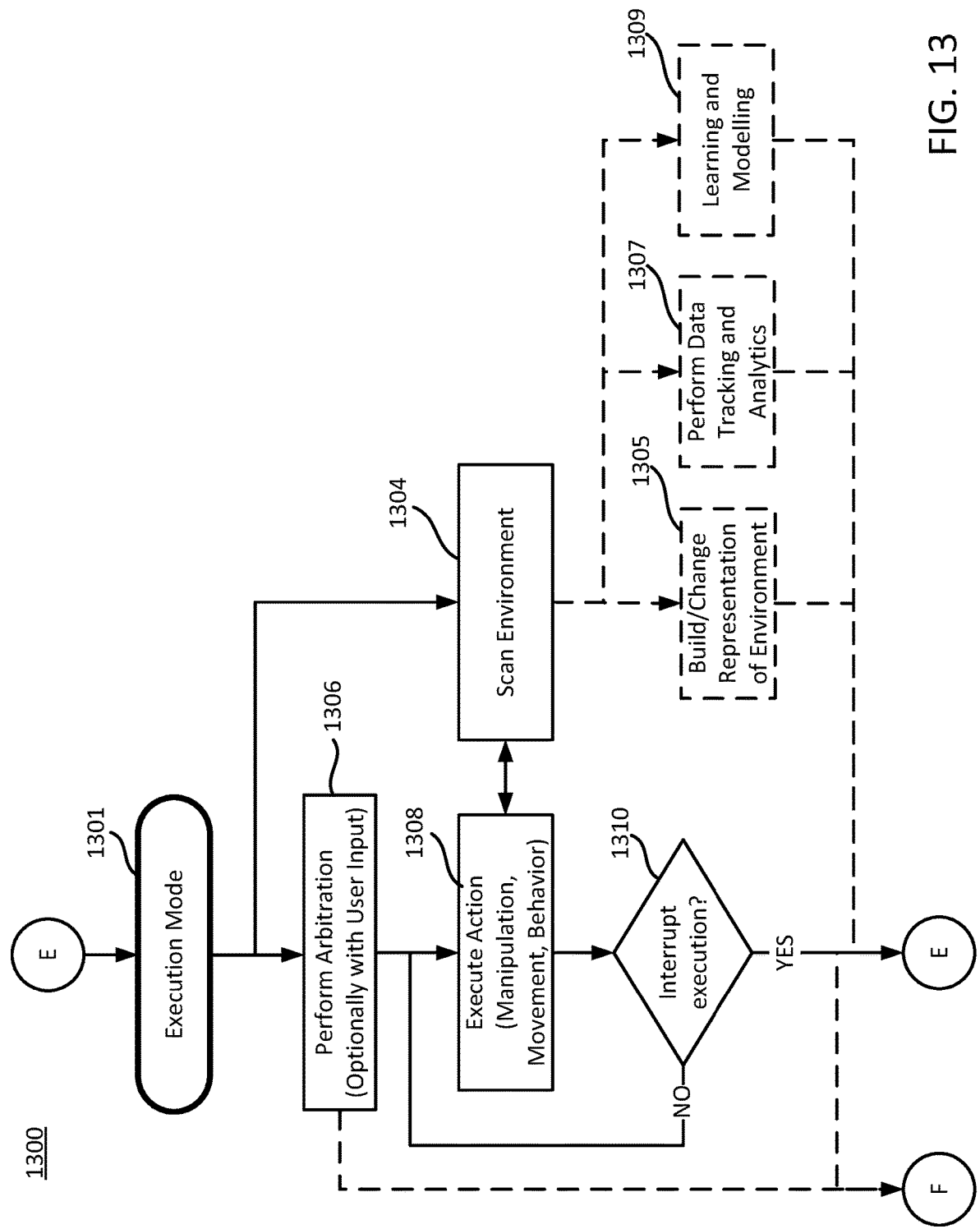
FIG. 13 is a flow diagram illustrating an operation of a robotic device within an environment, according to some embodiments.

As depicted in FIG. 13, a robotic device is configured to operate in an execution mode, at 1301. In the execution mode, the robotic device can autonomously plan and execute actions within an environment. To determine which actions to execute and/or plan how to execute an action, the robotic device can scan the environment and collect information on the environment, at 1304, and use that information to build and/or change a representation or map of the environment (e.g., representation 1600), at 1305. The robotic device can repeatedly (e.g., at predefined times and/or time internals) or continuously scan the environment and update its representation of the environment based on the information that it collects on the environment. Similar to methods described above, the robotic device can collect information on the environment using one or more sensors (e.g., sensor(s) 270 or 470, and/or image capture device(s) 472).

In some embodiments, the robotic device can repeatedly and/or continuously scan the environment, at 1304, for data tracking and/or analytics, at 1307. For example, the robotic device can move through an environment (e.g., a building such as a hospital), autonomously or remotely driven (e.g., by a robot supervisor), and collect data regarding the environment, objects within the environment, etc. This information can be used, for example, by a data tracking & analytics element (e.g., data tracking & analytics element 1606) that manages supplies and/or equipment for a hospital. In some embodiments, the robotic device can collect information on various humans (e.g., patients) to track the behavior of such patients (e.g., compliance with medications and/or treatments), run diagnostic tests, and/or conduct screening, etc.

In some embodiments, the robotic device can repeatedly and/or continuously scan the environment, at 1304, for modelling and learning purposes, at 1309. For example, the robotic device can collect data regarding its environment and/or objects within that environment (e.g., including humans and their behavior in response to robot actions), and use that information to develop new behavior and/or actions. In some embodiments, the robotic device can collect large amounts of information about an environment, which can be used by the robotic device to further refine and/or generate models specific to that environment. In some embodiments, the robotic device can provide this information to a robot supervisor (e.g., a remote user) that can use the information to further adapt the robotic device to a specific environment, e.g., by generating and/or modifying skill models and/or behaviors within that environment. The robot supervisor can in repeatedly (e.g., at specific intervals of time) and/or continuously (e.g., in real time) tweak the information that is collected by the robotic device and/or other robotic devices and/or the parameters of the models that the robotics are using. In some embodiments, the robot supervisor via this active exchange of information with the robotic device can repeatedly and/or continuously adapt the robotic device for a particular environment. For example, the robotic supervisor can modify planned paths that a robotic device may be using to navigate through an environment, which can in turn change the information and/or model(s) used by the robotic device to generate motion for its transport element. These changes, both provided by the robot supervisor and/or made by the robotic device, can feed into one or more layers of a map (e.g., map 1600) of the environment, such as, for example, a social or semantic layer of the map.

At 1306, the robotic device can determine which action(s) to execute within the environment, i.e., perform arbitration on a set of resources or components capable of executing certain actions. The robotic device can select between different actions based on one or more arbitration algorithms (e.g., arbitration algorithm(s) 1758). The robotic device can perform arbitration autonomously and/or with user input. For example, the robotic device can be configured to request user input when the robotic device cannot determine a current state of one or more of its components and/or an object within the environment, or when the robotic device cannot determine which action to execute and/or plan how to execute a selected skill. In some embodiments, the robotic device can be configured to autonomously select among a set of actions when the robotic device is familiar with a particular setting (e.g., has previously learned and/or executed actions in the setting) and to request user input when the robotic device encounters a new setting. When the robotic device encounters the new setting, the robotic device can request that a user select the appropriate action for the robotic device to execute or, alternatively, select an action and prompt a user to confirm the selection of the action.

In some embodiments, a human operator (e.g., a robot supervisor) can also monitor the robotic device and send a signal to the robotic device when the human operator wants to intervene in the execution of an action by the robotic device. The human operator can be located near the robotic device and/or at a remote compute device that is connected via a network to the robotic device or a nearby device that can be used to monitor the robotic device. The human operator may decide to intervene in the execution of an action by the robotic device, e.g., when the human operator wants to teach the robotic device a new skill or behavior, for safety reasons (e.g., to prevent harm to a human or the environment surrounding a robotic device), and/or to prevent injury to the robotic device.

In response to determining that user input is needed (e.g., because of an unfamiliar setting or in response to a signal from a user) (1312: YES), the robotic device can optionally prompt a user to provide a user input, at 1314. For example, the robotic device may cause an onboard display or a display located at a remote device (e.g., via a remote or cloud interface) to display a prompt to the user requesting the user input. The robotic device can receive a user input, at 1315, and perform arbitration based on that user input. When user input is not needed (1312: NO), the robotic device continues to autonomously perform arbitration.

After the robotic device has selected an action to execute, the robotic device can plan and execute the action, at 1308. As discussed above, the action can be associated with a task, such as a manipulation action (e.g., involving a manipulating element such as those described herein) or a movement (e.g., involving a transport element such as those described herein), and/or a social behavior. While executing the action, the robotic device can continue to scan its surrounding environment, at 1304. When the robotic device detect a change in its current state and/or a state of the environment (e.g., location of objects within the environment), the robotic device can evaluate the change to determine whether it should interrupt execution of the action, at 1310. For example, the robotic device can determine to interrupt execution of the action in response to detecting a physical engagement between one or more of its components and a human or other object in the environment (e.g., when a human operator touches a manipulating element), or when detecting the presence of a human or other object nearby. Additionally or alternatively, the robotic device can determine to interrupt execution of the action in response to receiving a signal from a user, e.g., a robot supervisor. In some embodiments, the robotic device can be configured in advance to interrupt execution of an action at specific points during the execution of an action, e.g., when the robotic device may need a user to demonstrate a part of the action, as defined in an interactive learning template. Further details regarding learning using interactive learning templates is explained herein, with reference to FIG. 15.

Figure 14:
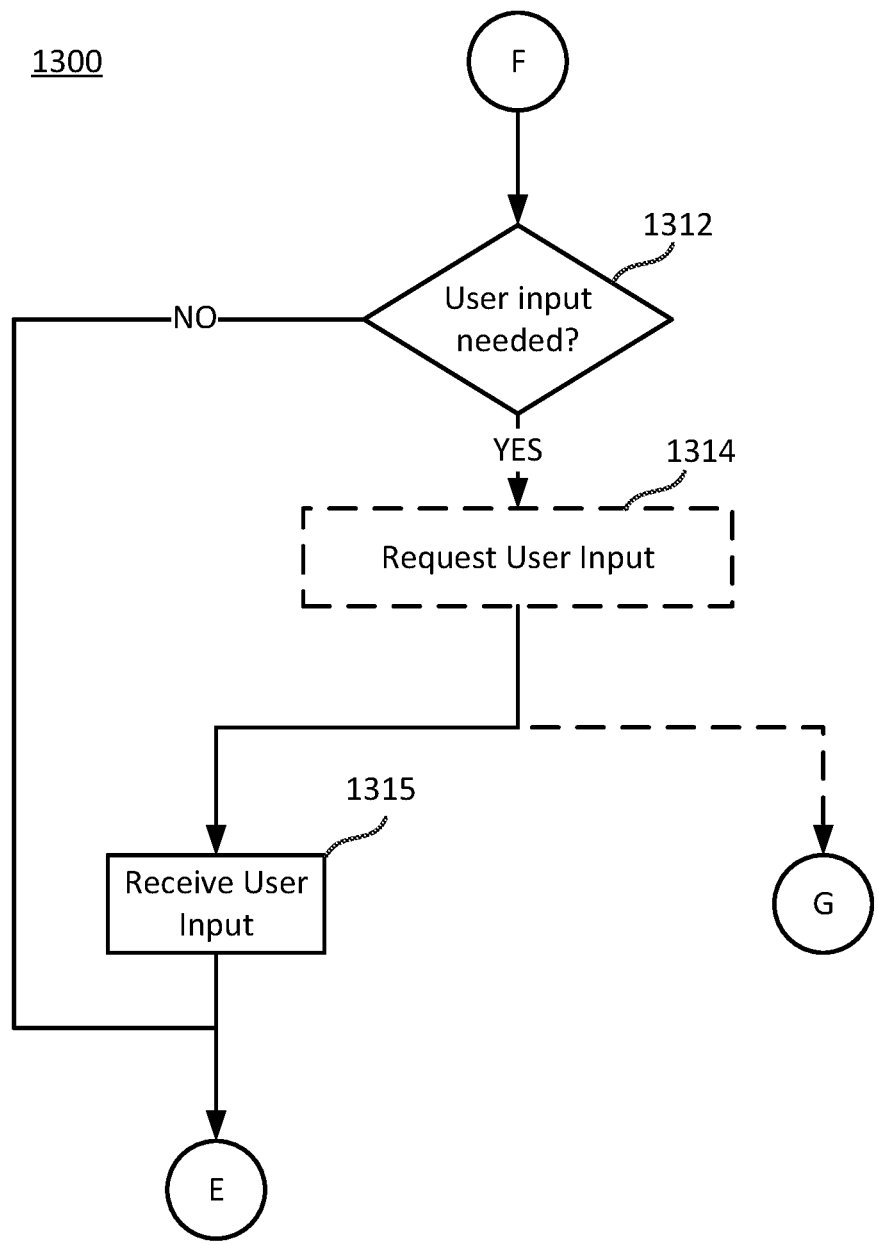
FIG. 14 is a flow diagram illustrating a method of requesting and receiving input from a user, such as a robot supervisor, according to some embodiments.
Figure 15:
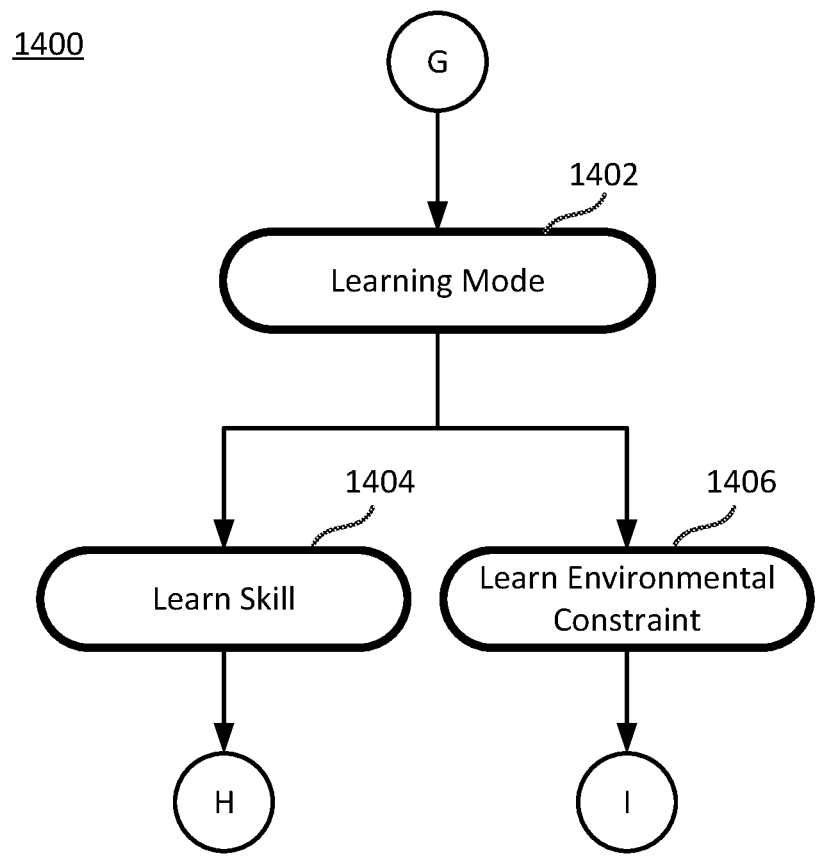
FIG. 15 is a flow diagram illustrating a method of learning skills and environmental constraints performed by a robotic device, according to some embodiments.

If the robotic device determines to interrupt execution of the action (1310: YES), then the robotic device may determine whether user input is needed, at 1312. As discussed above, if the robotic device determines that user input is required (1312: YES), then the robotic device may optionally prompt for a user input and/or receive a user input, at 1314-1315. The robotic device can then return to scanning its surrounding environment, at 1304, performing arbitration on a set of resources, at 1306, and/or executing an action, at 1308. Optionally, as depicted in FIGS. 14 and 15, when the robotic device determines that user input is required, the robotic device can switch to a learning mode, at 1402, and then proceed to learn a skill, at 1404, or to learn an environmental constraint, at 1406. If the robotic device determines that user input is not needed (1312: NO), then the robotic device can return to scanning its surrounding environment, at 1304, performing arbitration on a set of resources, at 1306, and/or executing an action, at 1308. If the robotic device determines that the action does not need to be interrupted (1310: NO), then the robotic device can continue to execute the action, at 1308.

In some embodiments, the user input received by the robotic device, e.g., at 1315, can include feedback from a user regarding whether the selection and/or execution of a skill was appropriate and/or successful. For example, a user can tag an action (e.g., a task or behavior) being executed by the robotic device (or having previously been executed by the robotic device) as a positive or negative example of the action. The robotic device can store this feedback (e.g., as success criteria associated with the action and/or other actions) and use it to adjust its selection and/or execution of that action or other actions in the future.

In some embodiments, the robotic device is configured to engage in socially appropriate behavior. The robotic device may be designed to operate in an environment with humans. When operating around humans, the robotic device can be configured to continually plan for how its actions may be perceived by a human, at 1306-1308. For example, when the robotic device is moving, the robotic device can monitor its surrounding environment for humans, at 1304, and engage in social interactions with any humans that it encounters, at 1308. When the robotic device is not executing any task (e.g., is stationary), the robotic device can continue to monitor its surrounding environment for humans, at 1304, and determine whether it may need to execute one or more socially appropriate behaviors based on how a human may perceive its presence, at 1306. In such embodiments, the robotic device may be configured with an underlying framework (e.g., one or more arbitration algorithms) that plans for and executes behavior that is socially appropriate given any particular context or setting. The robotic device can be configured to manage multiple resources (e.g., a manipulating element, a transport element, a humanoid component such as a head or eyes, a sound generator, etc.) and to generate appropriate behavior based on one or more of these resources.

Figure 18:
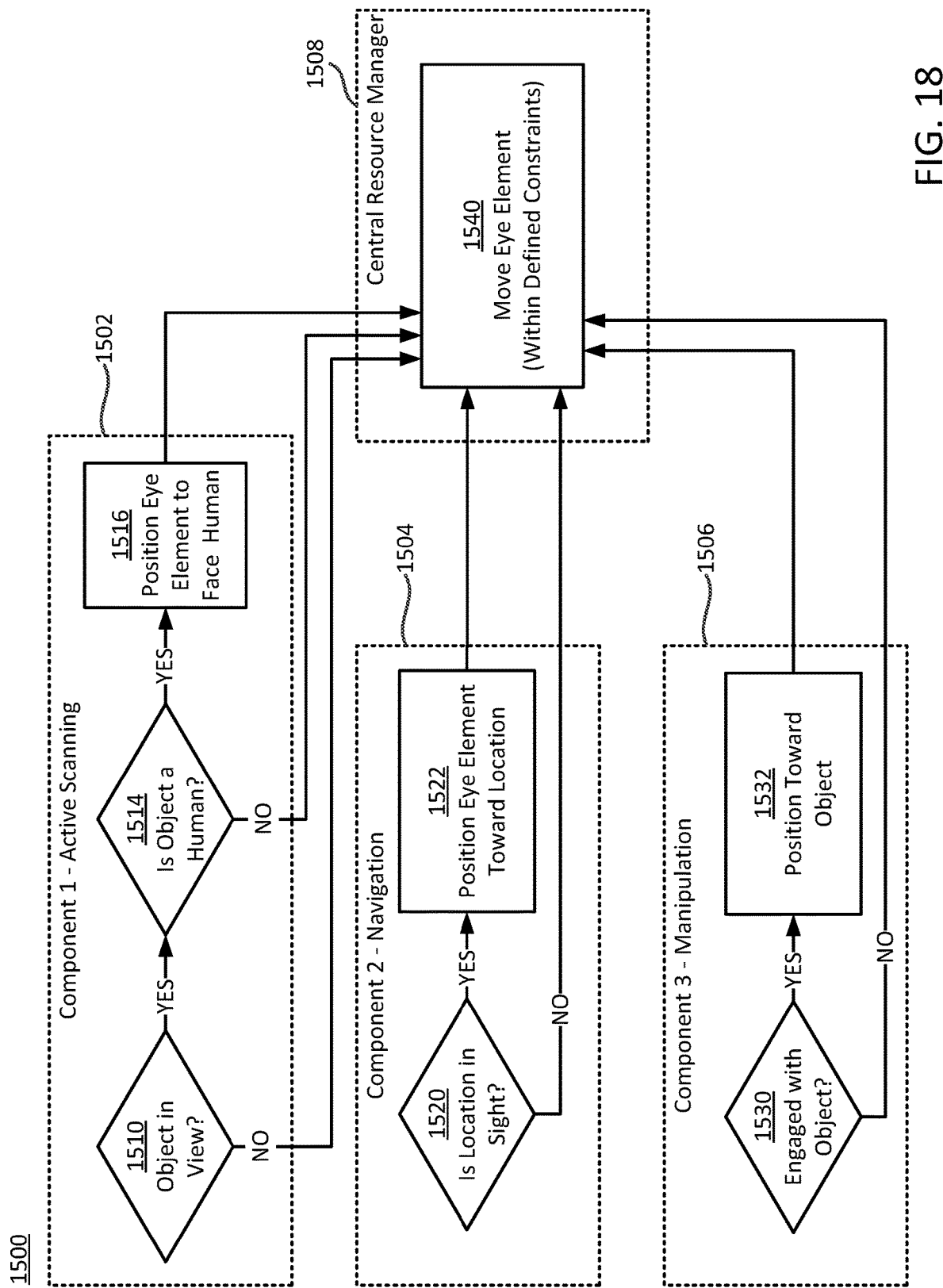
FIG. 18 is a block diagram illustrating an example of components of a robotic device performing behavior arbitration, according to some embodiments.

FIG. 18 provides an example of components of a robotic device performing arbitration on an attention mechanism (e.g., an eye element). For example, a robotic device may have a camera or other element that can be perceived by a human as having an eye gaze (e.g., an eye element). Humans near the robotic device may perceive the direction that the eye element is directed toward as being what the robotic device is paying attention to. Accordingly, the robotic device can be configured to determine where the eye element is pointed toward when the robotic device is operating and/or near a human. The robotic device can continually arbitrate the use of the eye element such that the robotic device maintains socially appropriate behavior when operating around and/or being in the presence of humans.

As depicted in FIG. 18, different components of the robotic device can request eye gaze targets (e.g., to have the eye element directed in a particular direction). A first component (e.g., a camera, laser, or other sensor) associated with active scanning can determine that an object is in the field of view of the eye element, at 1510. The first component can further determine that the object is a human, at 1514. In response to determining that the object is a human, the first component can send a request 1516 to a central resource manager 1508 (e.g., a control unit (e.g., control unit(s) 202, 302, and/or 1702) and/or a component of the control unit) to have the eye element directed toward a face of the human. A second component (e.g., a camera, laser, or other sensor) associated with a navigation action can determine that a particular location (e.g., an intermediate or final destination of the navigation) is within sight of the eye element, at 1520. In response to determining that the location is in sight, the second component can send a request 1522 to the central resource manager 1508 to have the eye element directed toward the location. A third component (e.g., a sensor on a manipulation element, a camera, or other sensor) associated with a manipulation action can determine that the robotic device is engaged with an object (e.g., the robotic device is carrying an object, a human has touched the robotic device), at 1530. In response to determining that the robotic device is engaged with the object, the third component can send a request 1532 to the central resource manager 1508 to have the eye element directed toward the object.

The central resource manager 1508 receives the requests 1516, 1522, and 1532 from the components of the robotic device and can perform arbitration to determine which direction to direct the eye element, at 1540. When determining which direction to direct the eye element, the central resource manager 1508 can take into account any defined rules or constraints, e.g., socially appropriate constraints. These defined rules can include, for example, not moving the eye element twice during a predefined period of time (e.g., about five seconds), having the eye element to face a direction for at least a predefined minimum period of time (e.g., about five seconds), having the eye element move after a predefined maximum period of time which can be different for a non-human object versus a human, etc. The defined rules can be encoded into an arbitration algorithm for managing the eye gaze resource.

In some embodiments, the central resource manager 1508 can perform arbitration of the eye gaze resource based on social context and other information collected on an environment. For example, the robotic device can be configured to associate certain behavior with particular locations, e.g., waiting for humans to pass through a busy doorway or hallway before attempting to navigate through the doorway or hallway, operating with less sound (e.g., refraining from using sound and/or speech functionality) in a quiet area, etc. The robotic device can be configured to capture social context information associated with such locations and add it into a representation of the environment used for navigation (as described herein with reference to FIG. 19). In some embodiments, a human operator can also provide the robotic device with social context information, which the robotic device can adapt over time as the robotic device learns more about the environment in which it operates.

Figure 16:
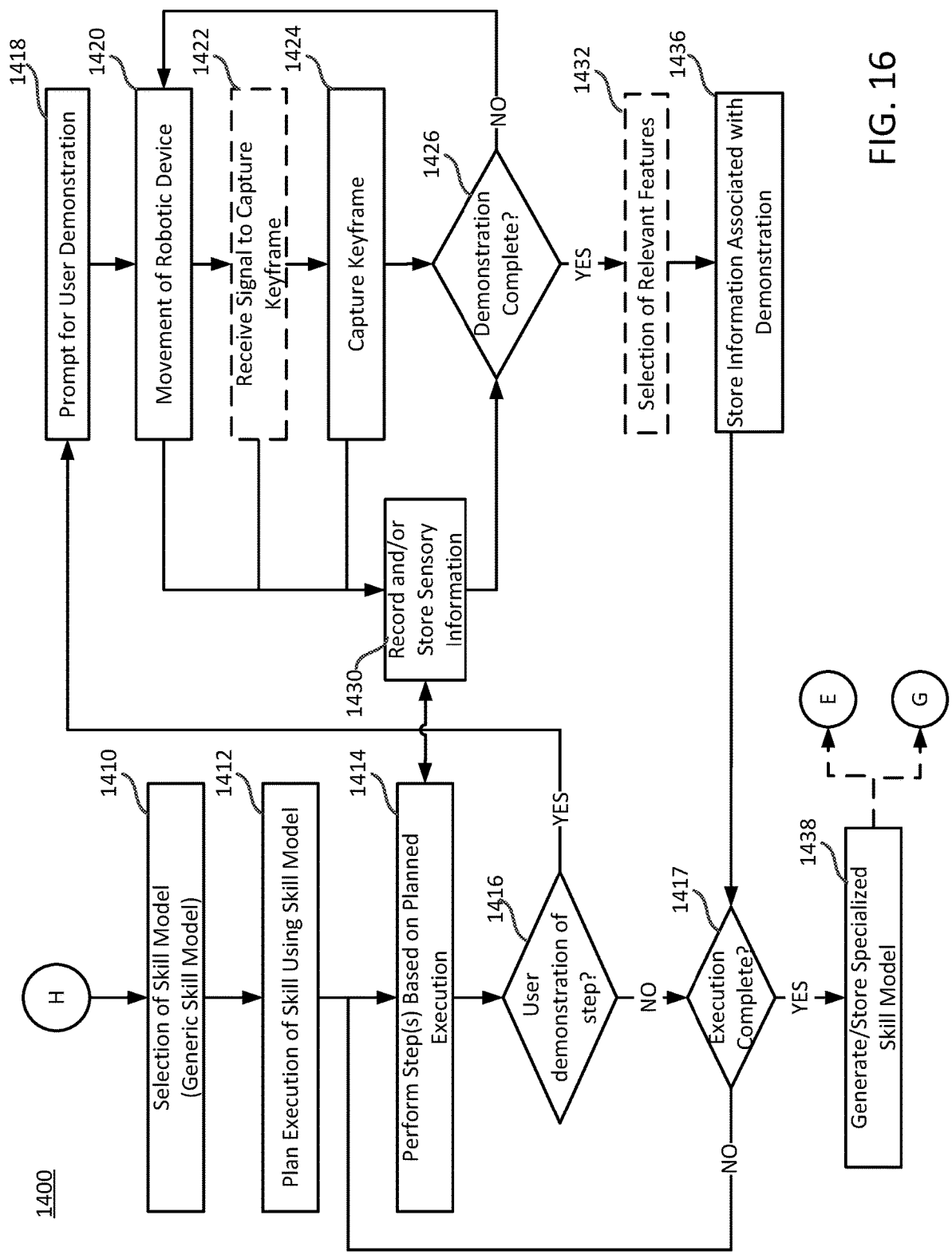
FIG. 16 is a flow diagram illustrating a method of learning a skill from a generic skill model performed by a robotic device, according to some embodiments.
Figure 17:
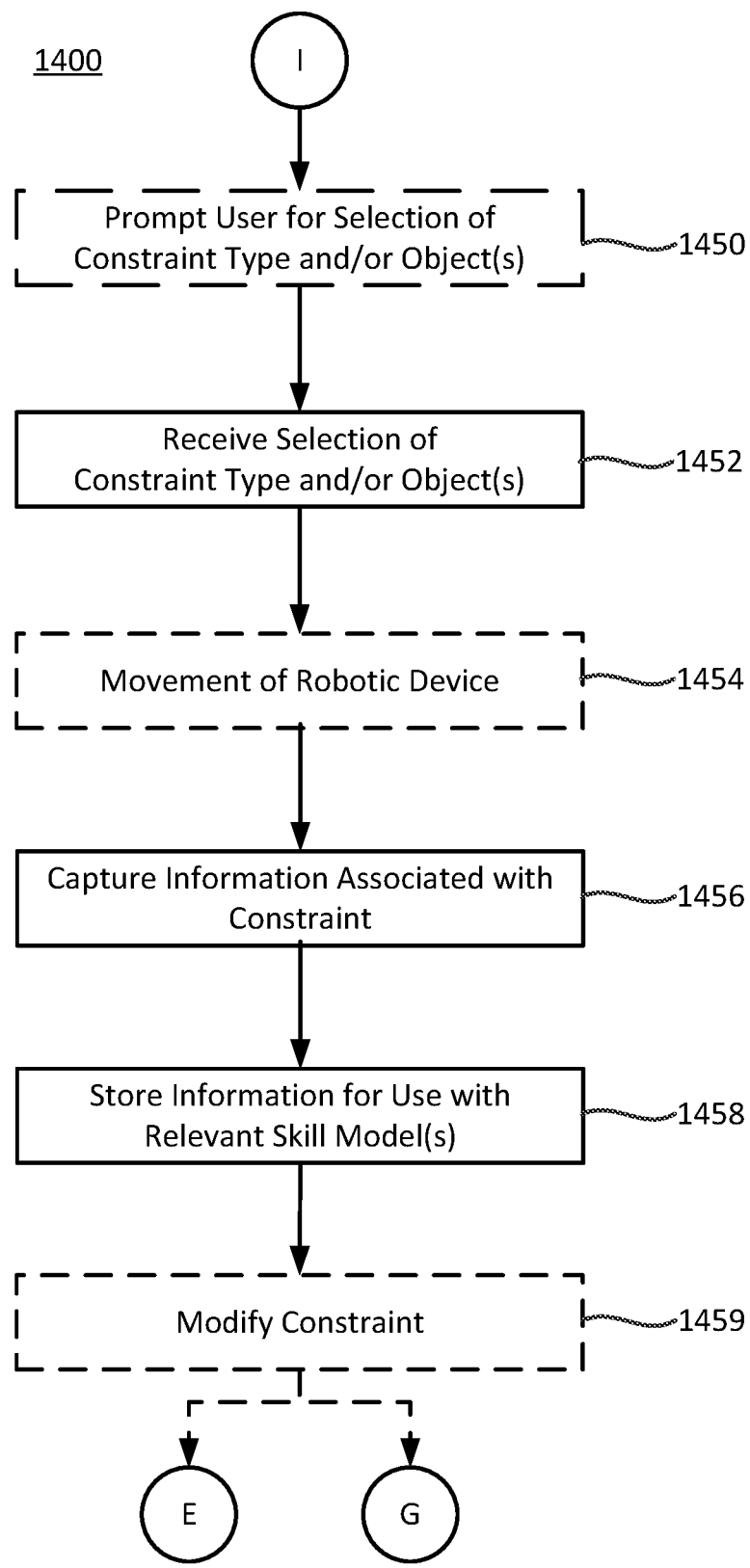
FIG. 17 is a flow diagram illustrating a method of learning an environmental constraint performed by a robotic device, according to some embodiments.

FIGS. 15-17 illustrate flow diagrams of a robotic device operating in a learning mode. As discussed above, a robotic device can operate in an execution mode and switch to operating in a learning mode, e.g., when the robotic device determines that it requires user input, at 1312. Alternatively or additionally, a robotic device can be set to operate in a learning mode, e.g., when the robotic device is initially deployed in a new environment (e.g., a new area, building, etc.). The robotic device can operate in the learning mode until a user indicates to the robotic device that it can switch to operating in the execution mode and/or the robotic device determines that it can switch to operating in the execution mode.

When operating in the learning mode, the robotic device can learn a skill, at 1404, and/or learn an environmental constraint, at 1406. The robotic device can be configured to learn a skill with or without an existing model of the skill (e.g., a generic model of the skill). When learning a skill without an existing model (e.g., learning a skill without relying prior knowledge), the robotic device can generate a model for the skill after being guided through a demonstration of the skill, as described herein with respect to FIG. 10. When learning a skill with an existing model (e.g., a generic model of the skill), the robotic device can initiate execution of the skill with the existing model and request user input when the robotic device needs a user to demonstrate a part of the skill. The existing model of the skill can be or form a part of an interactive learning template, i.e., a template for guiding the robotic device to learn a skill with input from a user at specified points during the execution of the skill.

FIG. 16 depicts a process for learning a skill using an interactive learning template. A robotic device may be deployed in a specific setting, e.g., a building. The robotic device may make a selection of an existing model of a skill, at 1410. The existing model of the skill may be a generic model of the skill that is not specialized to the environment or setting in which the robotic device is operating. At 1412, the robotic device can generate a plan for executing the skill using the skill model, according to a process similar to the process discussed herein with reference to FIG. 11. At 1414, the robotic device can initiate the execution of the skill by performing one or more steps or parts of the skill that do not require user input and/or specialization. Upon reaching a part of the skill (e.g., a part where the robotic device cannot determine how to execute, or a part of the skill that requires specialization to the setting in which the robotic device is executing the skill) (1416: YES), the robotic device can prompt a user to provide a demonstration of that part of the skill, at 1418. In some embodiments, the interactive learning template may indicate to the robotic device when it should prompt a user for a demonstration. Alternatively or additionally, the robotic device may autonomously determine that it requires user input to be able execute a part of the skill, e.g., when the robotic device cannot determine the state of an object in the environment and/or generate a plan to execute a particular part of the skill given constraints imposed by the environment. In some embodiments, a user (e.g., a robot supervisor) may also be monitoring the robotic device's execution of the skill and send a signal to the robotic device when the user wants to demonstrate a part of the skill to the robotic device. The robotic device, upon receiving the signal from the user, can then determine to proceed to 1418.

At 1420, a user can guide the robotic device through a movement. For example, the user can move one or more components of the robotic device (e.g., a manipulating element, a transport element, etc.) to demonstrate the part of the skill. While guiding the robotic device through the movement, the user can optionally indicate to the robotic device when to capture information about the state of one or more of its components and/or the environment, at 1422. For example, the robotic device can receive a signal from the user to capture sensory information, including information about the manipulating element, transport element, and/or environment, at a keyframe during the movement of the robotic device. Alternatively, the robotic device can autonomously determine when to capture sensory information. For example, while the robotic device is being moved by a user, the robotic device can monitor changes in one or more of its components, and when those changes exceed a threshold, or when there is a directional change in a trajectory of a component, the robotic device can autonomously select that point to be keyframe and record information about the robotic device and/or environment at that keyframe. In response to receiving a signal from a user or autonomously determining to capture sensory information, the robotic device can capture sensory information using one or more of its sensors, at 1424. During the movement of the robotic device, the robotic device can also continuously or periodically, without receiving a signal from a user, record sensory information, at 1430.

Once the movement or demonstration is complete (1426: YES), the robotic device can optionally receive a selection of features that are relevant to learning the part of the skill that has been demonstrated, at 1432. In some embodiments, the robotic device can autonomously make a selection of features and/or prompt a user to confirm the selection made by the robotic device, at 1432. At 1436, the robotic device can store the information associated with the demonstration. If the execution of the skill is not complete (1417: NO), then the robotic device continues with its execution of the skill, at 1414, and can prompt the user for additional demonstrations of parts of the skill, as needed, at 1418. The robotic device can continue to cycle through the interactive learning process until the execution of the action is complete (1417: YES), at which point the robotic device can generate a model for the skill with parts that are specialized to the setting in which the robotic device executed the skill, at 1438. The robotic device can then learn another skill and/or environmental constraint. Alternatively, if the robotic device does not need to learn another skill and/or environmental constraint, the robotic device can switch into its execution mode, at 1301, and begin scanning an environment, performing arbitration, and/or executing actions.

With interactive learning templates, a robotic device taught and/or provided an initial set of models for skills. The initial set of models can be developed before the robotic device is deployed on-site in a specific environment (e.g., a hospital). For example, this initial set of models can be developed in a factory setting or at a training location, and made available to the robotic device. Once deployed on-site, the robotic device can adapt or specialize the initial set of models to the environment, e.g., via an interactive learning session, as described herein. Moreover, as new models are developed (e.g., off site at a factory or training location), the new models can be made available to the robotic device, e.g., via a network connection. Accordingly, systems and methods described herein enable a user and/or entity to continue to develop new models for skills and provide those to robotic devices, even after those robotic devices have been deployed on-site.

An example of an interactive learning session can involve adapting a generic model for moving an item into a room. The robotic device can be equipped with the generic model and deployed on-site at a hospital. When deployed at the hospital, the robotic device can autonomously initiate execution of the skill to move an item into a patient room, at 1412-1414. For example, the robotic device can autonomously navigate to the patient room using a map of the hospital. Once the robotic device has navigated to the patient room, the robotic device can determine that it needs a user to demonstrate where to drop off the item in the patient room (1416: YES). The robotic device can prompt a user to move it to the specific drop-off location, at 1418. The user can control the movement of the robotic device, e.g., using a joystick or other type of control device, at 1420. As discussed above, the user can be located on-site near the robotic device or located at a remote location. While the user moves the robotic device to the drop-off location, the robotic device can capture sensory information about its current state and/or its surrounding environment, at 1424 and/or 1430. Once at the drop-off location, the robotic device can switch back to autonomous execution, at 1414. For example, the robotic device can execute a known arm motion, e.g., locating the item in a container on-board the robotic device, grabbing the item using a manipulating element, and positioning its manipulating element in a generic position for releasing the item. The robotic device can determine for a second time that it needs a user to demonstrate a part of the skill, e.g., dropping the item on a shelf (1416: YES). The robotic device can prompt the user for another demonstration, at 1418, and the user can move the manipulating element such that the item is in position over the shelf. The robotic device can capture sensory information again during the movement of the manipulating element, at 1424 and/or 1430. The robotic device can regain control once again and autonomously open a gripper of the manipulating element to drop off the item on the shelf and then retract its manipulating element back into a resting position, at 1414. The robotic device can then determine that execution is complete (1417: YES) and generate a specialized model of the skill based on the information it captured during the two user demonstrations, at 1438.

Other examples of interactive learning session can include adapting a navigation action, e.g., to navigate through a specific hallway and/or doorway, as discussed above.

In some embodiments, a user (or robotic device) can modify a model for a skill after the skill is demonstrated and/or a model for the skill is generated. For example, a user can iterate through keyframes captured during a demonstration of the skill and determine whether to keep, modify, and/or delete those keyframes. By modifying and/or deleting one or more keyframes, the user can modify a model for the skill generated based on those keyframes. Examples of using iterative and adaptive versions of keyframe-based demonstrations are described in the article entitled "Trajectories and keyframes for kinesthetic teaching: a human-robot interaction perspective," authored by Akgun et al., published in Proceedings of the 7th Annual ACM/IEEE International Conference on Human-Robot Interaction (2012), pp. 391-98, which is incorporated herein by reference. As another example, an interactive graphical user interface ("GUI") can be used to display keyframes captured during a demonstration of a skill to a user such that the user can indicate how much variance associated with a position, orientation, etc. of the components of the robotic device is acceptable during a planned execution. Examples of using a GUI with keyframes are described in the article entitled "An Evaluation of GUI and Kinesthetic Teaching Methods for Constrained-Keyframe Skills," authored by Kurenkov et al., published in IEEE/RSJ International Conference on Intelligent Robots and Systems (2015), accessible at http://sim.ece.utexas.edu/static/papers/kurenkov_iros2015.pdf, which is incorporated herein by reference. These examples enable modification of a model for a skill after the skill is learned. Systems and methods described herein further provide a learning template that enables a robotic device to plan and execute certain parts of the skill while leaving other parts of the skill to user demonstration during an on-going execution of the skill. Moreover, systems and methods described herein provide a robotic device that can determine when to collect data and/or request demonstration of a part of a skill, e.g., autonomously or based on information provided to the robotic device in advance of the learning process.

FIG. 17 depicts a process for learning an environmental constraint. As noted above, a robotic device can be configured to learn an environmental constraint, which may be applicable to a set of skills that are learned and/or executed in a setting including the environmental constraint. At 1450, the robotic device can optionally prompt a user for a selection of a type of constraint and/or an object associated with the constraint. The constraint type can be, for example, a barrier (e.g., a wall, a surface, a boundary), a size and/or dimension, a restricted area, a location of an object, etc. At 1452, the robotic device can receive a selection of a constraint type and/or object. Optionally, at 1454, a user (or other robotic device) can guide the robotic device through a movement to demonstrate the environmental constraint. For example, a user can demonstrate the size of a supply bin to a robotic device by moving a manipulating element of the robotic device along one or more edges of the bin. As another example, a user can demonstrate a location of a shelf by moving a manipulating element of the robotic device along a surface of the shelf. During a movement of the robotic device, the robotic device can capture information associated with the constraint using one or more sensors (e.g., camera, laser, tactile, etc.), at 1456. At 1458, the robotic device can store the captured information associated with the environmental constraint for use with models of any skills executed in a setting including the environment constraint. In some embodiments, the robotic device may include the information associated with the environmental constraint in each model for a skill that is executed in the setting. Alternatively, the robotic device can be configured to reference the information associated with the environmental constraint when planning and/or executing a skill in the setting. In some embodiments, the environmental constraint may be added to a representation of the environment (e.g., representation 1600).

In some embodiments, the robotic device can learn the environmental constraint without requiring a user demonstration or movement of the robotic device. For example, after receiving a selection of a constraint type and/or object, at 1452, the robotic device can be configured to scan the environment for relevant information associated with the environmental constraint, at 1456. In some embodiments, the robotic device can present the information that it captures and/or determines to be relevant to the environmental constraint to a user such that the user can confirm and/or modify what information is relevant to the environmental constraint. The robotic device can then store the relevant information, at 1458.

In some embodiments, the robotic device can use a transport element (e.g., wheels or tracks) to move about an environment and learn one or more environmental constraints. For example, the robotic device can move through a corridor or hallway, e.g., while undergoing a demonstration and/or executing a skill, and learn that the corridor is busy during certain time frames. In some embodiments, the robotic device can learn and associate various environmental constraints and/or behaviors with different conditions (e.g., time, location, etc.). For example, the robotic device can recognize that a corridor is busy based on information collected by its sensor(s), user input, and/or information derived from sensed information (e.g., during a demonstration and/or execution of a skill). As another example, the robotic device can determine that it should respond with a "hello" or "good night" at different times of day when a user enters a particular room.

In some embodiments, the robotic device can learn environmental constraints autonomously and interactively. For example, the robotic device can acquire an initial set of environmental constraints by moving through an environment (e.g., moving through a corridor or hallway), at 1458. A user (e.g., a robot supervisor or local user) can review the constraint and determine whether to adjust the constraint by directly modifying the constraint and/or via demonstration, at 1459. For example, some constraints can be provided through an interaction with the robotic device (e.g., a demonstration), while other constraints (e.g., a location of an object such as, for example, a distance a shelf extends from a wall) can be provided through an input (e.g., to a user interface such as, for example, user interface 240).

FIG. 21 depicts an example of information that flows from and feeds into a map 2120 (e.g., a map of a building such as, for example, a hospital). The map 2120 can be stored and/or maintained by one or more robotic devices, such as any of the robotic devices as described herein. The map 2120 can be similar to map 1600, as depicted in FIG. 19. For example, the map 2120 can include one or more layer(s) 2122 such as, for example, a navigation layer, a static layer, a dynamic layer, and a social layer.

The map 2120 can provide information that a robotic device can used while operating in a learning mode 2102 or an execution mode 2112. For example, a robotic device operating in the learning mode 2102 can access the map 2120 to obtain information regarding environmental constraint(s), object(s), and/or social context(s) (e.g., similar to state information 331, 1732, object information 340, 1740, environmental constraint(s) 1754, social context 1632, etc.). Such information can enable the robotic device to determine a location of object(s), identify characteristic(s) of object(s), analyze one or more environmental constraint(s), select skill model(s) to use, prompt user(s) for input(s), etc., as described herein. Additionally or alternatively, a robotic device operating in the execution mode 2112 can access the map 2120 to obtain information regarding environmental constraint(s), object(s), and/or social context(s), and use that information to evaluate an environment, arbitrate between different behaviors or skills, determining which skills to execute, and/or adapt behavior or skills to suit a particular environment.

A robotic device operating in the learning mode 2102 can also provide information that adds to and/or changes information within the map 2120. For example, the robotic device can incorporate sensed information 2104 (e.g., information collected by one or more sensor(s) of the robotic device) and/or derived information 2106 (e.g., information derived by the robotic device based on, for example, analyzing sensed information 2104) into the map 2120. The robotic device can incorporate such information by adding the information to the map 2120 and/or adapting existing information in the map 2120. Additionally, the robotic device operating in the execution mode 2112 can provide information (e.g., sensed information 2114, derived information 2116) that adds to and/or changes information within the map 2120.

As an example, a robotic device undergoing a demonstration (e.g., such as that depicted in FIGS. 10 and 16) of how to navigate through a doorway can collect information during the demonstration that feeds into the layer(s) 2122 of the map 2120. The doorway can be a specific doorway that exists at various locations throughout a building, e.g., as represented in the map 2122. Characteristics and/or properties of the doorway can be recorded by various sensors on the robotic device and/or derived by the robotic device based on sensed information. For example, the robotic device can sense a size of the doorway and determine that the doorway is a tight doorway. The robotic device can add this information regarding the doorway to the map 2120, e.g., using one or more semantic labels, as raw or processed sensor information, as a derived rule, etc. The robotic device can also use the information to adapt a contextual layer of the map (e.g., a social or behavioral layer of the map, e.g., such as social layer 1630 depicted in FIG. 19). For example, the robotic device can determine to engage in specific behavior(s) and/or action(s) based on the doorway being a tight doorway, including, for example, going through the doorway when the doorway has been opened by a user (or other robotic device(s)) instead of going through the doorway following and/or alongside a user (or other robotic device(s)), seeking a specific user familiar with the doorway to assist the robotic device with navigating through that doorway (e.g., by holding open the doorway and/or guiding the robotic device through various action(s)), etc.

In some embodiments, the map 2120 can be centrally maintained for one or more robotic devices described herein. For example, the map 2120 can be stored on a remote compute device (e.g., a server) and centrally hosted for a group of robotic devices that operate together, e.g., in a hospital. The map 2120 can be updated as information (e.g., sensed information 2104, 2114 and derived information 2106, 2116) is received from the group of robotic devices as those robotic devices operate in learning mode 2102 and/or execution mode 2112, and be provided to each of the robotic devices as needed to execute actions, behavior, etc. As individual robotic devices within the group learn new information such that one or more layer(s) 2122 of the map 2120 are adapted, this information can be shared with the other robotic devices when they encounter a similar environment and/or execute a similar skill (e.g., action, behavior). In some embodiments, a local copy of the map 2120 can be stored on each robotic device, which can be updated or synchronized (e.g., at predetermined intervals, during off hours or downtime) with a centrally maintained copy of the map 2120. By regularly updating the map (e.g., with newly collected information, such as sensed information 2104, 2114 and derived information 2106, 2116) and/or sharing the map between robotic devices, each robotic device can have access to a more comprehensive map that provides it with more accurate information for interacting with and/or executing skills within its surrounding environment.

Figure 24:
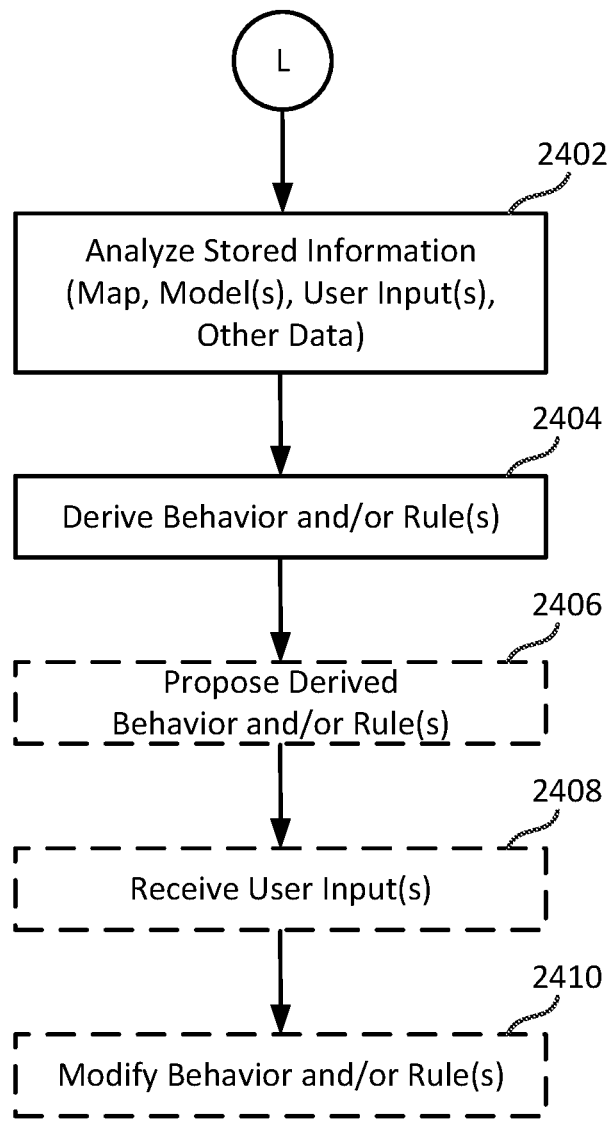

In some embodiments, the map 2120 can be a mixed initiative map where information (e.g., environmental constraint(s), rule(s), skill(s), etc.) can be learned (e.g., during learning 2102 and/or execution 2112) and/or provided by a user (e.g., via user input 2130). For example, the robotic device can build on the map 2120 by incorporating information directly given by a user (e.g., a robot supervisor or local user), learned through demonstration and/or execution, or interactively provided through a combination of demonstration and/or execution and user input (e.g., requested by a robotic device about an interaction in real-time or retroactively). For example, a user can indicate to a robotic device that it should move slower through a region on the map 2120 (e.g., a narrow or busy hallway). In some embodiments, the robotic device can present a map to the user, and the user can draw the region on the map and indicate that the robotic should move slower through that region. The robotic device may attempt moving through the region on the map 2120 for a number of times, and learn that the region should be avoided at certain times of day (e.g., due to overcrowding). Alternatively or additionally, the robotic device can encounter a new situation that the robotic device is not familiar with handling autonomously (e.g., the hallway being sectioned off). In such instances, the robotic device can communicate with a user (e.g., a robot supervisor and/or local user) to gain more information about the region and/or determine how to navigate around the region. When requesting the user's input, the robotic device can ask broadly regarding the situation and/or provide a list of examples for a user to label (e.g., to enable the robotic device to autonomously derive an appropriate behavior). In some embodiments, the robotic device can detect and/or derive information regarding a region without user input, and propose one or more rules associated with that region to a user for confirmation. In some embodiments, a user, upon viewing a proposed rule and/or other information from a robotic device, can modify the rule and/or other information before accepting it. FIG. 24, described below, provides a more detailed description of such a process.

FIGS. 22-25 are flow diagrams that depict different avenues through which a robotic device (e.g., any of the robotic devices described herein including, for example, (e.g., robotic device 102, 110, 200, 400, etc.) can learn skill(s), environmental constraint(s), etc. In some embodiments, a robotic device operating according to the methods described herein can be constantly learning (e.g., operating in a learning mode). For example, the robotic device can be collecting, storing, analyzing, and/or updating information on a continuous basis, and be adapting and/or adding to its library of learned information (e.g., skills, behaviors, environmental constraints, map, etc.), as it navigates through an environment and/or engages in certain behavior or actions. In other embodiments, a robotic device can switch between operating in a learning mode or in an execution mode. While operating in a learning mode 2202, a robotic device such that those described herein can learn via demonstration 2204, via execution 2206, via exploration 2208, via derivation/user input 2210, and/or any combination thereof.

In some embodiments, the robotic device can learn through demonstration 2204, e.g., as previously shown and described with reference to FIGS. 8-10. For example, the robotic device can learn a new skill or environmental constraint through a demonstration of a skill using the LfD teaching process. The robotic device can analyze and extract information from past demonstrations of a skill in a human environment. As an example, a user can demonstrate to the robotic device how to move its manipulation element (e.g., an arm) in a supply room with a human and the robotic device. From the demonstration(s), the robotic device can define one or more environmental constraints that limit its motion when planning and/or executing the skill in the future to the motion of the existing demonstration(s). The robotic device can generate motions and construct a graph, where the environment constraints are encoded, using existing demonstrations (e.g., sequences of keyframe(s)) each offering a node and path through an nth dimensional space of motion. When the robotic device is then presented with a new environment and needs to adapt the skill to that new environment, the robotic device can efficiently sample from its existing set of demonstrated motions using the constructed graph to plan a motion for the new environment. By building in the learning of such environmental constraints into the initial demonstrations of a skill, the robotic device can quickly adapt to new environments without requiring new environmental constraints to be defined. In the new environment, the robotic device can scan the environment to obtain additional information regarding that environment and/or object(s) (e.g., humans, supplies, doors, etc.) within the environment, and then use its existing skill model to plan a motion trajectory through the new environment without deviating significantly from its existing set of demonstrated motions.

In some embodiments, the robotic device can learn through demonstration 2204 and user input 2210. For example, the robotic device can engage in interactive learning with a user, e.g., with an interactive learning template. As described above, with interactive learning, the robotic device and/or provided an initial set of skill models. The initial set of models can be developed in a factory setting, by other robotic device, and/or the robotic device itself in one or more settings. While operating in a specific environment, the robotic device can adapt or specialize this initial set of skills via interactive learning sessions, where the robotic device can autonomously perform certain portions of a skill while leaving other portions to be demonstrated by a user. Further details of such an interactive learning process are described with reference to FIG. 16.

In some embodiments, the robotic device can learn while executing skills 2206. For example, the robotic device can collect, store, analyze, and/or update information (e.g., at 774 in FIG. 11, at 1304, 1305, and 1307 in FIG. 13), as the robotic device executes a behavior, an action, etc. In an embodiment, a robotic device can execute a skill that requires the robotic device to move through a hallway several times a day. The robotic device can learn that, at certain times of day, the hallway has greater traffic. The robotic device can then adapt its behavior, for example, to avoid going through the hallway during those times of high traffic (e.g., by going an alternative route and/or waiting to go through the hallway at times of low traffic).

Figure 23:
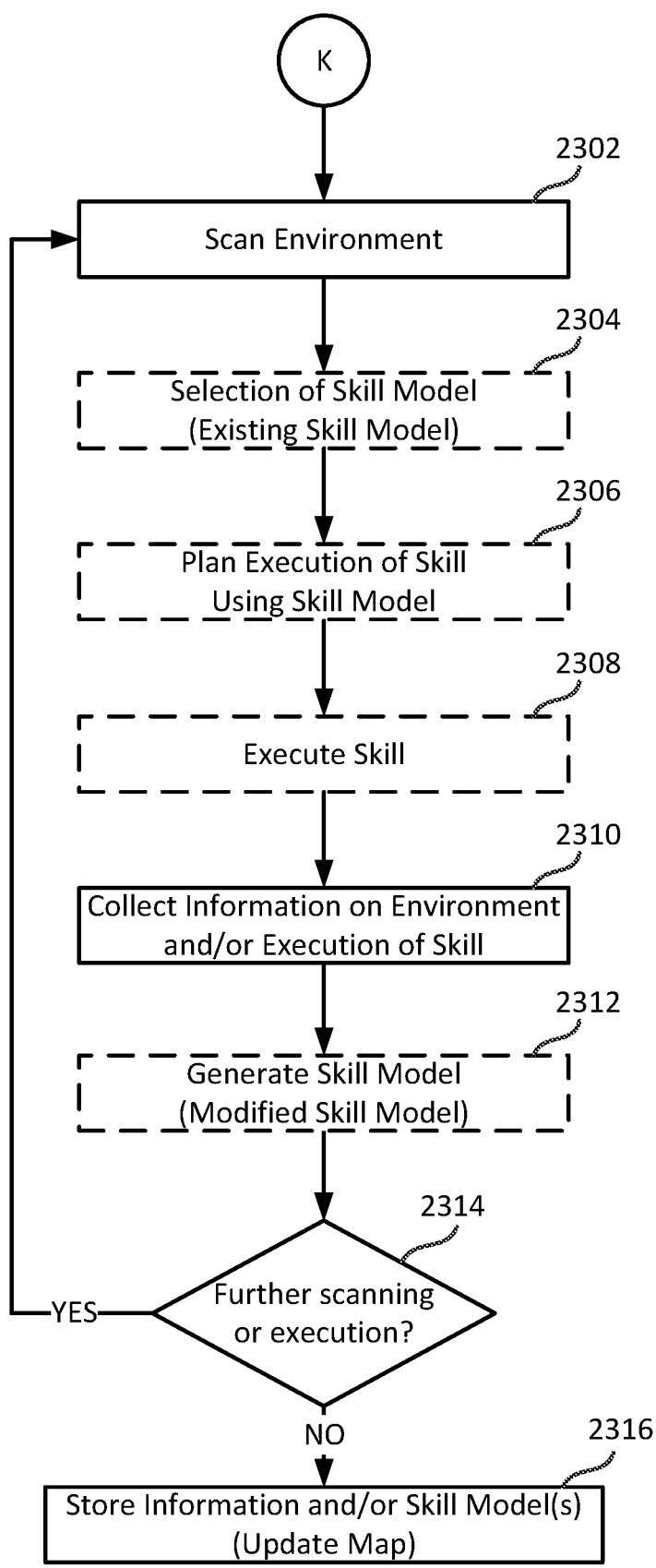
FIGS. 23-25 depict flow diagrams illustrating example learning behaviors of a robotic device, according to some embodiments.

In some embodiments, the robotic device can learn via exploration 2208. FIG. 23 is a flow diagram depicting an example method of learning through exploration. The robotic device can scan an environment and collect information on the environment and/or objects within the environment, at 2302. Optionally, based on the information the robotic device has collected, the robotic device can determine to explore the environment by executing a skill. To execute the skill, the robotic device can select an existing skill model, at 2304, plan the execution of the skill using the skill model, at 2306, and execute the skill, at 2308. For example, the robotic device can scan an environment and identify a doorway. The robotic device can determine to execute a skill including steps of opening a door and moving through the doorway. At 2304, the robotic device can select an existing skill model that it has been provided and/or learned to navigate through doorways. At 2306, the robotic device can generate a plan for opening the door and moving through the doorway using the existing skill, e.g., according to a process similar to the process discussed with reference to FIG. 11. And at 2308, the robotic device can execute the skill according to the generated plan. While executing the skill, the robotic device can collect information on the environment and/or its execution of the skill, and compare such information to information collected during previous interactions with doorways, at 2310. The robotic device can evaluate, based on this comparison, whether its interaction with the doorway was a success or failure (e.g., based on success criterion, as described above). The robotic device can optionally generate a skill model that is specific to the doorway based on its execution of the skill, at 2312.

In some embodiments, the robotic device may initiate execution of a skill and determine that user input is required to further complete the skill. For example, as described above with reference to FIG. 16, the robotic device can initiate the execution of a skill and, upon reaching a part of the skill that the robotic device cannot determine how to execute, solicit user input to build on its execution of the skill.

In some embodiments, the robotic device may execute a skill and determine that its execution has failed. For example, the robotic device can plan and/or execute a movement through a doorway but detect that it was not able to move through the doorway (e.g., due to a failed attempt to open the door or navigate across a tight doorway). The robotic device can determine to scan the environment again (2314: YES), and then re-plan and re-execute the skill, at 2306-2308. In some embodiments, the robotic device may select a different skill (e.g., a skill more specific to a tight doorway), at 2304, and then re-plan and re-execute based on the different skill. The robotic device can continue to learn via exploration by re-scanning, re-planning, and re-executing a skill until the robotic device determines that it has met a certain objective (e.g., successfully executed the skill a predetermined number of times or ways, learned sufficient information regarding the environment, etc.). At 2316, the robotic device can store the information it has collected of the environment and/or objects within the environment and optionally any models that it has adapted or generated based on executing skills within the environment.

In some embodiments, the robotic device may engage in learning by exploration 2208 with user input 2210. For example, the robotic device can explore a particular environment and/or execute one or more skills in that environment to learn more information about that environment. While the robotic device is exploring, a user (e.g., a remote supervisor or a local user) can provide inputs to the robotic device based on information that the user perceives and/or learned about the environment (e.g., directly by being in the environment and/or through the robotic device). The user can then provide one or more inputs into the robotic device that further guide its exploration of the environment. For example, a robotic device that encounters a doorway may plan one or more movements to navigate through the doorway. The robotic device, upon executing the movements, may fail to navigate through the doorway. A user can view the failed attempt by the robotic device and provide input(s) into the robotic device to guide the robotic device in a second attempt to navigate through the doorway. For example, the user can determine that the doorway is a tight doorway and indicate to the robotic device that it should seek a nearby user or robotic device to first open the door before navigating through the doorway. The robotic device, upon receiving the user input, can then seek a user to open the door before navigating through the doorway.

In some embodiments, the robotic device can learn via user input 2210 by receiving information regarding an environment and/or objects within the environment from a user, or receiving initial sets of models, rules, etc. from a user. In some embodiments, a robotic device may initially learn a skill through a demonstration (e.g., as described above with reference to FIG. 10) and learn to adapt that skill based on a user input. For example, a robotic device can learn a skill for moving a supply from a first location to a second location and then dropping off the supply at the second location. During a user demonstration of the skill, the user can indicate to the robotic device that dropping off the supply at the second location requires specific information unique to an environment or situation. The user can later provide inputs to the robotic device specifying, for different supplies and/or different locations, the unique information that the robotic device should observe while dropping off the supply. For example, the user can provide information regarding a tag or a marker that identifies where the robotic device should drop off the supply.

In some embodiments, the robotic device can learn behavior or rules (e.g., arbitration algorithm(s) 1858, as described above) based on stored information and/or user inputs 2210. FIG. 24 is a flow chart of an example method of robotic learning of behavior and/or rules. The robotic device can analyze stored information (e.g., map(s), model(s), user input(s)), at 2402. The robotic device can derive behavior and/or rules based on its analysis of stored information, at 2404. For example, a user (e.g., robot supervisor or local user) can define a rule for a robotic device to be more conversational when more humans are near the robotic device. The robotic device may determine, based on its analysis of stored information, that more humans are near it during a certain time of day (e.g., around lunchtime). Therefore, the robotic device may further derive that it should be more conversational during that time of day. In some embodiments, the robotic device can automatically implement this behavior as a new rule. Alternatively, the robotic device can propose being more conversational at that time of day as a new rule to the user, at 2406. The robotic device can receive a user input in response to proposing the rule, at 2408. For example, the user may view the rule on a local and/or remote display of the robotic device and select to accept or reject it. Based on the user input, the robotic device can modify its behavior and/or rules, at 2410. For example, if the user indicates that the rule is acceptable, the robotic device can store the new rule and implement it in the future. Alternatively, if the user indicates that the rule is acceptable but with a further tweak or change (e.g., being more conversational around lunchtime but only in a cafeteria), then the robotic device can adapt the rule and store the adapted rule for future implementation.

Figure 25:
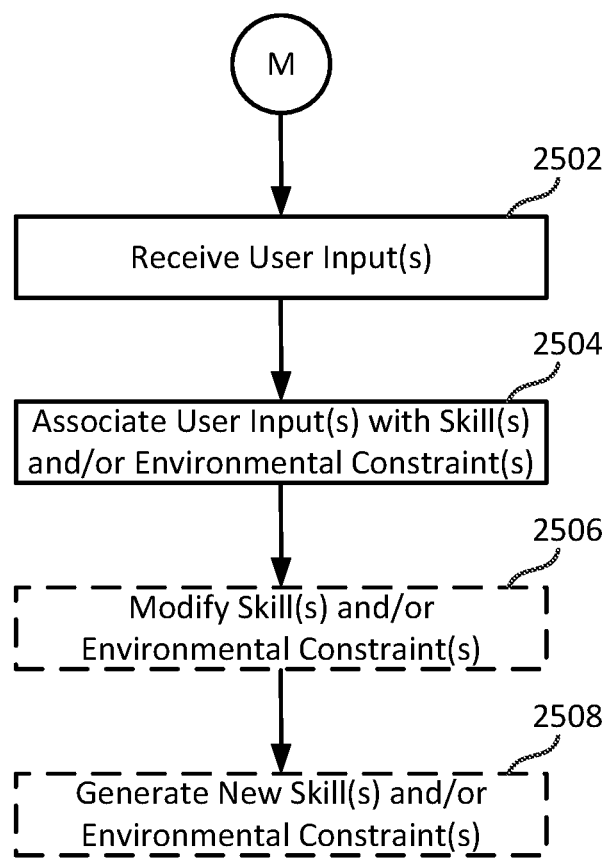

In some embodiments, the robotic device can learn a skill and/or environmental constraint by adapting an existing skill and/or environmental constraint based on a user input. FIG. 25 is a flow diagram of an example method of adapting a skill and/or environmental constraint based on a user input. The robotic device can receive a user input, at 2502. The robotic device can associate the user input with one or more skill(s) and/or environmental constraints, at 2504. Such association can be based on, for example, a further input by the user (e.g., the user specifying the skill and/or environmental constraint that the input relates to) and/or a derivation by the robotic device (e.g., the robotic device determining that such an input is associated with a particular skill or environmental constraint based on one or more rules, attributes, etc. associated with the input and/or particular skill or environmental constraint. For example, a user can provide a robotic device with new information for identifying an object, such as a QR code, a barcode, a tag, etc. The user can specify that this new information is for a particular object, and the robotic device can associate the new information with that object. The robotic device can further associate the new information for that object with one or more skills that involve interactions with that object, e.g., a grabbing or moving skill. The robotic device can optionally modify and/or generate a skill or environmental constraint based on the input, at 2506-2508.

In some embodiments, the robotic device can enable a user to retroactively label information associated with a skill and/or environmental constraint. For example, the robotic can present a skill or environmental constraint to a user, e.g., via a user interface (e.g., user interface 240) and/or a remote interface. The user can select to add, modify, and/or remove a label associated with the skill or environmental constraint, and such input can be received at the robotic device, at 2502. The robotic device can then associate the input with the skill or environmental constraint, at 2504, and modify and/or generate a new skill or environmental constraint based on the input, at 2506-2508.

EXAMPLES

It will be appreciated that the present disclosure may include any one and up to all of the following examples.

Example 1

An apparatus, comprising: a memory; a processor; a manipulating element; and a set of sensors, the processor operatively coupled to the memory, the manipulating element, and the set of sensors, and configured to: obtain, via a subset of sensors from the set of sensors, a representation of an environment; identify a plurality of markers in the representation of the environment, each marker from the plurality of markers associated with a physical object from a plurality of physical objects located in the environment; present information indicating a position of each marker from the plurality of markers in the representation of the environment; receive a selection of a set of markers from the plurality of markers associated with a set of physical objects from the plurality of physical objects; obtain, for each position from a plurality of positions associated with a motion of the manipulating element in the environment, sensory information associated with the manipulating element, the motion of the manipulating element associated with a physical interaction between the manipulating element and the set of physical objects; and generate, based on the sensory information, a model configured to define movements of the manipulating element to execute the physical interaction between the manipulating element and the set of physical objects.

Example 2

The apparatus of Example 1, wherein the set of physical objects includes a human.

Example 3

The apparatus of any one of Examples 1-2, wherein the manipulating element includes an end effector configured to engage with a subset of physical objects from the set of physical objects.

Example 4

The apparatus of any one of Examples 1-3, wherein the subset of sensors is a first subset of sensors, the processor configured to obtain the sensory information via a second subset of sensors from the set of sensors, the second subset of sensors different from the first subset of sensors.

Example 5

The apparatus of any one of Examples 1-4, wherein the manipulating element includes a plurality of movable components joined via a plurality of joints, the set of sensors including at least one of: a sensor configured to measure a force acting on a joint from the plurality of joints; or a sensor configured to detect an engagement between a movable component from the plurality of movable components and a physical object from the set of physical objects.

Example 6

The apparatus of Example 5, wherein the set of sensors further includes a sensor configured to measure a position of the joint or the movable component, relative to a portion of the apparatus.

Example 7

The apparatus of Example 5, wherein the set of sensors further includes at least one of: a light sensor, a temperature sensor, an audio capture device, and a camera.

Example 8

The apparatus of Example 1, wherein the manipulating element includes (i) a plurality of joints, and (ii) an end effector configured to move a physical object from the set of physical objects, the set of sensors including a sensor configured to measure a force placed on at least one of the end effector or a joint from the plurality of joints coupled to the end effector when the end effector is moving the physical object.

Example 9

The apparatus of any one of Examples 1-8, wherein the sensory information includes sensor data associated with a set of features, the processor further configured to: receive a selection of a first subset of features from the set of features, the processor configured to generate the model based on sensor data associated with the first subset of features and not based on sensor data associated with a second subset of features from the set of features not included in the first set of features.

Example 10

The apparatus of Example 9, wherein the processor is further configured to prompt a user to select at least one feature from the set of features such that the processor receives the selection of the first subset of features in response to a selection made by the user.

Example 11

The apparatus of any one of Examples 1-10, wherein the plurality of markers are fiducial markers, and the representation of the environment is a visual representation of the environment.

Example 12

The apparatus of any one of Examples 1-11, wherein the processor is further configured to save the model and information associated with the model in the memory, the information associated with the model including: (i) the set of markers, and (ii) the sensory information.

Example 13

The apparatus of Example 1, wherein the manipulating element includes a plurality of joints, the sensory information including, for each position from the plurality of positions associated with the motion of the manipulating element, information indicating a current state of each joint from the plurality of joints.

Example 14

The apparatus of any one of Examples 1-13, wherein the processor is further configured to prompt, after the presenting, a user to select at least one marker from the plurality of markers such that the processor receives the selection of the set of markers in response to a selection made by the user.

Example 15

The apparatus of any one of Examples 1-14, wherein the processor is configured to obtain the representation of an environment by scanning a region of interest in the environment using the set of sensors.

Example 16

A method, comprising: obtaining, via a set of sensors, a representation of an environment; identifying a plurality of markers in the representation of the environment, each marker from the plurality of markers associated with a physical object from a plurality of physical objects located in the environment; presenting information indicating a position of each marker from the plurality of markers in the representation of the environment; receiving, after the presenting, a selection of a set of markers from the plurality of markers associated with a set of physical objects from the plurality of physical objects; obtaining, for each position from a plurality of positions associated with a motion of a manipulating element in the environment, sensory information associated with the manipulating element, the motion of the manipulating element associated with a physical interaction between the manipulating element and the set of physical objects; and generating, based on the sensory information, a model configured to define movements of the manipulating element to execute the physical interaction between the manipulating element and the set of physical objects.

Example 17

The method of Example 16, wherein the sensory information includes sensor data associated with a set of features, the method further comprising: receiving a selection of a first subset of features from the set of features, the generating including generating the model based on sensor data associated with the first subset of features and not based on sensor data associated with a second subset of features from the set of features not included in the first set of features.

Example 18

The method of Example 17, further comprising prompting a user to select at least one feature from the set of features such that the selection of the first subset of features is received in response to a selection made by the user.

Example 19

The method of any one of Examples 16-18, wherein the plurality of markers are fiducial markers, and the representation of the environment is a visual representation of the environment.

Example 20

The method of any one of Examples 16-19, wherein the manipulating element includes a plurality of joints, the sensory information including, for each position from the plurality of positions associated with the motion of the manipulating element, information indicating a current state of each joint from the plurality of joints.

Example 21

The method of any one of Examples 16-20, further comprising prompting, after the presenting, a user to select at least one marker from the plurality of markers such that the selection of the set of markers is received in response to a selection made by the user.

Example 22

The method of any one of Examples 16-21, wherein the obtaining the representation of the environment includes scanning a region of interest in the environment using the set of sensors.

Example 23

A non-transitory processor-readable medium storing code representing instructions to be executed by a processor, the code comprising code to cause the processor to: obtain, via a set of sensors, a representation of an environment; identify a plurality of markers in the representation of the environment, each marker from the plurality of markers associated with a physical object from a plurality of physical objects located in the environment; present information indicating a position of each marker from the plurality of markers in the representation of the environment; in response to receiving a selection of a set of markers from the plurality of markers associated with a set of physical objects from the plurality of physical objects, identify a model associated with executing a physical interaction between a manipulating element and the set of physical objects, the manipulating element including a plurality of joints and an end effector; and generate, using the model, a trajectory for the manipulating element that defines movements of the plurality of joints and the end effector associated with executing the physical interaction.

Example 24

The non-transitory processor-readable medium of Example 23, wherein the code to cause the processor to identify the model associated with executing the physical interaction includes code to cause the processor to prompt a user to identify the model.

Example 25

The non-transitory processor-readable medium of any one of Examples 23-24, wherein the code to cause the processor to identify the model associated with executing the physical interaction includes code to cause the processor to identify the model based on the selection of the set of markers.

Example 26

The non-transitory processor-readable medium of any one of Examples 23-25, further comprising code to cause the processor to: display to a user the trajectory for the manipulating element in the representation of the environment; receive, after the displaying, an input from the user; and in response to the input indicating an acceptance of the trajectory for the manipulating element, implement the movements of the plurality of joints and the end effector to execute the physical interaction.

Example 27

The non-transitory processor-readable medium of any one of Examples 23-26, wherein the trajectory is a first trajectory, the non-transitory processor-readable medium further comprising code to cause the processor to, in response to the input not indicating an acceptance of the trajectory for the manipulating element: modify a set of parameters associated with the model to produce a modified model; and generate, using the modified model, a second trajectory for the manipulating element.

Example 28

The non-transitory processor-readable medium of any one of Examples 23-26, wherein the trajectory is a first trajectory and the model is a first model, the non-transitory processor-readable medium further comprising code to cause the processor to, in response to the input not indicating an acceptance of the trajectory for the manipulating element: generate a second model based on sensor data associated with a set of features different from a set of features used to generate the first model; and generate, using the second model, a second trajectory for the manipulating element.

Example 29

The non-transitory processor-readable medium of any one of Examples 23-28, further comprising code to cause the processor to: implement the movements of the plurality of joints and the end effector to execute the physical interaction; obtain sensory information associated the execution of the physical interaction; and determine whether the execution of the physical interaction meets a predefined and/or learned success criterion based on the sensory information.

Example 30

The non-transitory processor-readable medium of Example 29, further comprising code to cause the processor to: in response to determining that the execution of the physical interaction meets the predefined and/or learned success criterion, generate a signal indicating that the physical interaction was successful; and in response to determining that the execution of the physical interaction does not meet the predefined and/or learned success criterion: modify the model based on the sensory information to produce a modified model; and generate, using the modified model, a second trajectory for the manipulating element.

Example 31

The non-transitory processor-readable medium of any one of Examples 23-30, wherein the model is associated with (i) a stored set of markers, (ii) sensory information indicating at least one of a position or an orientation of the manipulating element at points along a stored trajectory of the manipulating element associated with the stored set of markers, and (iii) sensory information indicating a configuration of the plurality of joints at the points along the stored trajectory; the code to cause the processor to generate the trajectory for the manipulating element includes code to cause the processor to: compute a transformation function between the set of markers and the stored set of markers; transform, for each point, the at least one of the position or the orientation of the manipulating element using the transformation function; determine, for each point, a planned configuration of the plurality of joints based on the configuration of the plurality of joints at the points along the stored trajectory; and determine, for each point, a portion of the trajectory between that point and a consecutive point based on the planned configuration of the plurality of joints for that point.

Example 32

The non-transitory processor-readable medium of any one of Examples 23-30, wherein the model is associated with (i) a stored set of markers, and (ii) sensory information indicating at least one of a position or an orientation of the manipulating element at points along a stored trajectory of the manipulating element associated with the stored set of markers; the code to cause the processor to generate the trajectory for the manipulating element includes code to cause the processor to: compute a transformation function between the set of markers and the stored set of markers; transform, for each point, the at least one of the position or the orientation of the manipulating element using the transformation function; determine, for each point, a planned configuration of the plurality of joints; and determine, for each point, a portion of the trajectory between that point and a consecutive point based on the planned configuration of the plurality of joints for that point.

Example 33

The non-transitory processor-readable medium of any one of claims 23-32, further comprising code to cause the processor to: determine whether to change a location of the manipulating element based on a distance between a first location of the manipulating element and a location of a physical object from the set of physical objects; and move, in response to determining to change a location of the manipulating element, the manipulating element from the first location to a second location more proximal to the location of the physical object, the code to cause the processor to generate the trajectory for the manipulating element includes code to cause the processor to generate, after the moving, the trajectory based on the location of the physical object relative to the second location of the manipulating element.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Some embodiments and/or methods described herein can be performed by a different software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It will be understood that, although the terms first, second, third, etc. may be used herein to describe various elements, these elements should not be limited by these terms. These terms are only used to distinguish one element from another element. Thus, a first element discussed herein could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The invention claimed is:

1. An apparatus, comprising:
   a manipulating element;
   a transport element configured to move along a surface;
   a set of sensors;
   a memory; and
   a processor operatively coupled to the memory, manipulating element, transport element, and the set of sensors, the processor configured to:
   obtain, via a first subset of sensors from the set of sensors, information of an environment;
   select a model of a skill based on the information of the environment;
   generate, using the model, a plan to execute at least a first portion of the skill using the model, the plan including one or more movements of at least one of the manipulating element or the transport element;
   move the at least one of the manipulating element or the transport element based on the plan;
   obtain, via a second subset of sensors from the set of sensors, information of at least one of the environment, the manipulating element, or the transport element when the at least one of the manipulating element or the transport element are moving based on the plan;
   update a map of the environment based on the information of the at least one of the environment, the manipulating element, or the transport element;
   determine that a second portion of the skill requires specialization to the environment;
   request, in response to determining that the second portion of the skill requires specialization, a demonstration from a user;
   obtain, for each position from a plurality of positions associated with the demonstration, information collected by a third subset of sensors and associated with at least one of the environment, the manipulating element, or the transport element; and
   generate, using the model and the information collected by the third subset of sensors, a specialized model for executing the skill in the environment.

2. The apparatus of claim 1, wherein the processor is further configured to:
   determine that a third portion of the skill requires specialization to the environment;
   request, in response to determining that the third portion of the skill requires specialization, an input from the user;
   in response to receiving the input from the user, generate a second plan to execute the third portion of the skill; and
   move the at least one of the manipulating element and the transport element based on the second plan to execute the third portion of the skill.

3. The apparatus of claim 1, wherein the processor is further configured to:
   determine, based on the information of the at least one of the environment, the manipulating element, or the transport element, that the movement of the at least one of the manipulating element or the transport element failed to meet one or more success criteria;
   modify the plan to execute at least a portion of the skill in response to determining that the movement failed to meet the one or more success criteria; and move the at least one of the manipulating element or the transport element based on the modified plan.

4. The apparatus of claim 1, wherein the map of the environment includes at least a semantic layer and a contextual layer, the processor is configured to update the map of the environment by:
   storing information associated with one or more objects in the environment in the semantic layer;
   determining, based on the information associated with the one or more objects, one or more behaviors to execute near the one or more objects; and
   storing the one or more behaviors in the contextual layer.

5. The apparatus of claim 1, wherein the processor is further configured to:
   display to the user the plan to execute the at least the first portion of the skill; and
   receive, after the displaying, an input from the user indicating confirmation to proceed with executing the at least the first portion of the skill,
   the processor configured to move the at least one of the manipulating element or the transport element in response to receiving the input.

6. The apparatus of claim 1, wherein the processor is further configured to:
   display to the user the plan to execute the at least the first portion of the skill;
   receive, after the displaying, an input from the user indicating a change to the plan; and
   modify the plan based on the input,
   the processor configured to move the at least one of the manipulating element or the transport element based on the plan after modifying the plan.

7. The apparatus of claim 1, wherein:
   the manipulating element includes a plurality of movable components joined by a plurality of joints, and
   the set of sensors includes at least one of:
      a sensor configured to measure a torque acting on a joint from the plurality of joints; or
      a sensor configured to detect an engagement between a movable component from the plurality of movable components and a physical object from the set of physical objects.

8. The apparatus of claim 1, wherein the manipulating element includes an end effector configured to engage with one or more objects in the environment.

9. An apparatus, comprising:
   a manipulating element;
   a transport element configured to move along a surface;
   a set of sensors;
   a memory; and
   a processor operatively coupled to the memory, manipulating element, transport element, and the set of sensors, the processor configured to:
      obtain, via the set of sensors, information of an environment;
      send the information of the environment to a compute device such that the compute device, in response to receiving the information of the environment, presents the information of the environment to a user;
      receive, from the compute device, an input from the user;
      select a model for a skill based on the information of the environment and the input;
      generate, using the model, a plan to execute at least a first portion of the skill based on the information of the environment and the input;
      move the at least one of the manipulating element or the transport element based on the plan,
      determine that a second portion of the skill requires specialization to the environment;
      request, in response to determining that the second portion of the skill requires specialization, a demonstration from the user;
      obtain, for each position from a plurality of positions associated with the demonstration, information collected by the set of sensors and associated with at least one of the environment, the manipulating element, or the transport element; and
      generate, using the model and the information collected by the set of sensors, a specialized model for executing the skill in the environment.

10. The apparatus of claim 9, wherein the input includes an instruction to obtain additional information of the environment, and the skill involves a movement from a first location to a second location, the processor further configured to:
   obtain, via the set of sensors, the additional information of the environment including information associated with at least one object in the environment; and
   send the additional information of the environment to the compute device,
   the processor configured to move the at least one of the manipulating element or the transport element by operating the transport element to move from the first location to the second location.

11. The apparatus of claim 9, wherein the input indicates a characteristic of an object in the environment, and the skill involves an interaction with the object, the processor further configured to identify the object in the environment based at least in part on the input.

12. The apparatus of claim 9, wherein the input includes an instruction to execute a social behavior, and the skill involves an interaction with at least one human, the processor further configured to:
   identify the at least one human in the environment; and
   execute the social behavior near the at least one human.

13. The apparatus of claim 9, wherein the manipulating element includes an end effector configured to grab one or more objects in the environment, the skill involves moving an object from a first location to a second location, and the processor is configured to move the at least one of the manipulating element and transport element by moving the manipulating element to grab the object and moving the transport element to move from the first location to the second location.

14. The apparatus of claim 9, wherein the input includes an instruction to modify the model, the processor further configured to:
   modify the model based on the input,
   the processor configured to generate the plan to execute the at least the first portion of the skill using the model after the modifying.

15. The apparatus of claim 9, wherein the input includes the model, the model being configured by the user at the compute device based on the information of the environment.

16. A method, comprising:
   obtaining, via a first set of sensors of a robotic device, information of an environment;
   selecting, based on the information of the environment, a model of a skill stored in a memory of the robotic device;

generating, using the model, a plan to execute at least a first portion of the skill using the model, the plan including one or more movements of at least one of a manipulating element or a transport element of the robotic device;

moving the at least one of the manipulating element or the transport element based on the plan;

obtaining, via a second set sensors of the robotic device, information of at least one of the environment, the manipulating element, or the transport element when the at least one of the manipulating element or the transport element are moving based on the plan;

updating, based on the information of the at least one of the environment, the manipulating element, or the transport element, a map of the environment stored in the memory determining that a second portion of the skill requires specialization to the environment;

in response to determining that the second portion of the skill requires specialization, requesting a demonstration from a user;

obtaining, via a third subset of sensors and associated with at least one of the environment, the manipulating element, or the transport element, information for each position from a plurality of positions associated with the demonstration; and generating, using the model and the information collected by the third subset of sensors, a specialized model for executing the skill in the environment.

17. The method of claim 16, further comprising:

sending, to a compute device, information indicative of the update to the map of the environment; and receiving, from the compute device, information indicating updates to the map of the environment received by the compute device from a set of robotic devices other than the robotic device.

\* \* \* \* \*